United States Patent

Matsuzawa

[11] Patent Number: 5,850,576
[45] Date of Patent: Dec. 15, 1998

[54] BLUR PREVENTION SYSTEM FOR OPTICAL APPARATUS

[75] Inventor: Yoshinori Matsuzawa, Hachioji, Japan

[73] Assignee: Olympus Optical Co., Ltd., Tokyo, Japan

[21] Appl. No.: 967,132

[22] Filed: Nov. 12, 1997

[30] Foreign Application Priority Data

| Nov. 14, 1996 | [JP] | Japan | 8-303221 |
| Nov. 14, 1996 | [JP] | Japan | 3-303222 |
| Dec. 10, 1996 | [JP] | Japan | 8-329646 |

[51] Int. Cl.[6] .......................... G03B 17/00; G02B 27/64
[52] U.S. Cl. ............................... 396/55; 359/554
[58] Field of Search ............... 396/52–55; 359/554–557; 348/208

[56] References Cited

U.S. PATENT DOCUMENTS 5,130,729  7/1992  Sato et al. ................................. 396/55
5,655,157  8/1997  Enomoto .................................. 396/55

FOREIGN PATENT DOCUMENTS 61-150580   7/1986   Japan.
61-248681  11/1986   Japan.

Primary Examiner—W. B. Perkey
Attorney, Agent, or Firm—Louis Weinstein

[57] ABSTRACT

A blur prevention system for an optical apparatus includes a camera body having combined unitedly a viewfinder for observing an object image and a photography unit including a photography optical system for exposing film or electrically recording an object image, a holding unit separated from the camera body and used to hold the camera body, a blur detector incorporated in the camera body for detecting a magnitude of trembling of the camera body, and a blur prevention drive unit incorporated in the holding unit and including a driving mechanism for displacing the camera body relative to the holding unit according to the magnitude of trembling detected by the blur detector so that the tremble of the camera body can be canceled.

47 Claims, 41 Drawing Sheets

BLUR PREVENTION SYSTEM FOR OPTICAL APPARATUS

BACKGROUND OF THE INVENTION

1. Field of the Invention

The present invention relates to a blur prevention system for an optical apparatus. More particularly, this invention is concerned with a blur prevention system for an optical apparatus capable of alleviating a drawback in photography or observation derived from a tremble or the like occurring at the time of using an optical apparatus including a photography optical apparatus such as a still camera or video camera, and an observation optical apparatus such as a telescope or binoculars.

2. Description of the Related Art

When a photography optical apparatus such as a still camera or video camera is used to produce a still image or motion picture, or an observation optical apparatus such as a telescope or binoculars is used for observation, if an operator holds the apparatus with his/her hands alone, since the photography optical apparatus or observation optical apparatus (hereinafter, generically, an optical apparatus) is unstable, the optical axis of an optical system in the optical apparatus becomes unstable. Consequently, from time to time, a blur appears in a formed image, a clear image cannot be produced, and therefore the produced image becomes a blurred image.

Various proposals have been made for providing a better result of photography by preventing a tremble or the like occurring at the time of using a hand-held optical apparatus so as to prevent deterioration of image quality, and for enabling more enjoyable observation.

For example, in relation to a conventional photography optical apparatus, a means for optically correcting a tilt caused by a shift of the optical axis of a photography optical system using a special optical system has been proposed. When a blur is corrected by unitedly tilting a photography optical system ranging from a photographic lens to a photography system, since the disorder in aberrations of a lens occurring when the optical axis of the photography optical system is shifted due to a displacement of some optical system will not take place, image quality will not deteriorate.

However, generally, a ratio at which a photographic lens cylinder for holding a photographic lens or a whole photography optical system occupies a main unit of a photography optical apparatus such as a camera is large. Therefore, when a means for preventing a blur by tilting a lens cylinder is employed, the main unit may be moved by a large amount as a reaction to the tilting.

A vibration occurring in a lens cylinder of a camera or the like for holding a photography optical system is detected by a detection sensor or the like. The photographic lens cylinder is then driven so that the detected value will become null. Thus, the vibration occurring in the photographic lens cylinder is canceled actively. This technique has been proposed in Japanese Unexamined Patent Publication Nos. 61-248681 and 61-150580.

A vibration-proof camera disclosed in the Japanese Unexamined Patent Publication No. 61-248681 has a gimbal giving free movement along two axes incorporated in a camera body. The gimbal is used to support a lens cylinder. Thus, the vibration-proof camera includes a vibration isolator utilizing a so-called rotary gyro.

In a vibration isolating means in a photography apparatus disclosed in the Japanese Unexamined Patent Publication No. 61-150580, a vibration isolator for isolating a vibration derived from the rotation in a lateral direction (yawing direction) with respect to the top of a lens cylinder is located under the lens cylinder. A driving control mechanism for exerting control so that the vibration isolator can be driven to cope with the rotation in a longitudinal direction (pitching direction), a camera holding portion, and an observation optical system are arranged by the side of the lens cylinder. Thus, rotation in the longitudinal direction of the lens cylinder can also be prevented. A permanent magnet and coil are used to drive a camera body for isolating a vibration by means of a grip. A photographer holds the holding portion for carrying out photography.

Various proposals have been made for a so-called simplified vibration isolator designed to isolate a vibration by determining the timing of releasing a shutter according to a magnitude of trembling without correcting the optical axis of a photography optical system.

For further improving an effect of vibration isolation, it has been conceived that a heavy-duty vibration isolating mechanism of an adaptor type is provided as an optional member to be added to the foregoing simplified vibration isolator.

In general, for tilting the whole of a photography optical system included in a photography optical apparatus such as a camera with the photography optical apparatus which is hand held, a structure for enclosing a photographic lens cylinder and an entire photography optical system or a structure for suspending them using a cantilevered arm member is needed. This poses a problem that the overall apparatus becomes large. The same applies to a similar means to be adapted to an observation optical apparatus such as a telescope or binoculars.

For correcting a blur, if the position of an image is shifted using, for example, a means for moving an entire optical system or decentering some optical system, since the image is moved a bit, the image quality deteriorates. When an optical system is thus moved, an effect of blur correction may not be exerted fully because of a backlash between members of a moving mechanism or a backlash of a gear thereof.

A means disclosed in the Japanese Unexamined Patent Publication No. 61-248681 is a vibration isolator using a rotary gyro. For fully exerting an effect of blur prevention, a rotor that is as heavy as a photography apparatus must be rotated at a high speed. This poses a problem that the apparatus becomes large in size.

In the means disclosed in the Japanese Unexamined Patent Publication No. 61-248681, when an optical apparatus is supported from below, since the weight of the optical apparatus can be borne near the center of gravity, it is easy to hold the optical apparatus. However, since the gimbal is located to surround the lens cylinder, the optical apparatus which includes the gimbal becomes large in size as a whole. Moreover, there is a problem that the optical apparatus lacks portability and mobility.

The means disclosed in the Japanese Unexamined Patent Publication No. 61-150580 has the holding portion located at a position far away from the center of gravity of the photography apparatus. The holding portion therefore must support heavy component members constituting the lens cylinder or the like. For photography, there is a problem that it is hard to hold the photography apparatus reliably and stably.

For holding the photography apparatus, when the lens cylinder and holding portion are held with left and right hands respectively, the optical axes of the observation optical system and photography optical system vary because of vibration insulation. This poses a problem that the photography apparatus becomes hard to handle.

Moreover, since driven parts including the lens cylinder are supported about a cantilevered drive shaft, a large quantity of force or energy is needed to drive the driven parts.

Furthermore, as far as the means disclosed in the Japanese Unexamined Patent Publications Nos. 61-248681 and 61-150580 are concerned, since a viewfinder for use in observing an object image is not united with a camera body but united with a grip, a direction in which a photographer looks into the viewfinder so as to observe an object image may not coincide with the direction of the optical axis of an optical system for photography. This leads to a drawback that it is hard to handle the apparatus.

In a camera having the aforesaid simplified vibration isolator, if an adaptor-type heavy-duty vibration isolating mechanism were adopted, a blur detection sensor would be included in the adaptor. This poses a problem that the blur detection sensor is included in the adaptor in addition to a blur detection sensor in the camera, and therefore the camera becomes an expensive apparatus.

SUMMARY OF THE INVENTION

The first object of the present invention is to provide a blur prevention system for an optical apparatus which exerts an excellent effect of blur prevention, contributes to realization of ease of holding a compact design, and excellent mobility, and is applicable to diverse purposes.

The second object of the present invention is to provide a blur prevention system for an optical apparatus having a viewfinder for use in observing an object image and a photography optical system with their optical axes substantially coincident with each other.

The third object of the present invention is to provide a blur prevention system for a camera which can exert a sufficient effect of vibration prevention against a tremble occurring when the camera is used for photography, and contributes to realization of excellent mobility and a compact design.

The fourth object of the present invention is to provide a blur prevention system for a hand-held optical apparatus which assists in restraining a unit for preventing a blur by tilting a lens cylinder, photography optical system, and observation optical system from getting large in size, and can correct a blur derived from a backlash of a driving mechanism for the apparatus or a backlash of a gear.

The fifth object of the present invention is to provide an inexpensive blur prevention system for a camera in which even when a camera having a simplified vibration isolator is designed to be usable with a heavy-duty vibration isolating adaptor for correcting the optical axis of a photography optical system attached thereto, a blur detection sensor incorporated in a camera body can be used in common.

Briefly, a blur prevention system for an optical apparatus according to the present invention comprises a camera body having unitedly a viewfinder for use in observing an object image and a photography unit including a photography optical system for exposing film or electrically recording an object image, a holding unit separated from the camera body and used to hold the camera body, a blur detector incorporated in the camera body for detecting a magnitude of trembling of the camera body, and a blur prevention drive unit incorporated in the holding unit and including a driving mechanism for displacing the camera body relative to the holding unit on the basis of the magnitude of trembling detected by the blur detector so that the tremble of the camera body can be canceled.

A blur prevention system for a camera according to the present invention comprises a blur detector incorporated in a camera body for detecting a magnitude of trembling of the camera body, a first vibration isolator for alleviating the adverse effect of a tremble in a simplified manner on the basis of an output of the blur detector, and a second vibration isolator separated from the camera body for receiving a blur signal from the blur detector and driving the camera body so that the tremble applied to the camera body can be canceled.

A hand-held optical apparatus including an optical system for observation or photography comprises a blur detector incorporated in the main unit of the optical apparatus for detecting a magnitude of trembling applied to the main unit of the optical apparatus, an actuator for canceling the magnitude of trembling, a driving force output member partly exposed to the exterior or of the optical apparatus for outputting a driving force originating from the actuator to the exterior, and a control unit for outputting a control signal to the actuator in response to an output signal of the blur detector so that a movement made by the entire optical apparatus due to the tremble can be canceled.

These and the other objects of the present invention and the advantages thereof will be apparent from the description below.

According to the present invention, there is provided a blur prevention system for an optical apparatus that can exert a sufficient effect of blur prevention, and contributes to realization of ease of holding a compact design, and excellent mobility, and is applicable to diverse purposes. Moreover, a blur prevention system for an optical apparatus having a viewfinder for use in observing an object image and a photography optical system with their optical axes substantially coincident with each other can be provided.

Moreover, according to the present invention, there is provided a blur prevention system for a camera which can exert a sufficient effect of vibration isolation against a tremble occurring when the camera is used for photography, and contributes to realization of excellent mobility and a compact design.

Furthermore, according to the present invention, there is provided an inexpensive blur prevention system for a camera in which even when a camera including a simplified vibration isolator is designed to be usable with a heavy-duty adaptor for isolating vibrations by correcting the optical axis of a photography optical system attached thereto, a blur detection sensor incorporated in a camera body can be used in common.

According to the present invention, there is provided a blur prevention system for a hand-held optical apparatus which contributes to suppression of an increase in size of the entire apparatus even when the apparatus is designed to prevent a blur by tilting a photographic lens cylinder, photography optical system, and observation optical system, and which can correct a tremble derived from a backlash in the apparatus or a backlash of a gear. Moreover, a blur alarming means for alarming a photographer with a repulsion against a tremble can be provided.

DESCRIPTION OF THE PREFERRED EMBODIMENTS

To begin with, the basic configurations of a blur prevention system in accordance with the present invention will be described in conjunction with the conceptual diagrams of FIGS. 1, 2, 3, and 4.

Figure 1:
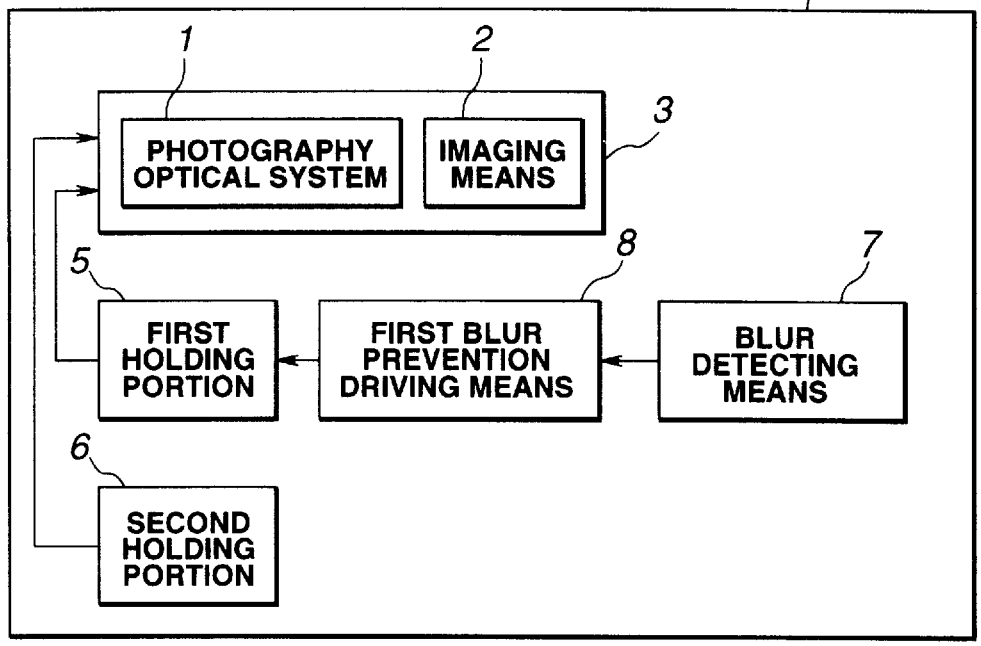
FIG. 1 is a conceptual diagram showing the first basic configuration of a blur prevention system in accordance with the present invention.

FIG. 1 is a conceptual diagram showing the first basic configuration of the blur prevention system in accordance with the present invention. The configuration is conformable to an aspect of the present invention set forth in claim 1.

As shown in FIG. 1, the blur prevention system is implemented in a photography optical apparatus (camera) 4 having a photography optical means 3 composed of a photography optical system 1 for photographing an object, and a photography means 2 serving as a viewfinder or viewfinder means for use in observing an object image and exposing film or electrically recording the object image. The blur prevention system comprises a first holding portion 5 by which a photographer holds the photography optical means 3, a second holding portion 6, a blur detecting means 7 for detecting a speed of rotational vibration at which the photography optical means 3 rotates or vibrates due to a tremble derived from the photographer's hold or the like, and a first blur prevention driving means 8 for displacing the photography optical means 3 relative to the first holding portion 5 on the basis of an output of the blur detecting means 7 so that a vibration of the photography optical means 3 can be canceled. Herein, the positional relationship of the second holding portion 6 relative to the photography optical means 3 is fixed.

Figure 2:
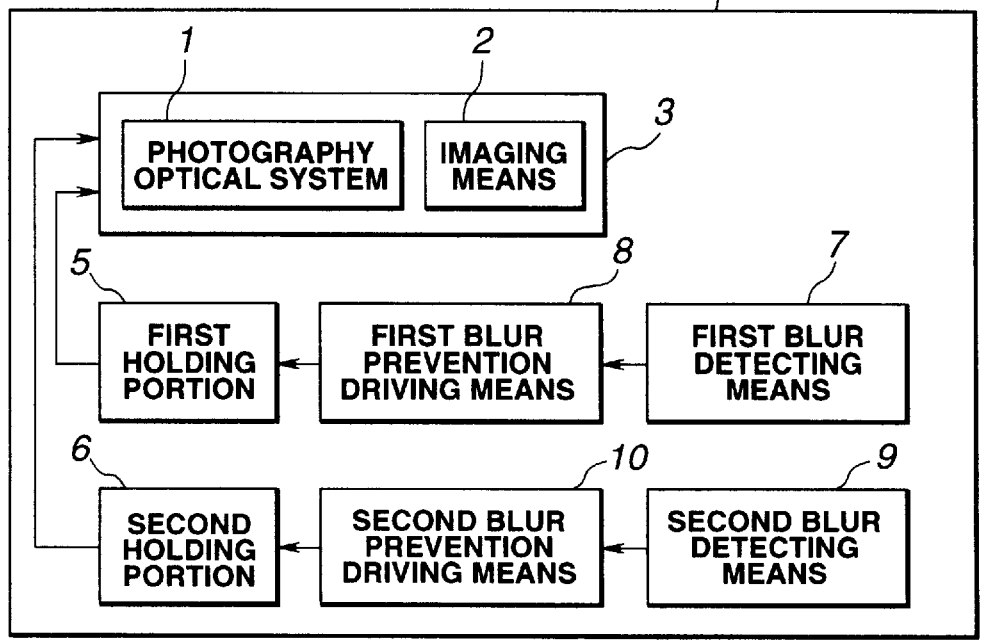
FIG. 2 is a conceptual diagram showing the second basic configuration of a blur prevention system in accordance with the present invention.

FIG. 2 is a conceptual diagram showing the second basic configuration of the blur prevention system in accordance with the present invention.

As shown in FIG. 2, the blur prevention system for a photography optical apparatus 4A comprises, in addition to the components shown in FIG. 1, a second blur detecting means 9 sensitive to a tremble occurring in a direction orthogonal to the direction of a tremble to be detected by the first blur detecting means 7, and detecting a speed of rotational vibration at which the photography optical means 3 rotates or vibrates due to a tremble derived from a photographer's hold or the like, and a second blur prevention driving means 10 for displacing the photography optical means 3 relative to the second holding portion 6 on the basis of an output of the second blur detecting means 9 so that a vibration of the photography optical means 3 can be canceled. Owing to these components, blurs caused by trembles occurring along two axes can be prevented. That is to say, the photography optical means 3 is displaced relative to even the second holding portion 6. A means corresponding to the blur detecting means 7 shown in FIG. 1 is termed the first camera shake detecting means 7.

The blur prevention systems shown in FIGS. 1 and 2 are implemented in the photography optical apparatuses 4 and 4A for carrying out photography, that is, cameras. The aforesaid configurations are not limited to the photography optical apparatus but may be adapted to an observation optical apparatus designed for observation, for example, a telescope or binoculars.

Figure 3:
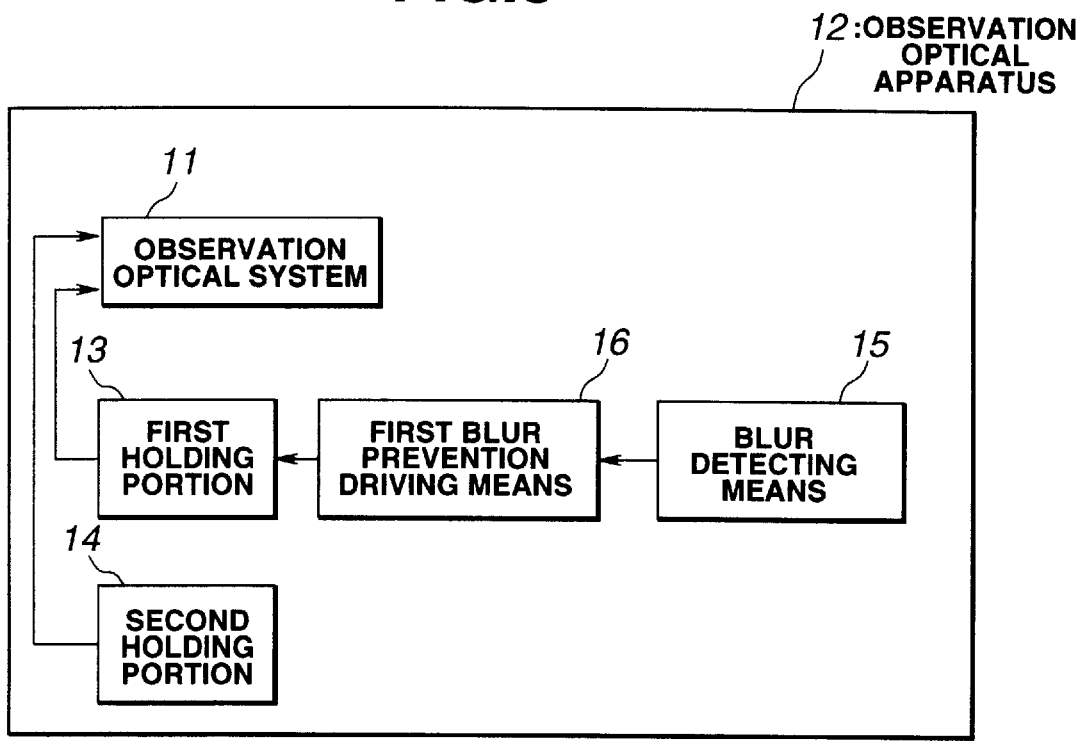
FIG. 3 is a conceptual diagram showing the third basic configuration of a blur prevention system in accordance with the present invention.

FIG. 3 is a conceptual diagram showing the third embodiment of a blur prevention system in accordance with the present invention. The configuration is conformable to an aspect of the present invention set forth in claim 22.

As shown in FIG. 3, the blur prevention system is implemented in an observation optical apparatus 12 including an observation optical system 11 for use in observing an object. The blur prevention system comprises a first holding portion 13 by which an observer holds the observation optical system 11, a second holding portion 14, a blur detecting means 15 for detecting a speed of rotational vibration at which the observation optical system 11 rotates or vibrates due to a tremble derived from an observer's hold or the like, and a first blur prevention driving means 16 for displacing the observation optical system 11 relative to the first holding portion 13 on the basis of an output of the blur detecting means 15 so that a vibration of the observation optical system 11 can be canceled.

In the blur prevention systems for an optical apparatus having the configurations shown in FIGS. 1 to 3, two different holding portions are included, and a vibration occurring in one direction is prevented in relation to each of the holding portions. Alternatively, vibrations occurring in two directions may be prevented in relation to at least one holding portion.

Figure 4:
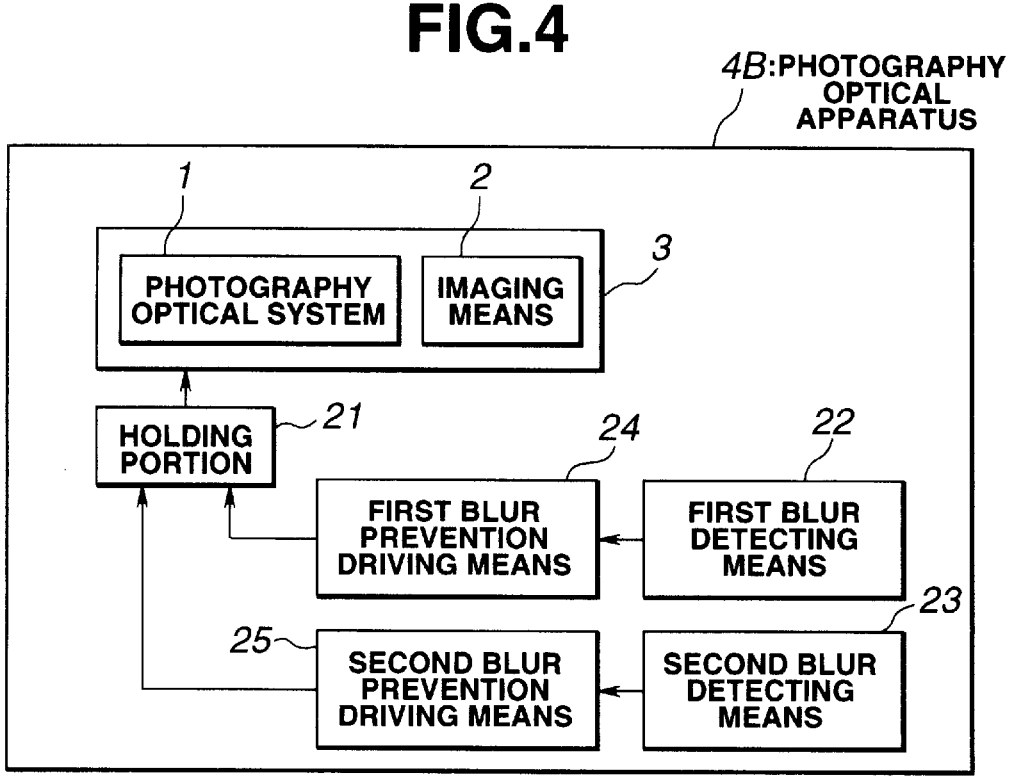
FIG. 4 is a conceptual diagram showing the fourth basic configuration of a blur prevention system in accordance with the present invention.

FIG. 4 is a conceptual diagram showing the fourth configuration of a blur prevention system in accordance with the present invention.

As shown in FIG. 4, the blur prevention system is implemented in a photography optical apparatus 4B having a photography optical means 3 composed of a photography optical system 1, a photography means 2, and a viewfinder means that is not shown. The blur prevention system comprises a holding portion 21 by which a photographer holds the photography optical means 3, a first blur detecting means 22 for detecting a speed of rotational vibration at which the photography optical means 3 rotates or vibrates due to a tremble derived from a photographer's hold or the like, a second blur detecting means 23 sensitive to a tremble occurring in a direction orthogonal to a direction of a tremble detected by the first blur detecting means 22 and capable of detecting a speed of rotational vibration at which the photography optical means 3 rotates or vibrates due to a tremble derived from a photographer's hold or the like, a first blur prevention driving means 24 for displacing the photography optical means 3 relative to the holding portion 21 on the basis of an output of the first blur detecting means 22 so that a vibration of the photography optical means 3 can be canceled, and a second blur prevention driving means 25 for displacing the photography optical means 3 relative to the holding portion 21 in a direction different from a direction, in which the first blur prevention driving means 24 displaces the photography optical means 3, on the basis of an output of the second blur detecting means 23 so that a vibration of the photography optical means 3 can be canceled.

Even in this case, the present invention is not limited to the photography optical apparatus but may apply to an observation optical apparatus designed for observation and provided with an observation optical means for use in observing an object; such as, a telescope or binoculars.

Next, the first embodiment of the present invention will be described.

FIGS. 5, 6, 7, 8, and 9 are diagrams showing a blur prevention system in accordance with the first embodiment of the present invention. In the first embodiment, the present invention applies to a camera that is a photography apparatus for exposing film or electrically recording an object image.

Figure 5:
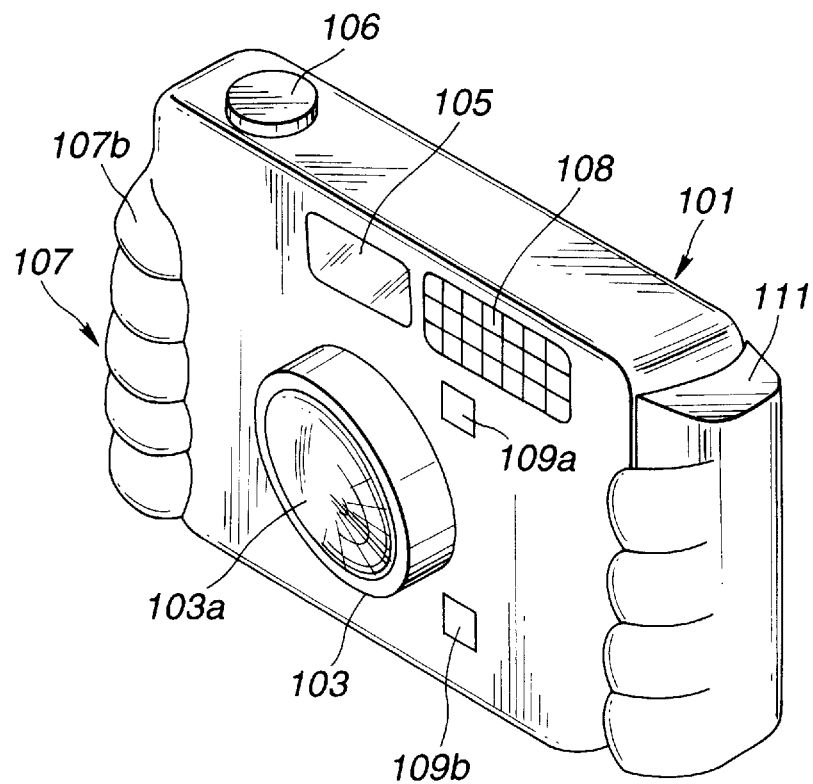
FIG. 5 is a schematic oblique view of a camera having a blur prevention system in accordance with the first embodiment of the present invention.
Figure 6:
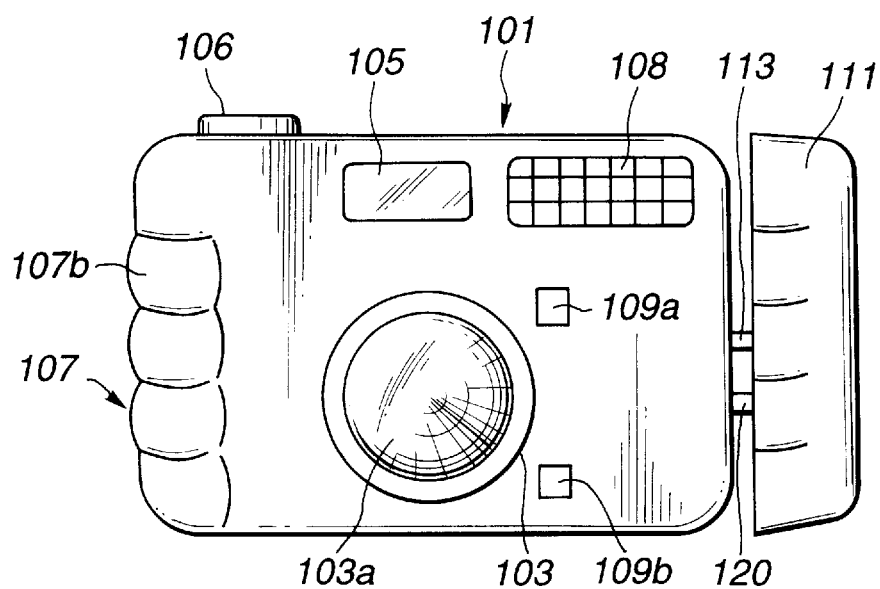
FIG. 6 is a front view of the camera shown in FIG. 5.
Figure 7:
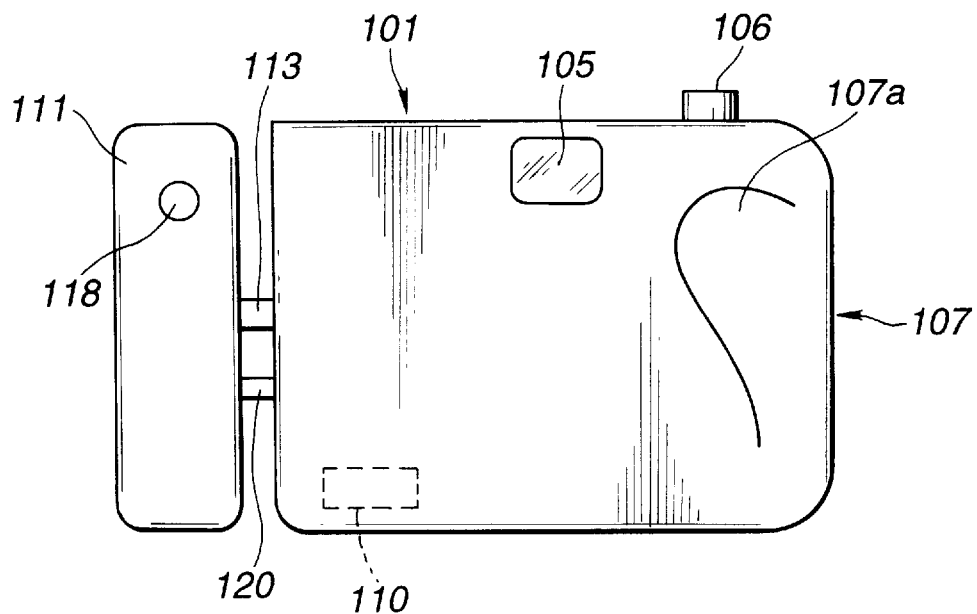
FIG. 7 is a rear view of the camera shown in FIG. 5.
Figure 8:
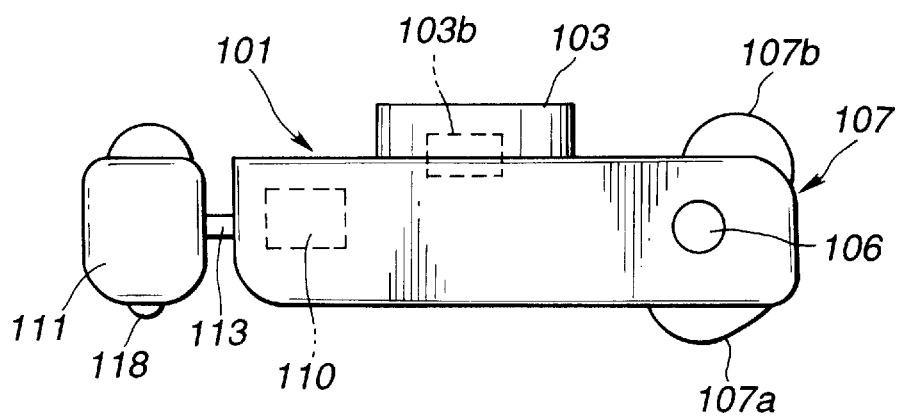
FIG. 8 is a top view of the camera shown in FIG. 5.
Figure 9:
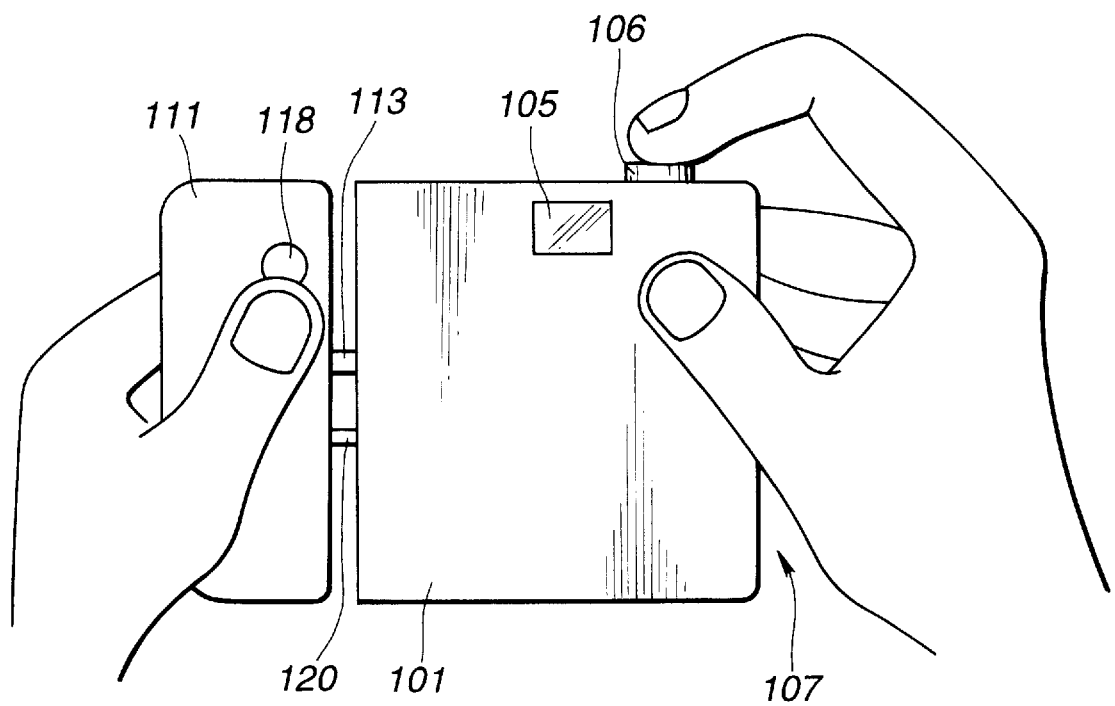
FIG. 9 is a rear view of the camera in FIG. 5 which is held with both of a photographer's both hands.

FIG. 5 is a schematic oblique view of a camera having the blur prevention system in accordance with the first embodiment, FIG. 6 is a front view of the camera, FIG. 7 is a rear view of the camera, FIG. 8 is a top view of the camera, and FIG. 9 is a rear view of the camera held with both of the photographer's hands.

As shown in FIGS. 5 to 9, a photographic lens cylinder 103 composed of a photographic lens 103a that is a photography optical system for forming an object image on a light-receiving surface of a light-receiving medium (not shown) such as a film or CCD, and a shutter unit 103b (not shown) for adjusting a magnitude of exposure is located in the center of the face of a camera body 101. The description will proceed on the assumption that the camera is a camera for exposing film to light carrying an object image. However, the same components can be adopted for a so-called electronic camera for producing an image on a CCD. The same applies to cameras employed in the subsequent embodiments.

Located near the photographic lens cylinder 103 are range-finding windows 109a and 109b constituting a range finding means (not shown). A viewfinder 105 serving as an observation optical system and viewfinder means (viewfinder) for use in checking an object image to be photographed, and a strobe unit 108 serving as an auxiliary light source used to attain proper exposure when the luminance of an object is insufficient are located in an upper area on the face of the camera body 101.

Located on an edge of the top of the camera body 101 is a release button 106 composed of a first release switch for instructing range finding and photometry prior to photography and a second release switch for instructing photography.

Furthermore, a first holding portion 107 that is a holding means composed of a finger rest (thumb rest) 107a and grip 107b on which fingers are rested for holding the camera body 101 smoothly is located on a side of the camera body 101.

When a photographer holds the camera body 101, the first holding portion 107 serves as a holding portion to be gripped with the photographer's right hand for holding the camera body 101 in a normal situation. While gripping the first holding portion 107, the photographer can manipulate the release button 106 easily.

Attached to a side of the camera body 101 opposite to the side thereof having the first holding portion 107 is a vibration-proof holding portion 111 that is a holding means (second holding portion) and vibration-proof grip. When a photographer holds the camera body 101, the vibration-proof holding portion 111 serves as a second holding portion to be gripped with the photographer's left hand for holding the camera body 101 in a normal situation. On the back of the vibration-proof holding portion 111, there is a vibration isolation switch 118 that is a button switch formed with an electrical contact switch or the like for producing a signal used to start or stop vibration isolation.

Located on the inner surface near the bottom of the camera body 101 is a blur detecting means 110 for detecting an angular speed caused by a nodding vibration of the camera body 101 (magnitude of trembling).

The vibration-proof holding portion 111 is linked to the camera body 101 by a vibration-proof drive shaft 113. A power lead over which power is supplied to the vibration-proof holding portion 111, and a signal line 120 over which an angular speed signal is sent from the blur detecting means 110 to the vibration-proof holding portion 111 are routed between the vibration-proof holding portion 111 and camera body 101.

The basic operations of the camera in accordance with the first embodiment having the foregoing components for photography will be described briefly.

First, when the main power supply of the camera body 101 is turned on, power is supplied to electrical circuit blocks in the camera body 101 and vibration-proof holding portion 111. When a photographer presses the release button 106 halfway (turns on the first release switch), the camera body 101 starts range finding and photometry. Based on the results, the photographic lens 103a in the photographic lens cylinder 103 is moved to a proper position. After focusing is carried out, the shutter unit 103b is operated to carry out exposure. When exposure by the shutter unit 103b is completed, a film feeder (not shown) winds up the film by one frame as part of preparations for projection of the next frame. If the photography involves the last frame, the film feeder rewinds the film.

Next, the blur prevention system (vibration-proof holding portion 111) for a camera in accordance with the first embodiment will be described.

Figure 10:
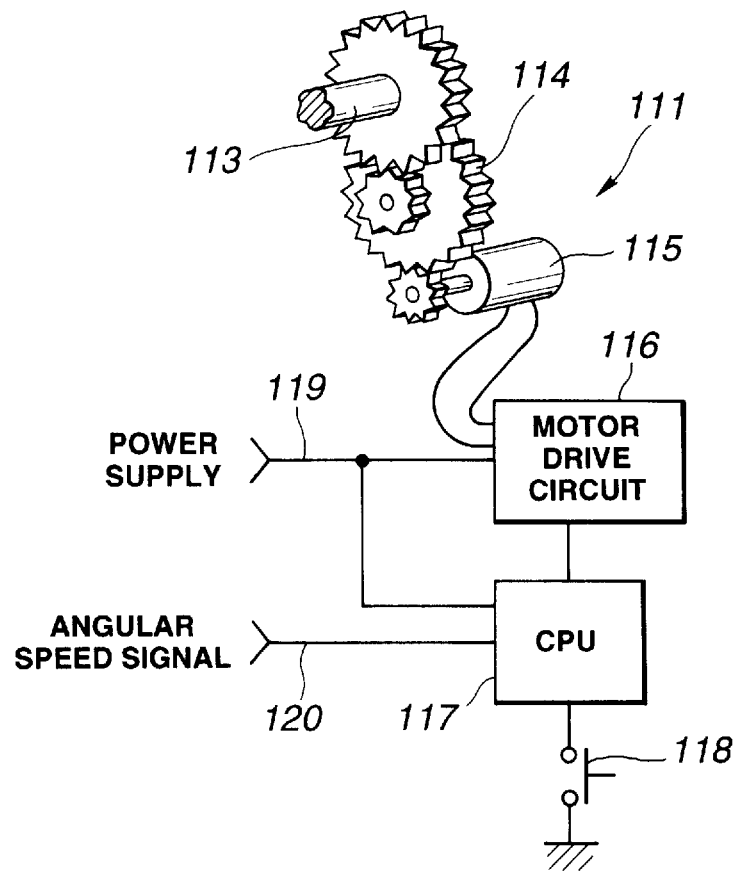
FIG. 10 is a conceptual diagram showing an internal mechanism of the blur prevention system (vibration-proof holding portion) of the camera shown in FIG. 5.
Figure 11:
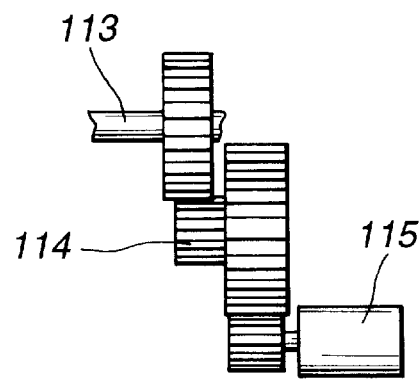
FIG. 11 is a schematic diagram showing an engaged state of gears in the internal mechanism of the vibration-proof holding portion shown in FIG. 10.
Figure 12:
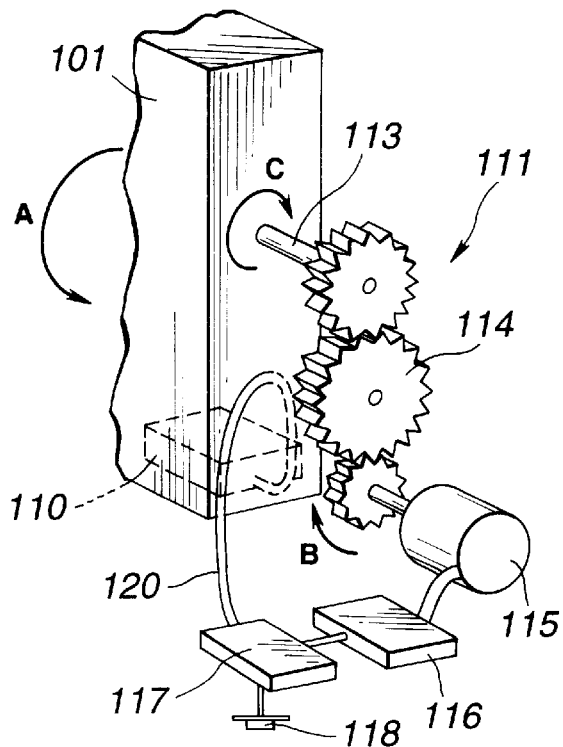
FIG. 12 is a schematic oblique view showing the internal mechanism of the vibration-proof holding portion shown in FIG. 10 more particularly.

FIGS. 10, 11, and 12 are diagrams showing the internal structure of the vibration-proof holding portion 111 for a camera in accordance with the first embodiment. FIG. 10 is a conceptual diagram showing only the internal mechanism of the vibration-proof holding portion 111, and FIG. 11 schematically shows an engaged state of gears in the internal mechanism. FIG. 12 is a schematic oblique view showing the internal mechanism shown in FIG. 10 more particularly.

As shown in FIGS. 10, 11, and 12, the vibration-proof holding portion 111 includes a blur prevention driving means having a driving mechanism for displacing the camera body 101 relative to the vibration-proof holding portion 111.

Specifically, a vibration-proof drive motor 115 is included in the vibration-proof holding portion 111. Vibration isolation is carried out with a rotational driving force exerted by the vibration-proof drive motor 115.

A pinion gear is fixed to the axis of rotation of the vibration-proof drive motor 115. A large-diameter gear of a reduction gear (two-speed gear) 114 is meshed with the pinion gear. A gear fixed to a vibration-proof drive shaft 113 for linking the vibration-proof holding portion 111 and camera body 101 is meshed with a small-diameter gear of the reduction gear 114. The vibration-proof drive shaft 113 is fixed to a side of the camera body 101 and is a shaft member for conveying a rotational driving force of the vibration-proof drive motor 115 to the camera body 101.

In FIGS. 10 and 11, the reduction gear 114 is a two-speed gear. As long as a rotational driving force exerted by the vibration-proof drive motor 115 can be reduced in speed and conveyed to the vibration-proof drive shaft 113, the reduction gear is not limited to the two-speed gear but may be, for example, a spur gear as shown in FIG. 12. Otherwise, a plurality of gears may be used to construct a gear train.

A motor drive circuit 116 that is a so-called bridge circuit is electrically connected to the vibration-proof drive motor 115. A CPU 117 that is a control circuit for vibration isolation and formed with a so-called microcomputer is connected to the motor drive circuit 116.

The blur detecting means 110 incorporated in the camera body 101 is electrically connected to the CPU 117 over the angular speed signal line 120. An angular speed signal indicating an angular speed of the camera body 101 detected by the blur detecting means 110 is transmitted to the CPU 117. In response to the angular speed signal sent from the blur detecting means 110, the CPU 117 controls rotational drive of the vibration-proof drive motor 115 using the motor drive circuit 116 so that the angular speed of the camera body 101 indicated by the angular speed signal will be null.

The main power supply is connected to the motor drive circuit 116 and CPU 117 over the lead 119, whereby power is supplied to the motor drive circuit 116 and CPU 117. The main power supply for supplying power to the whole of the camera body 101 may be used in common. Alternatively, another power supply may be included in the vibration-proof holding portion 111.

A vibration isolation switch 118 formed with a electrical contact switch or the like grounded onto the vibration-proof holding portion 111 is electrically connected to the CPU 117. With the on-off operation of the vibration isolation switch 118, the CPU 117 starts or stops giving control for vibration isolation.

Figure 13:
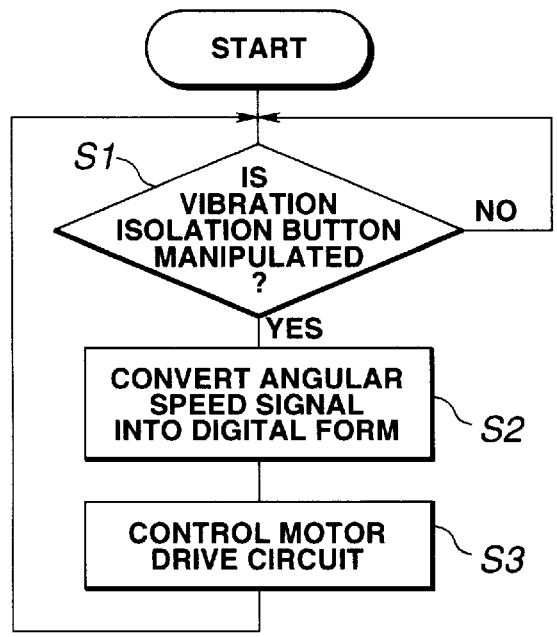
FIG. 13 is a flowchart describing a control flow for the operations of the vibration-proof holding portion shown in FIG. 10.

FIG. 13 is a flowchart briefly describing a control flow for the operations of the vibration-proof holding portion 111 of the camera body 101 in accordance with the first embodiment. As described in FIG. 13, first, at step S1, the CPU 117 checks if the vibration isolation switch (button) 118 has been manipulated, that is, a vibration isolation start signal has been produced. If the CPU 117 judges that the vibration isolation switch 118 has been manipulated, that is, turned on, and that a vibration isolation start signal has been produced, control is passed to step S2. At step S2, the CPU 117 receives an angular speed signal (analog value) from the blur detecting means 110 in the camera body 101. Assuming that a vibration causing an angular speed in a direction of arrow A in FIG. 12 occurs in the camera body 101, the CPU 117 instructs an A/D converter (not shown) incorporated in an IC chip to convert an angular speed signal received from the blur detecting means 110 into a digital form so that the signal can be processed by the CPU 117 (A/D conversion). Thus, the CPU 117 identifies the angular speed signal indicating the angular speed in the direction of arrow A in FIG. 12.

At step S3, based on the digitized angular speed signal, the CPU 117 controls the vibration-proof drive motor 115 using the motor drive circuit, and thus causes the vibration-proof drive motor 115 to generate a rotational driving force in a direction opposite to the direction of arrow A or a direction in which the vibration is canceled.

Specifically, the vibration-proof drive motor 115 is driven to rotate in a direction of arrow B in FIG. 12. The rotational driving force is reduced in speed and energized by the reduction gear 114, thus causing the vibration-proof drive shaft 113 to rotate in a direction of arrow C, that is, a direction opposite to the direction of arrow A in FIG. 12. Thereafter, control is returned to step S1. Thus, the vibration (torque) in the direction of arrow A in FIG. 12 is canceled with the rotational driving force exerted in the direction of arrow C in FIG. 12 by the vibration-proof drive motor 115. Eventually, the rotation of the camera body 115 is suppressed.

While the vibration isolation switch 118 is held down, the vibration isolation (processing of steps S1 to S3) is carried out continuously.

If it is found at step S1 that the vibration isolation switch (button) 118 has not been manipulated, that is, the vibration isolation switch 118 has been turned off, the operations for vibration isolation are not carried out. A normal sequence for photography is carried out.

An angular speed occurring in the camera body 101 changes time-passingly. Every time the angular speed changes, the angular speed is detected by the blur detecting means 110. Vibration isolation based on each detected value is repeated. A vibration of the camera body 101 is therefore suppressed continuously and isolated efficiently.

As described above, according to the first embodiment, the camera body 101 itself is rotated in a direction in which a tremble is canceled by controlling the operations of the vibration-proof holding portion 111 on the basis of a detected value provided by the blur detecting means 110. Vibration isolation can therefore be achieved more effectively. Consequently, an image produced by photography carried out in the camera body 101 is devoid of a blur and enjoys good quality.

Moreover, the viewfinder optical system different from the photography optical system is included as part of the camera body 101. Since the camera body 101 itself is moved to isolate vibrations, even when an object image is checked through the viewfinder optical system, the image observed through the viewfinder optical system can be prevented from blurring at the same time. This results in a better view and contributes to improvement of maneuverability of a camera itself.

The component members of an optical system used for photometry and range finding, that is, a range finding means including the range finding windows 109a and 10b, the component members of the viewfinder 105, and the component members of the photographic lens 103 are arranged on the face of the camera body 101 so that the directions of the optical axes of the range finding means, viewfinder, and photographic lens will be substantially coincident with one another. Therefore, when the camera body 101 itself is moved to isolate vibrations, vibration isolation takes effect on all the optical systems. It will therefore not take place that a displacement or the like occurs in an object image to be formed on the light-receiving surface of a film or the like.

Next, a blur prevention system for an optical apparatus in accordance with the second embodiment of the present invention will be described below. Even in the second embodiment, the blur prevention system is implemented in a camera that is a photography apparatus. The camera employed in the second embodiment has fundamentally the same components as that employed in the first embodiment. However, a difference lies in a point that the first holding portion formed as part of the camera body 101 in the first embodiment is constructed as a vibration-proof grip in the second embodiment. The same reference numerals will be assigned to the component members identical to those in the first embodiment. The description of the component members will be omitted. Different members alone will be described.

Figure 14:
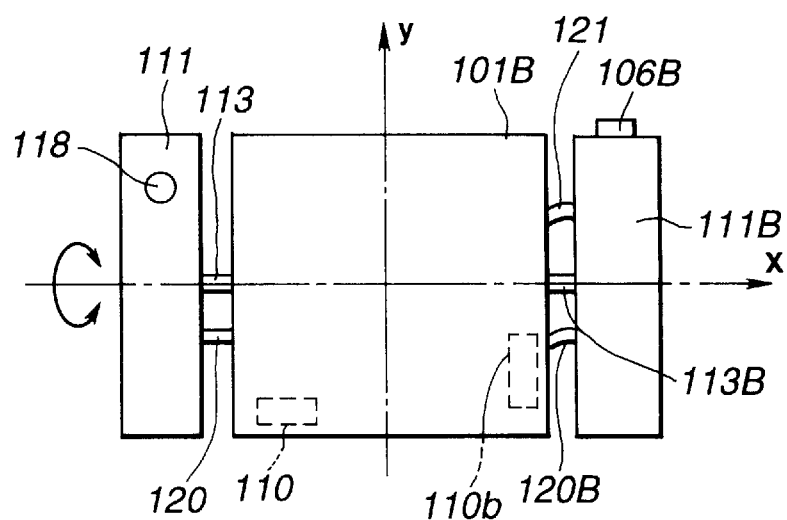
FIG. 14 is a rear view of a camera having a blur prevention system in accordance with the second embodiment of the present invention.
Figure 15:
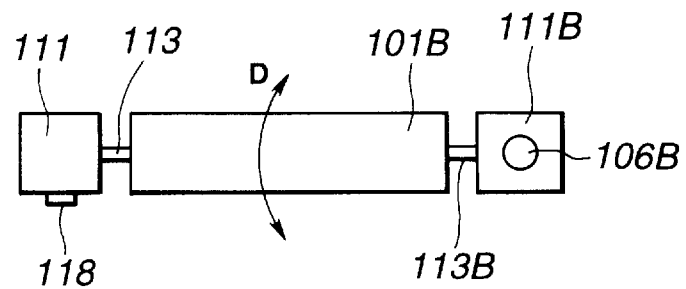
FIG. 15 is a top view of the camera shown in FIG. 14.

FIGS. 14 and 15 are diagrams showing a camera having a blur prevention system in accordance with the second embodiment of the present invention. FIG. 14 is a back view of the camera, and FIG. 15 is a top view of the camera.

As shown in FIGS. 14 and 15, the camera in the second embodiment comprises a camera body 101B, a first vibration-proof holding portion 111 to be gripped with a left hand for holding the camera, and a second vibration-proof holding portion 111B to be gripped with a right hand.

The camera body 101B and first vibration-proof holding portion 111 are, like those in the first embodiment, linked by the first vibration-proof drive shaft 113 secured to the camera body 101B. The first blur detecting means 110 in the camera body 101B is electrically connected to the CPU 117 (not shown) (See FIGS. 10 and 12) in the first vibration-proof holding portion 111 over the angular speed signal line 120.

Likewise, the camera body 101B and second vibration-proof holding portion 111B are linked by a second vibration-proof drive shaft 113B secured to the camera body 101B. A second blur detecting means 110b in the camera body 101B is electrically connected to a CPU (not shown) (See FIGS. 10 and 12) in the second vibration-proof holding portion 111B over an angular speed signal line 120B.

The first blur detecting means 110 is a detecting means for detecting an angular speed caused by a rotation about the x axis shown in FIG. 14 or a nodding vibration of the camera (oscillation in a vertical direction relative to the x axis). The second blur detecting means 110b is a detecting means for detecting an angular speed caused by a rotation about the y axis in FIG. 14 or a yawing vibration of the camera (oscillation in a horizontal direction relative to the x axis or oscillation in a vertical direction relative to the y axis).

A release button 106B is located on the top of the second vibration-proof holding portion 111B. The release button 106B has the same function as the release button 106 located on the top of the camera body 101 in the first embodiment, and is, as mentioned above, composed of two switches; a first release switch for instructing range finding and photometry prior to photography and a second release switch for instructing photography. A signal produced by manipulating the release button 106B is transmitted to a control circuit (not shown) in the camera body 101B over a release signal line 121.

The vibration isolation switch 118 that is a button switch for instructing start or stop of vibration isolation is, like the one of the camera in the first embodiment, located solely on the first vibration-proof holding portion 111. A control signal is transmitted to the first and second vibration-proof holding portions 111 and 111B responsively to the on-off operation of the vibration isolation switch 118.

Figure 16:
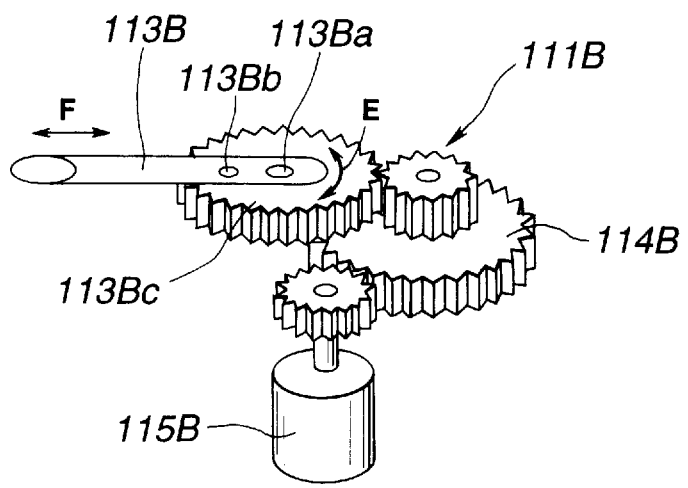
FIG. 16 is a schematic oblique view showing an internal mechanism of the blur prevention system (second vibration-proof holding portion) of the camera shown in FIG. 14.

FIG. 16 is a schematic oblique view showing only an internal mechanism of the blur prevention system for a camera (second vibration-proof holding portion 111B).

The second vibration-proof holding portion 111B includes, as shown in FIG. 16, a second vibration-proof drive motor 115B. With a rotational driving force exerted by the second vibration-proof drive motor 115B, as mentioned above, vibration isolation is carried out to cope with a rotational vibration about the y axis shown in FIG. 14.

The axis of rotation of the second vibration-proof drive motor 115B is placed in a direction corresponding to the y-axis direction in FIG. 14. A pinion gear is secured to the distal end of the axis of rotation. A large-diameter gear of a reduction (two-speed) gear 114B is meshed with the pinion gear, and a gear 113Bc secured to the second vibration-proof drive shaft 113B is meshed with a small-diameter gear of the reduction gear 114B. The second vibration-proof drive shaft 113B has one end thereof secured to the camera body 101 as mentioned above, and has the other end thereof attached to a center of rotation 113Ba of a gear 113Bc so that the second vibration-proof drive shaft can slide freely on a plane on which the gear 113Bc rotates. The other end of the vibration-proof drive shaft is also attached to a point 113Bb on the contact surface of the gear 113Bc using a pin or the like. Thus, a rotational driving force exerted by the second vibration-proof drive motor 115B is conveyed to the camera body 101.

In the second vibration-proof holding portion 111b having the foregoing components, when the second vibration-proof drive motor 115B is driven to rotate, the second vibration-proof drive shaft 113B is rotated on the plane, on which the gear 113Bc rotates, along a circle whose radius corresponds to a double of a distance between the point 113Bb on the contact surface of the gear 113Bc and the center of rotation 113Ba (in a direction of arrow E in FIG. 16). At the same time, the second vibration-proof drive shaft 113B is displaced in a direction of arrow F in FIG. 16 in units of a distance equivalent to the diameter of the circle. Thus, the camera body 101B is displaced in a direction of arrow D in FIG. 15.

As mentioned above, according to the second embodiment, when the vibration isolation switch 118 is on, the first and second blur detecting means 110 and 110b carry out detection to detect vibrations occurring about the x axis and y axis of the camera body 101B of the camera respectively. Based on the results of the detection, the first and second vibration-proof holding portions 111 and 111b operate to cause the camera body 101B to vibrate in directions in which applied trembles are canceled. Thus, vibration isolation is achieved. That is to say, the first vibration-proof holding portion 111 isolates a nodding vibration of the camera, and the second vibration-proof holding portion 111B isolates a yawing vibration thereof. Vibrations occurring in two directions are isolated simultaneously. Eventually, vibration isolation can be achieved more effectively.

In the second embodiment, the control circuit (CPU) for vibration isolation is installed in each of the first and second vibration-proof holding portions 111 and 111B. Alternatively, the control circuit (CPU) may be installed in either of the first and second vibration-proof holding portions 111 and 111B. Thus, a sole CPU may be used to control bidirectional vibration isolation. In this case, the number of signal lines to be routed will increase a bit for linking the CPU and the motor drive circuits in the vibration-proof holding portions. However, since only one expensive CPU is mounted, the cost of the whole apparatus can be reduced.

Furthermore, the CPUs for vibration isolation incorporated in the vibration-proof holding portions may be disposed of, and the main control circuit (main CPU) incorporated in the camera body 101B for controlling the entire camera may be designed to control even the operations for vibration isolation.

A control sequence may be such that a vibration isolation start signal is, like the one in the first and second embodiments, produced when the vibration isolation switch 118 is pressed (turned on) and a vibration isolation stop signal is produced automatically responsively to the completion of exposure executed with a press of the release button 106. The adoption of the control sequence can prevent such an accident or mistake that since an operator forgets pressing the vibration isolation switch 118, a vibration isolation stop signal is not produced, vibration isolation continues, an unnecessary power consumption increases, and a battery is worn out. This makes it possible to carry out vibration isolation only when vibration isolation is needed (for example, when photography is carried out). Consequently, unnecessary power consumption can be decreased readily. Thus, the blur prevention system can be designed to contribute to power saving of the main power supply.

Furthermore, the members involved in vibration isolation, such as, the vibration-proof drive motor in the first and second embodiments may be installed in the camera body.

Figure 17:
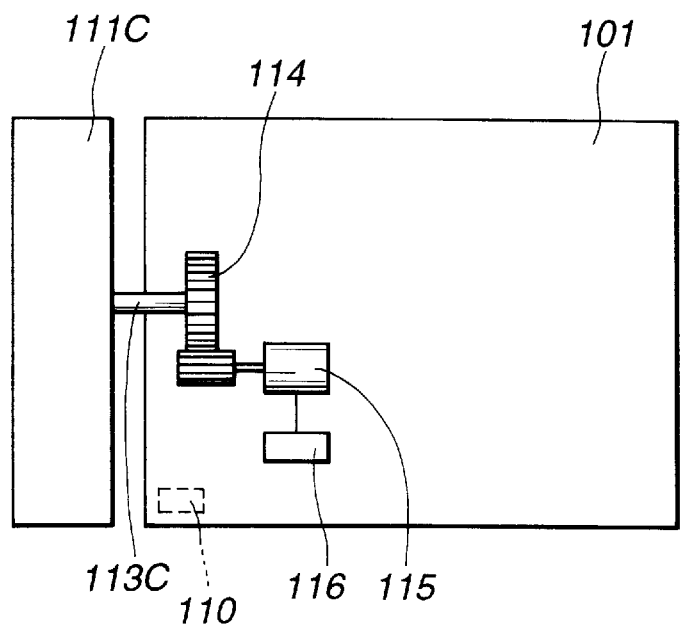
FIG. 17 is a rear view showing an internal structure of a camera employed in a variant of the first and second embodiments.

FIG. 17 is a diagram showing a variant of the first and second embodiments, and a rear view of a camera having the members involved in vibration isolation, such as, the vibration-proof drive motor 115, motor drive circuit 116, and reduction gear 114 are installed in the camera body 101. Among the component members of the camera in this embodiment, major members alone are shown in order to avoid making the drawing congested. For the members not shown, see FIGS. 12 and 16.

As shown in FIG. 17, a vibration-proof drive shaft 113C is fixed to a first vibration-proof holding portion 111C. The reduction gear 114 is secured to the vibration-proof drive shaft 113C. The pinion gear secured to the axis of rotation of the vibration-proof drive motor 115 is meshed with the reduction gear 114. Owing to this structure, a rotational driving force exerted by the vibration-proof drive motor 115 is conveyed to the first vibration-proof holding portion 111C via the reduction gear 114 over the vibration-proof drive shaft 113C.

The camera body 101 and first vibration-proof holding portion 111C are linked by the vibration-proof drive shaft 113C. The camera body 101 can be rotated relative to the first vibration-proof holding portion 111C.

Owing the foregoing structure, when the first vibration-proof holding portion 111C is gripped with a left hand, if a tremble or the like occurs, the blur detecting means 110 in the camera body 101 detects the tremble. Based on the result of the detection, the CPU (not shown) instructs the motor drive circuit 116 to drive the vibration-proof drive motor 115. Thus, the first vibration-proof holding portion 111C is driven by the camera body 101 in a direction in which a vibration derived from the tremble or the like is canceled.

At this time, the first vibration-proof holding portion 111C is gripped with the left hand of an operator. As a result, a rotational driving force exerted by the vibration-proof drive motor 115 isolates the camera body 101 from the vibration.

Referring to FIG. 17, the first vibration-proof holding portion 111C alone is described in the same manner as that in the first embodiment. The members used to drive a second vibration-proof holding portion may be, like those in the second embodiment, placed in the camera body 101, and then the second vibration-proof holding portion may be driven. In this case, the same advantages as those provided by the second embodiment can be provided.

Furthermore, the main power supply may also be placed in a vibration-proof holding portion of the camera employed in the variant.

Figure 18:
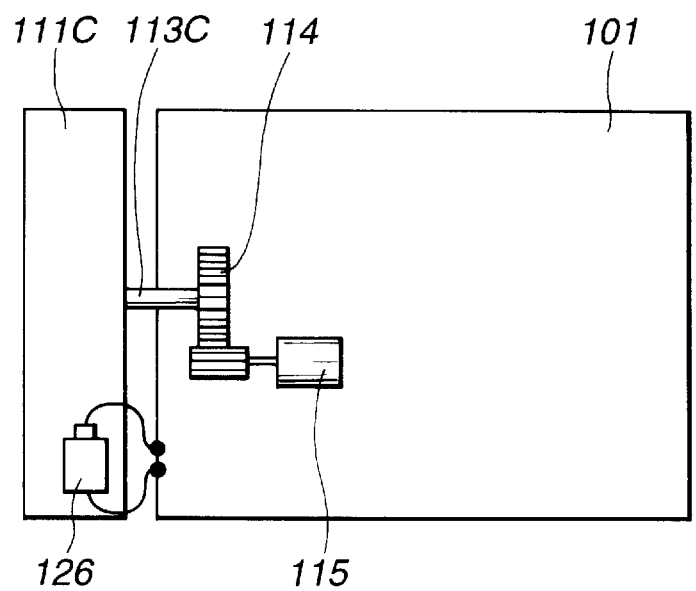
FIG. 18 is a rear view showing an internal structure of a camera employed in another variant of the first and second embodiments.

FIG. 18 is a diagram showing another variant of the first and second embodiments, and is a rear view of a camera having the main power supply 126 placed in the first vibration-proof holding portion. Among the component members of the camera in this variant, like the aforesaid variant, only major members are shown in order to avoid making the drawing congested. The other members are omitted. For the members not shown, see FIGS. 12 and 16.

As shown in FIG. 18, the main power supply 126 is located in the first vibration-proof holding portion 111C and is electrically connected to the camera body 101 over a lead. The other component members are arranged in the same manner as those in the aforesaid variant.

According to this structure, the main power supply 126 occupying a large space in the camera body 101 is located in the vibration-proof holding portion 111C. The structure can therefore contribute to a more compact design of the camera body 101 itself. Moreover, since the vibration-proof holding portion 111C can be made somewhat heavy, an inertial weight arising when the vibration-proof holding portion 111C is driven for vibration isolation increases. Eventually, a proper effect of vibration isolation can be exerted.

Members that can be placed in the vibration-proof holding portion 111C include, in addition to the main power supply 126, members other than those not involved in photography or observation of an object image or those whose positions are determined in terms of photography (for example, members involved in film feed), that is, a main capacitor for a strobe, various electrical circuits, and a display means.

Next, a blur prevention system for an optical apparatus in accordance with the third embodiment of the present invention will be described. Even in the third embodiment, the blur prevention system is implemented in a camera that is a photography apparatus. The blur prevention system in accordance with the third embodiment is designed so that a sole vibration-proof holding portion is used to prevent vibrations occurring in two axial directions of the camera.

To be more specific, for preventing vibrations occurring in two axial directions using a sole vibration-proof holding portion, presumably, a mechanism for preventing a vibration occurring in one axial direction is placed in two layers in the same manner as, for example, a technical means disclosed in the Japanese Unexamined Patent Publication No. 61-150580. In the third embodiment, like the second embodiment, two vibration-proof driving means (in the second embodiment, two vibration-proof axes) carry out vibration isolation directly and actively for the camera body. Consequently, a compact design is realized.

Figure 19:
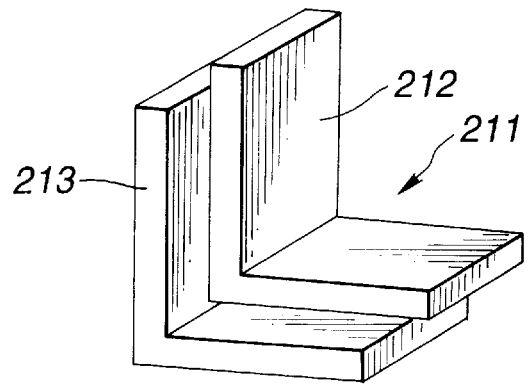
FIG. 19 is an oblique view showing the basic components of a blur prevention unit included in a blur prevention system in accordance with the third embodiment of the present invention.
Figure 20:
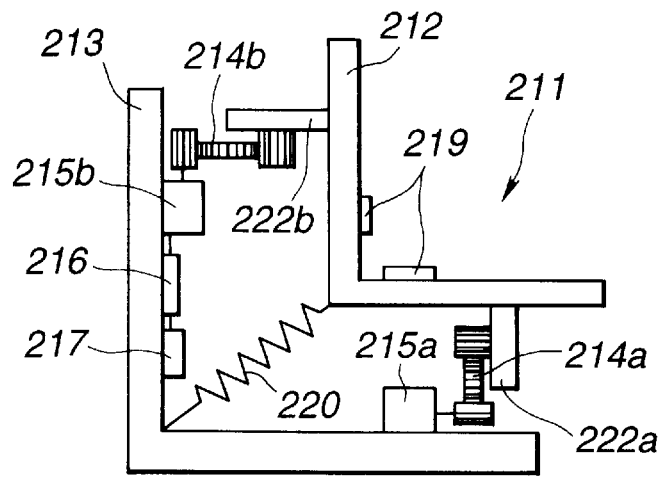
FIG. 20 is a front view showing the internal components of the blur prevention unit included in the blur prevention system in accordance with the third embodiment of the present invention.
Figure 21:
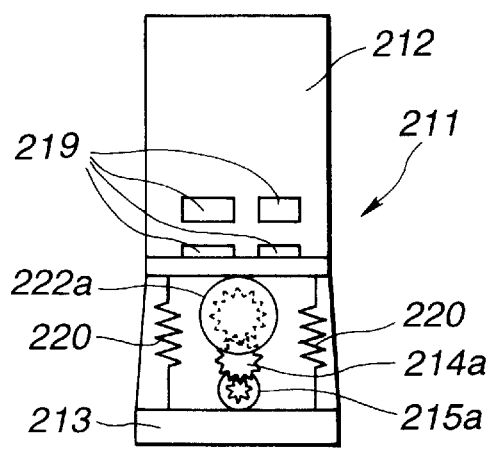
FIG. 21 is a side view showing an internal mechanism of the blur prevention unit shown in FIG. 20.
Figure 22:
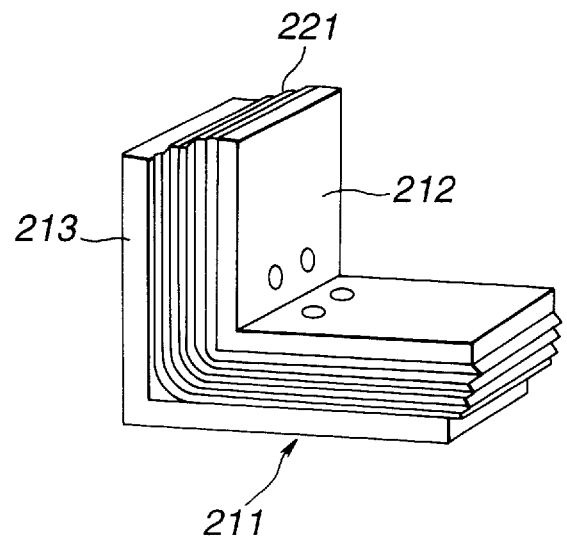
FIG. 22 is a schematic oblique view showing the appearance of the blur prevention unit shown in FIG. 20.
Figure 23:
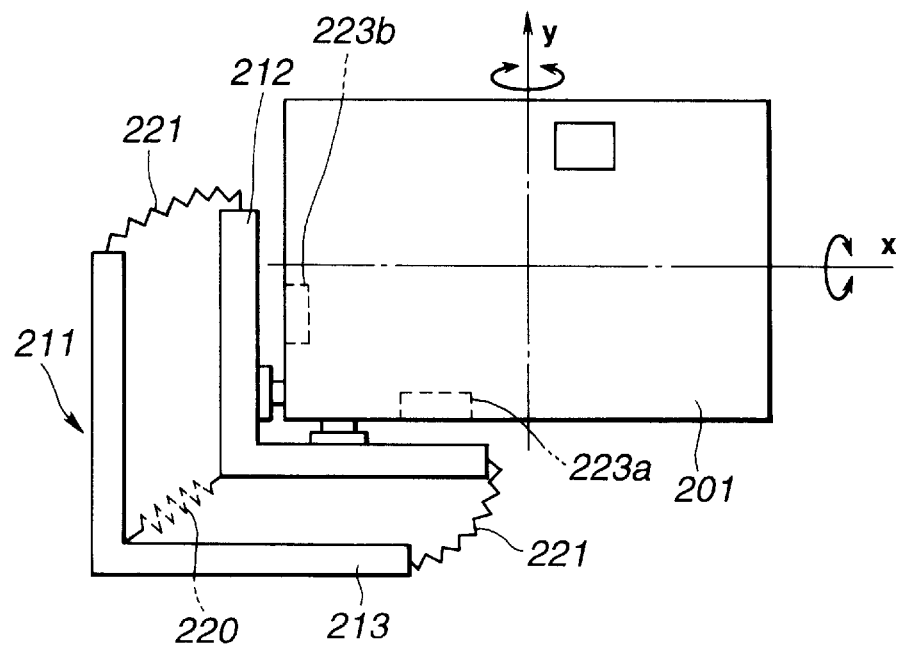
FIG. 23 is a back view of the camera with the blur prevention unit shown in FIG. 20 attached thereto.
Figure 24:
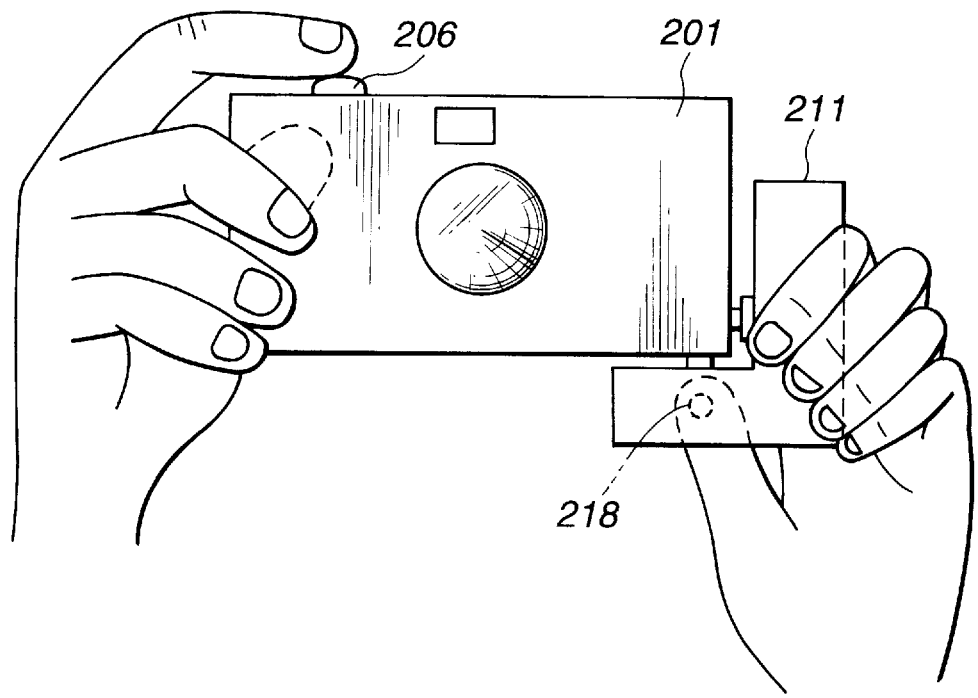
FIG. 24 is a front view of the camera held with both of the operator's hands with the blur prevention unit shown in FIG. 20 attached thereto.

FIGS. 19, 20, 21, 22, 23, and 24 are diagrams showing a blur prevention unit included in the blur prevention system of the third embodiment of the present invention. FIG. 19 is an oblique view showing the basic components of the blur prevention unit included in the blur prevention system, FIGS. 20 and 21 are front and side views schematically showing the internal components of the blur prevention unit, FIG. 22 is a schematic oblique view showing the appearance of the blur prevention unit, FIG. 23 is a rear view of a camera to which the blur prevention unit is attached, and FIG. 24 is a front view of the camera having the blur prevention unit attached thereto in a state in which the camera is held by both of the operator's hands.

As shown in FIGS. 19 to 22, the basic components of a blur prevention adaptor 211 that is the blur prevention unit included in the blur prevention system of the third embodiment are an attachment stage 212 and base member 213 that are two L-shaped members, a bellows-like member 221 placed to fill the space between the attachment stage 212 and base member 213.

The blur prevention adaptor 211 is, as shown in FIGS. 23 and 24, attached to a camera 201 freely detachably.

Inside the blur prevention adaptor 211, as shown in FIGS. 20 and 21, a motor 215a that is a power source is located on a long-side portion of the base member 213 while being oriented inward, a pinion gear is secured to the axis of rotation of the motor 215a, and a reduction gear 214a for energizing a driving force exerted by the motor 215a is meshed with the pinion gear. The reduction gear 214a is meshed with a gear united with a roller 222a. Thus, a driving force exerted by the motor 215a is conveyed to the roller 222a.

The roller 222a is located to abut on the bottom of a long-side portion of the attachment stage 212. When the motor 215a is driven to rotate, the roller 222a drives the attachment stage 212 in a direction of rotation with the x axis shown in FIG. 23 as a center.

A motor 215b that is a power source is located on an upright-side portion of the base member 213, that is, a portion of the base member 213 orthogonal to the long-side portion of the base member 213. A pinion gear is secured to the axis of rotation of the motor 215b. A reduction gear 214b for energizing a driving force exerted by the motor 215b is meshed with the pinion gear. The reduction gear 214b is meshed with a gear united with a roller 222b. Thus, a driving force exerted by the motor 215b is conveyed to the roller 222b.

The roller 222b is located to abut on the inner wall of the upright-side portion of the attachment stage 212. When the motor 215b is driven to rotate, the roller 222b drives the attachment stage 212 in a direction of rotation with the y axis shown in FIG. 23 as a center.

Placed on the upright-side portion of the base member 213 are a motor drive circuit 216 that is a so-called bridge circuit for supplying power to the motors 215a and 215b, starting or stopping the motors 215a and 215b, and controlling directions of rotation of the motors 215a and 215b, and a control circuit 217 for vibration isolation composed of a microcomputer and CPU for controlling the motor drive circuit 216.

Electrical contacts 219 (to be detailed later) are connected to the control circuit for vibration isolation 217. Blur signals indicating trembles in two directions detected by first and second blur detecting means 223a and 223b (which will be detailed later) (See FIG. 23) in a camera body 201 are input to the control circuit for vibration isolation 217 via the electrical contacts 219.

Furthermore, the vibration isolation switch 218 (See FIG. 24) for producing an instruction signal for instructing start or stop of drive for blur prevention is electrically connected to the control circuit for vibration isolation 217. The instruction signal for instructing start or stop of drive for blur prevention, which is produced by the vibration isolation switch 218, is input to the control circuit for vibration isolation 217. A wiring for electrically interconnecting the members is not shown in order to avoid making the drawing congested.

Opposite ends of two taut constraining springs 220 are respectively attached to the attachment stage 212 and base member 213, whereby the attachment stage 212 and base member 213 are constrained to move in directions in which they are attracted to each other. The arms of the attachment stage 212 are therefore pressed against the two rollers 222a and 222b with a proper force, whereby the positions of the attachment stage 212 and base member 213 are restricted. Besides, the rollers 222a and 222b can displace the attachment stage 212 but will not slide when rotated.

When at least one of the contact surfaces of the rollers 222a and 222b, and the inner surface (contact surface) of the attachment stage 212 is coated with a material exhibiting a large friction factor, for example, rubber, rotational slides of the rollers 222a and 222b can be prevented more effectively.

The bellows-like member 221 is, as mentioned above, interposed between the attachment stage 212 and base member 213 in order to prevent invasion of dust or the like and to enable the attachment stage 212 to make a displacement freely. The attachment stage 212 and base member 213 are linked by the bellows-like member.

By the way, the camera 201, like the camera body 101 employed in the first and second embodiments, includes basic components needed for a camera. A first blur detecting means 223a that is a detecting means for detecting an angular speed caused by a rotation about the x axis shown in FIG. 23 or a nodding vibration of the camera (oscillation in a vertical direction relative to the x axis), and a second blur detecting means 223b that is a detecting means for detecting an angular speed caused by a rotation about the y axis shown in FIG. 23 or a yawing vibration of the camera (oscillation in a horizontal direction relative to the x axis, that is, oscillation in a vertical direction relative to the y axis) are incorporated in the camera 201.

As mentioned above, the camera 201 and blur prevention adaptor 211 are coupled with each other on the stage 212. In this case, the camera and blur prevention adaptor may be coupled firmly with each other using a screw for a tripod. The contact surface of the stage 212 to be in contact with the bottom of the camera 301 may be finished not to cause a slide. For use, both the surfaces may be brought into contact with each other and pressed to each other.

The camera 201 and stage 212 each have the electrical contacts 219. When the electrical contacts 219 come into contact with one another with the blur prevention adaptor 211 attached to the camera 201, electrical signals, for example, blur signals provided by the first and second blur detecting means 223a and 223b, or power is supplied from the camera 201 to the blur prevention adaptor 211.

The operations of the blur prevention adaptor 211 having the foregoing components are identical to those in the second embodiment.

In short, photography is carried out with the blur prevention adaptor 211 attached to the camera 201. In this case, a photographer grips the camera 301 with, for example, his/her right hand as shown in FIG. 24, manipulates the release button 206 located on the top of the camera 201, and thus carries out photography.

By the way, the photographers left hand grips the camera body 201 via the blur prevention adaptor 211. At this time, the vibration isolation switch 218 of the blur prevention adaptor 211 is pressed if necessary in order to turn on the blur prevention adaptor 211. When the blur prevention adaptor 211 is on, the blur prevention system 211 is in operation. Vibration isolation for minimizing the adverse effect of a tremble of the camera 201 is repeated.

With the operations of the blur prevention system in accordance with the second embodiment, the two vibration-proof drive motors are used to rotate the two vibration-proof drive shafts in order to displace the camera body. In the blur prevention adaptor 211 of the third embodiment, the two rollers 222a and 222b are driven to rotate by the two vibration-proof drive motors 215a and 215b in order to displace the stage 212 abutting on the rollers 222a and 222b. Thus, the camera body 201 is displaced in two directions.

As described above, according to the third embodiment, once the blur prevention adaptor 211 is attached to the camera 201, as long as the blur prevention adaptor 211 is in operation, a tremble of a light beam transmitted by the photographic lens for forming an object image on the light-receiving surface of film or the like and a tremble of a light beam transmitted through the viewfinder for enabling a photographer to check an object image can be minimized with the compact structure without a difference from a sense of maneuverability of a conventional typical camera.

In the third embodiment, an instruction signal for instructing start or stop of vibration isolation is produced by manipulating the vibration isolation switch 218. Alternatively, for example, the vibration isolation switch may be located on the stage 212. The blur prevention adaptor may be designed so that the camera 201 is pressed to the stage 212 for photography. With the movement carried out for photography, that is, the press of the camera 201 to the stage 212, the vibration isolation switch is pressed and turned on automatically. A photographer need not be aware of pressing the vibration isolation switch so as to activate vibration isolation but should merely start an action of photography. Thus, vibration isolation can be activated for photography. This contributes to improvement of maneuverability.

In the third embodiment, the first and second blur detecting means 223a and 223b are incorporated in the camera 201. Alternatively, the first and second blur detecting means may be incorporated in, for example, the blur prevention adaptor 211. In this case, the power supply used to drive the vibration-proof drive motors 215a and 215b designed for vibration isolation is provided as a circuit different from the main power supply in the camera 201, and included independently in the blur prevention adaptor 211. Thus, the electrical contacts 219 for transferring signals between the camera 201 and the blur prevention adaptor 211 can be simplified.

When the blur prevention adaptor 211 is thus composed of an independent mechanism and circuit, it becomes unnecessary to include special component members dedicated to vibration isolation in the camera 201. Once the blur prevention adaptor 211 is attached to a photography apparatus such as a typical camera, a satisfactory effect of vibration isolation can be provided. This results in a general-purpose blur prevention system. Furthermore, the blur prevention system is not limited to the photography apparatus such as a camera but may also be easily implemented in an observation optical apparatus, for example, a telescope or binoculars. Thus, the blur prevention adaptor can be used for diverse purposes.

In the third embodiment, the blur prevention adaptor 211 is freely detachably attached to the camera 201. A blur prevention unit having the same mechanism as the blur prevention adaptor 211 may be incorporated in the camera body.

Figure 25:
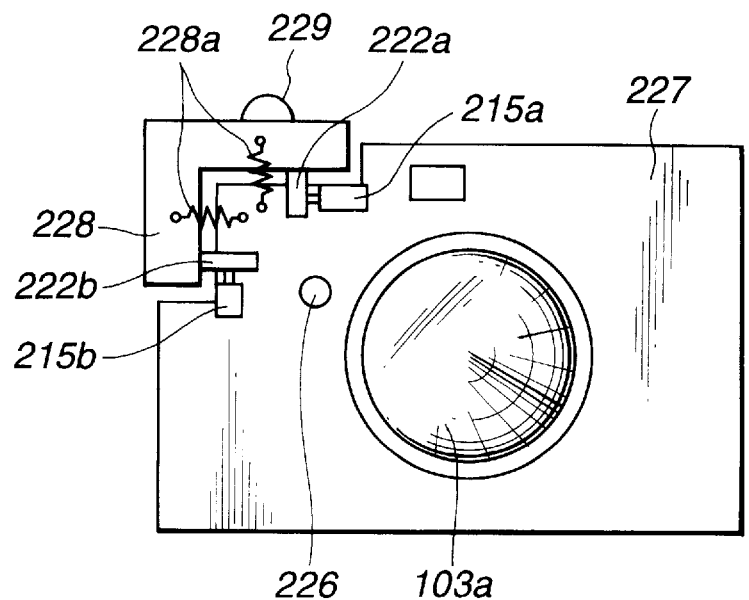
FIG. 25 is a front view of a camera having a blur prevention system in accordance with a variant of the third embodiment implemented therein.

FIG. 25 is a diagram showing a variant of the third embodiment, and is a front view of a camera in which a blur prevention unit is incorporated in a camera body.

As shown in FIG. 25, a camera 227 in this variant has a blur prevention unit 228 formed at an upper corner on a side of the camera to be gripped by a photographer's right hand for holding the camera 227. The basic components of the blur prevention unit 228 are identical to those of the blur prevention adaptor 211 of the third embodiment. The detailed drawings and description will be omitted. Only a difference will be described below.

The blur prevention unit 228 is, as mentioned above, formed on the top of the camera 227 on the side of a portion thereof to be gripped by a right hand. The blur prevention unit 228 is positioned so that the base member (213) (See FIG. 20) located on the camera has the outer-wall surface thereof matched with the housing of the camera 227.

The blur prevention unit 228 is constrained to move toward the camera 227 by means of at least two taut constraining springs 228a. The blur prevention unit 228 is therefore pressed against the two rollers 222a and 222b with a proper force. The blur prevention unit 228 is thus positioned at a specified position. The rollers 222a and 222b can displace the (attachment stage of) blur prevention unit 228 but will not slide when rotated by the motors 215a and 215b.

Moreover, a release button 229 is located on the base member (213) (See FIG. 20). The release button 229 is a typical switch member adapted to an ordinary camera or the like, that is, a manipulation member composed of two switches; a first release switch for instructing range finding and photometry prior to photography and a second release switch for instructing photography. The release button 229 is electrically connected to a control circuit, which is incorporated in the camera 227 for controlling the entire camera, via the blur prevention unit 228.

Located in the vicinity of the photography lens 103a on the face of the camera 227 is a vibration isolation switch 226 for producing a signal for instructing start or stop of vibration isolation.

With the foregoing components, the camera 227 having the blur prevention unit 228 therein can be constructed. A photographer can minimize vibrations derived from trembles or the like occurring during photography and can easily obtain a better result of photography.

The position of the vibration isolation switch 226 is not limited to the above position (in the vicinity of the photography lens 103a) (See FIG. 25) but may be a position enabling a photographer to manipulate the vibration isolation switch easily for photography. For example, the vibration isolation switch may be located in a portion of the camera body 227 to be gripped with a left hand for holding the camera body 227 or located on the top of the blur prevention unit 228 which permits a photographer to manipulate the vibration isolation switch with the index finger of his/her right hand.

A release button of a typical camera is formed with a manipulation member composed of two switches; a first release switch for instructing range finding and photometry which is turned on by pressing the release button halfway and a second release switch for instructing photography which is turned on by pressing the release button fully. Alternatively, the release button may be composed of three switches; a first release switch for instructing range finding and photometry which is turned on by pressing the release button to a first halfway position, a second release button for producing a signal instructing start of vibration isolation, which is turned on by pressing the release button to a second halfway position, and a third release switch for instructing photography which is turned on by pressing the release button fully. Thus, the release button may be provided with the capability of the vibration isolation switch for instructing start of vibration isolation. In this case, vibration isolation is terminated with the completion of exposure executed by turning on the third release switch. This results in a more efficient control sequence.

Figure 26:
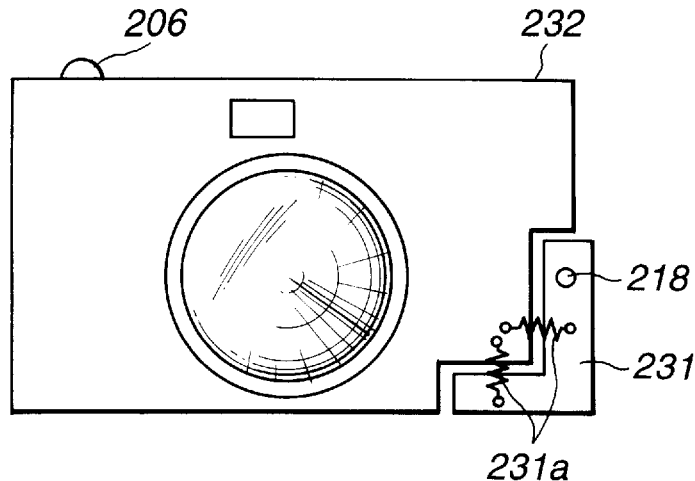
FIG. 26 is a front view of a camera having a blur prevention system in accordance with another variant of the third embodiment implemented therein.

FIG. 26 is a diagram showing another variant of the third embodiment, and is a front view of a camera in which a blur prevention unit is included in a camera body.

As shown in FIG. 26, a camera 232 in the variant has a blur prevention unit 231 formed at a corner on the bottom thereof on the side of a portion of the camera 232 to be gripped by a photographer's left hand for holding the camera 232. The basic components of the blur prevention unit 231 are identical to those of the blur prevention adaptor 211 of the third embodiment. The detailed drawings and description will be omitted. Only a difference will be described below.

The blur prevention unit 231 is, as mentioned above, included on the bottom of the camera 232 on the side of a portion of the camera 232 to be gripped by a left hand, and is positioned so that the base member (213) (See FIG. 20) located on the bottom has the outer-wall surface thereof matched with the housing of the camera 232.

The blur prevention unit 231 is constrained to move toward the camera 232 by means of at least two taut constraining springs 231a. The blur prevention unit 231 is therefore pressed against the two rollers (not shown) with a proper force. The blur prevention unit 232 is therefore positioned at a specified position. The two rollers can displace the (attachment stage of) blur prevention unit 232 but will not slide when rotated.

The vibration isolation switch 218 for producing a signal that instructs start or stop of vibration isolation is located on the blur prevention unit 231 on the side of the face of the camera 232.

With the foregoing components, the camera 232 having the blur prevention unit 231 can be constructed. A photographer can minimize vibrations derived from trembles occurring during photography and can obtain a better result of photography.

Even in this case, similar to the aforesaid variant, the vibration isolation switch 218 may be located on the camera 232. Alternatively, the release button 206 may be provided with the capability of the vibration isolation switch 218.

Next, the fourth embodiment of the present invention will be described below.

Figure 28:
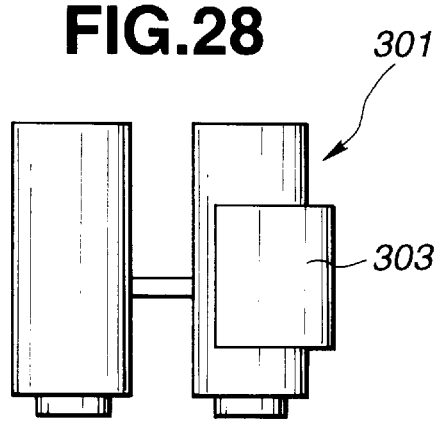
FIG. 28 is a top view of binoculars having the blur prevention system in accordance with the fourth embodiment of the present invention implemented therein.
Figure 29:
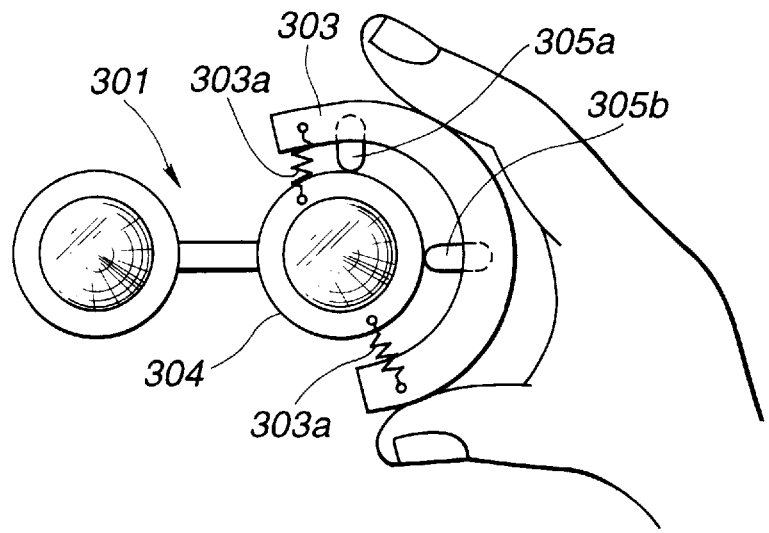
FIG. 29 is a front view of the binoculars, shown in FIG. 28, having the blur prevention system implemented therein.

FIGS. 28 and 29 are diagrams showing binoculars in which a blur prevention system of the fourth embodiment of the present invention to be implemented. FIG. 28 is a diagram showing the top view of the binoculars in which the blur prevention system is implemented, and FIG. 29 is a diagram showing the front view of the binoculars in which the blur prevention system is implemented.

Figure 27:
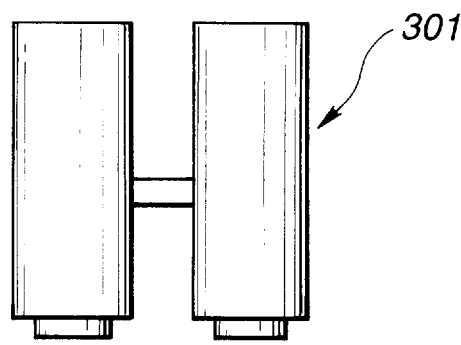
FIG. 27 is a top view of binoculars in a normal state in which a blur prevention system in accordance with the fourth embodiment of the present invention is not implemented.

FIG. 27 is a diagram showing the top view of binoculars 301 in a normal state in which the blur prevention system is not implemented.

Figure 30:
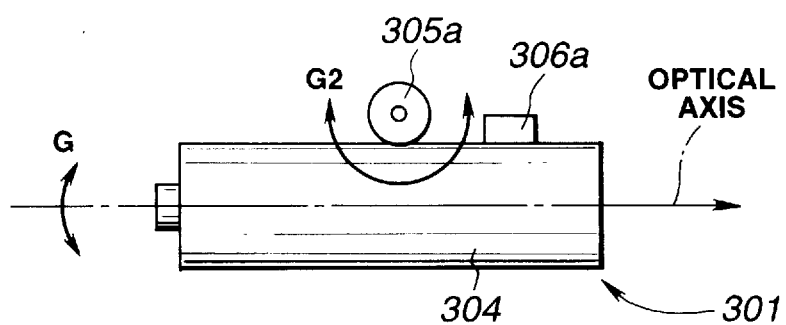
FIG. 30 is a diagram for explaining the operations of the blur prevention system implemented in the binoculars shown in FIG. 28.
Figure 31:
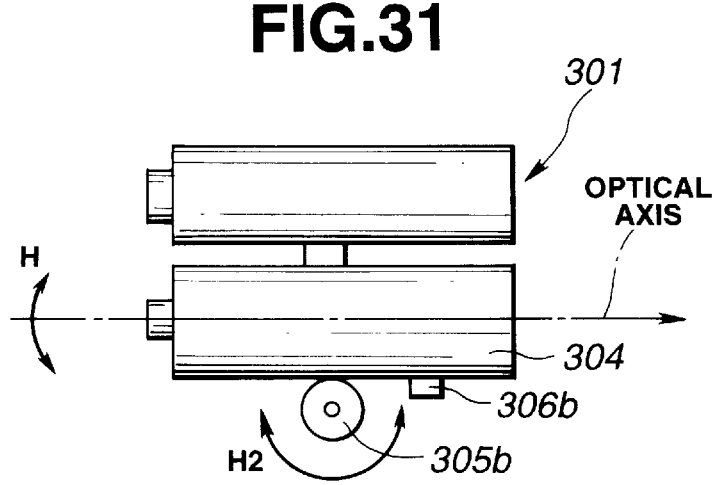
FIG. 31 is a diagram for explaining the operations of the blur prevention system implemented in the binoculars shown in FIG. 28.
Figure 32:
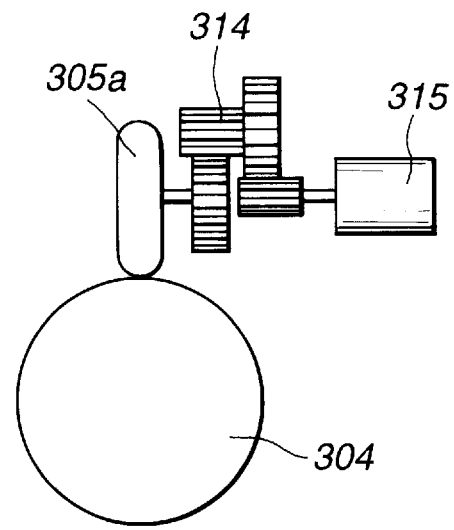
FIG. 32 is an enlarged view of a major portion that is part of a vibration isolating mechanism of the blur prevention system implemented in the binoculars shown in FIG. 28.

FIGS. 30 and 31 are diagrams for explaining the operations of the blur prevention system of the fourth embodiment. FIG. 32 is an enlarged view showing a major portion of a vibration isolation mechanism included in the blur prevention system.

As shown in FIGS. 28 and 29, in the fourth embodiment, a blur prevention adaptor 303 is mounted on one of left and right lens cylinders of the binoculars 301, that is, a (right) lens cylinder 304 so that the outer circumferential surface of the lens cylinder 304 is partly covered by the blur prevention adaptor 303. An observer grips the blur prevention adaptor 303 with his/her right hand. At this time, the observer's left hand may or may not rest on the other (left) lens cylinder.

The blur prevention adaptor 303 in the fourth embodiment is an C-shaped version of the L-shaped blur prevention adaptor 211 in the third embodiment. The basic components of the blur prevention adaptor 303 are substantially identical to those of the blur prevention adaptor 211 in the third embodiment. For the internal components of the blur prevention adaptor 303, see FIG. 20. The blur prevention adaptor 303 will be described briefly.

The C-shaped member forming the blur prevention adaptor 303 is designed so that the C-shaped member can cover part of the outer circumferential surface of the lens cylinder 304 of the binoculars 301 when mounted on the binoculars 301. Incorporated in the C-shaped member are a pair of driving mechanisms each composed of a vibration-proof drive motor (315), a reduction gear (314), and a roller (305a or 305b), first and second blur detecting means (not shown in FIG. 32) (See members 306a and 306b in FIGS. 30 and 31. See FIG. 20, too), a motor drive circuit, and a control circuit for vibration isolation (not shown in FIG. 32) (See FIG. 20). FIG. 32 shows one of the pair of vibration isolation mechanisms included in the blur prevention system. The other mechanism has the same components and is not shown simplicity.

As shown in FIG. 29, the blur prevention adaptor 303 is constrained to move toward the lens cylinder 304 by means of at least two taut constraining springs 303a, and press the rollers 305a and 305b to the outer circumferential surface of the lens cylinder 304 with a proper force. Owing to these components, the blur prevention adaptor 303 is positioned at a specified position. The two rollers 305a and 305b can displace the C-shaped member of the blur prevention adaptor 303 but will not slide when rotated.

Vibration isolation to be carried out when the blur prevention adaptor 303 in the fourth embodiment having the foregoing structure is attached to the binoculars 301 will be described briefly.

FIGS. 30 and 31 are diagrams for explaining the operations of the blur prevention system of the fourth embodiment. FIG. 30 schematically shows the side view of the binoculars with the blur prevention system implemented therein (blur prevention adaptor 303 attached thereto), and FIG. 31 schematically shows the top view of the binoculars with the blur prevention system implemented therein (blur prevention adaptor 303 attached thereto). In FIGS. 30 and 31, among the component members of the blur prevention adaptor 303, only the rollers 305a and 305b and first and second blur detecting means 306a and 306b are shown in order to avoid making the drawings congested.

Referring to FIG. 30, vibration isolation to be performed on a vibration derived from a tremble in a vertical direction relative to the optical axis of the lens cylinder 304 that is one of the lens cylinders of the binoculars 301, that is, a nodding vibration of the binoculars 301 (vibration in a direction of arrow G in FIG. 30) causing an angular speed will be described.

As shown in FIG. 30, when an angular speed caused by a vibration in the direction of arrow G is detected by the first blur detecting means 306a, the control circuit for vibration isolation (not shown) (See FIG. 20) instructs the motor drive circuit to drive and rotate the vibration-proof drive motor (315) (See FIG. 32), and controls drive of the roller 305a so that the angular speed detected by the first blur detecting means 306a will be null. This causes the roller 305a to rotate in a direction of arrow G2 in FIG. 30. The lens cylinder 304 of the binoculars 301 is displaced in a direction in which the nodding vibration (vibration in the direction of arrow G) is canceled, whereby the vibration is isolated.

Referring to FIG. 31, vibration isolation to be performed on a vibration derived from a tremble in a horizontal direction relative to the optical axis of the lens cylinder 304 that is one of the lens cylinders of the binoculars 301, that is, a yawing vibration of the binoculars 301 (vibration in a direction of arrow H in FIG. 31) causing an angular speed will be described.

As shown in FIG. 31, when an angular speed caused by a vibration occurring in the direction of arrow H is detected by the second blur detecting means 306b, the control circuit for vibration isolation (not shown) (See FIG. 20) instructs the motor drive circuit to drive and rotate the vibration-proof drive motor (315) (See FIG. 32), and controls drive of the roller 305b so that the angular speed detected by the second blur detecting means 306b will be null. This causes the roller 305b to rotate in a direction of arrow H2 shown in FIG. 31. The lens cylinder 304 of the binoculars 301 is displaced in a direction in which the yawing vibration (vibration in the direction of arrow H) is canceled, whereby the vibration is isolated.

Thus, bidirectional vibrations of the binoculars 301 derived from trembles or the like are canceled simultaneously by the blur prevention adaptor 303. Thus, stable observation can be achieved using the binoculars 301.

Figure 33:
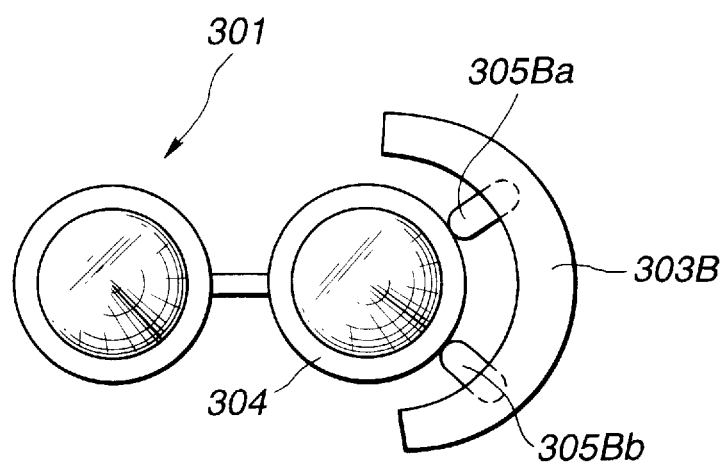
FIG. 33 is a front view of binoculars employed in a variant of the fourth embodiment.

The rollers 305a and 305b constituting the blur prevention adaptor 303 in the fourth embodiment are arranged relative to the optical axis of the binoculars 301 to which the blur prevention adaptor 303 is attached. Alternatively, for example, like rollers 305Ba and 305Bb in a blur prevention adaptor 303B shown in FIG. 33, the rollers may be arranged obliquely to the optical axis of binoculars. Even in this case, however, the planes of rotation of the rollers 305Ba and 305Bb must be mutually perpendicular.

In the fourth embodiment, the blur prevention adaptor 303 is constrained to move toward the lens cylinder 304 by means of taut constraining springs 303a. With the constraining force (pressing force), rotational driving forces exerted by the rollers 305a and 305b are directed toward the outer circumferential surface of the lens cylinder 304. Alternatively, the constraining springs 303a may be disposed of. The blur prevention adaptor 303 may be pressed to the lens cylinder 304 with a holding force exerted by an observer holding the binoculars 301. This leads to a decrease in number of component members. The adaptor itself can be simplified.

An apparatus in which the blur prevention system (blur prevention adaptor 303) of the fourth embodiment is implemented is not limited to the binoculars, but the blur prevention system may readily be implemented in any other optical apparatus having an observation optical means for use in observing an object and being intended for observation, for example, a monoscope or telescope.

Next, the basic configurations of a blur prevention system conformable to aspects of the present invention set forth in claims 25, 34, and 35 will be described briefly.

Figure 34:
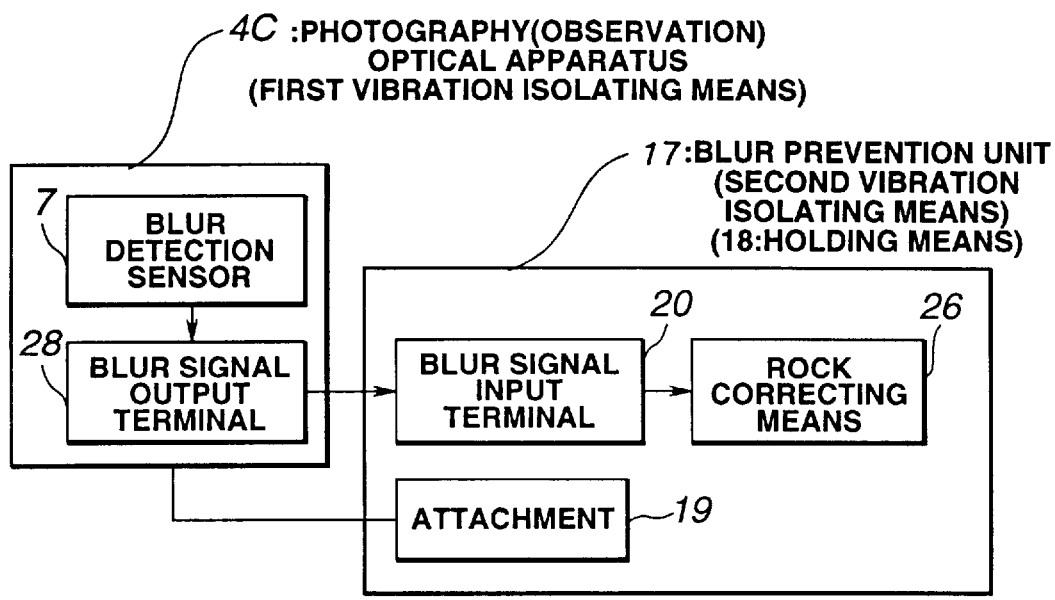
FIG. 34 is a conceptual diagram showing the fifth basic configuration of a blur prevention system in accordance with the present invention.

FIG. 34 is a conceptual diagram showing the fifth basic configuration of a blur prevention system in accordance with the present invention. The same reference numerals as those employed in FIGS. 1 to 3 are assigned to component members identical to those shown in FIGS. 1 to 3.

As shown in FIG. 34, an optical apparatus 4C that may be a photography optical apparatus or observation optical apparatus (which is a camera that is a photography optical apparatus and will therefore be hereinafter referred to as a camera) has a blur detection sensor 7 that is a blur detecting means for detecting a magnitude of trembling applied to the camera 4C, and a blur signal output terminal 28 through which a blur signal detected by the blur detection sensor 7 is outputted externally. The camera 4C thus includes a first vibration isolating means for alleviating the adverse effect of a tremble in a simplified manner on the basis of an output of the blur detection sensor 7 without correcting the optical axis of the photography optical system.

A blur prevention unit 17 is separated from the camera 4C and serves as a second vibration isolating means for receiving a signal from the blur detection sensor 7 and driving the camera 4C so that a tremble applied to the camera 4C can be canceled. The blur prevention unit 17 includes an attachment 19 used to attach the blur prevention unit 17 to the camera 4C, a blur signal input terminal 20 which is connected to the blur signal output terminal 28 of the camera 4C and through which a blur signal output through the blur signal output terminal 28 is input, and a rock correcting means 26 for alleviating a tremble of the camera 4C.

The blur prevention system 17 also serves as a holding means 18 that is a grip assisting in holding the camera 4C. The rock correcting means 26 is a means for driving and displacing the camera 4C so that an output of the blur detection sensor 7 incorporated in the camera 4C will be approached to zero.

Figure 35:
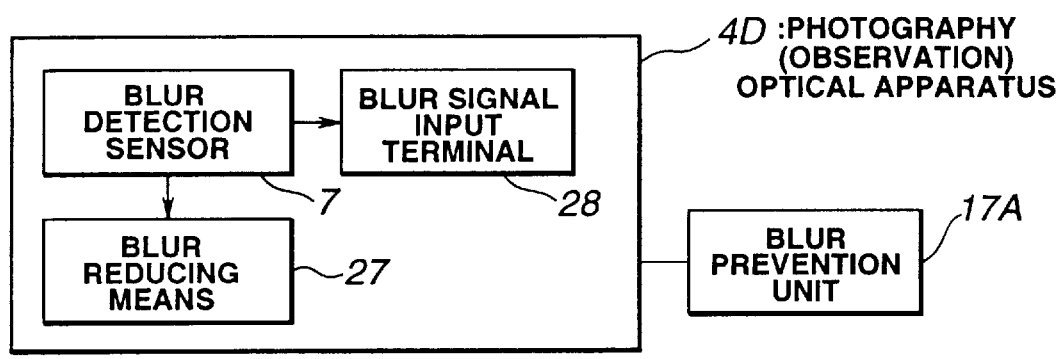
FIG. 35 is a conceptual diagram showing the sixth basic configuration of a blur prevention system in accordance with the present invention.

FIG. 35 is a conceptual diagram showing the sixth basic configuration of a blur prevention system in accordance with the present invention. As shown in FIG. 35, incorporated in a camera 4D are a blur detection sensor 7 for detecting a tremble applied to the camera 4D, a blur signal output terminal 28 through which a blur signal provided by the blur detection sensor 7 is output, and a blur reducing means 27 that is a first vibration isolating means for carrying out blur prevention other than rock alleviation which involves the camera 4D alone.

A blur prevention unit 17A that is a second vibration isolating means including a rock correcting means for alleviating a tremble of the camera 4D on the basis of a blur signal sent through the blur signal output terminal 28 can be freely detachably attached to the camera 4D.

When attached to the camera 4D, the blur prevention unit 17A drives and displaces the camera 4D so that an output of the blur detection sensor 7 will approach zero, and thus corrects a rock.

When the blur prevention unit 17A is not attached to the camera 4D, the blur reducing means 27 in the camera 4D carries out blue prevention other than rock alleviation which involves the camera 4D alone.

Figure 36:
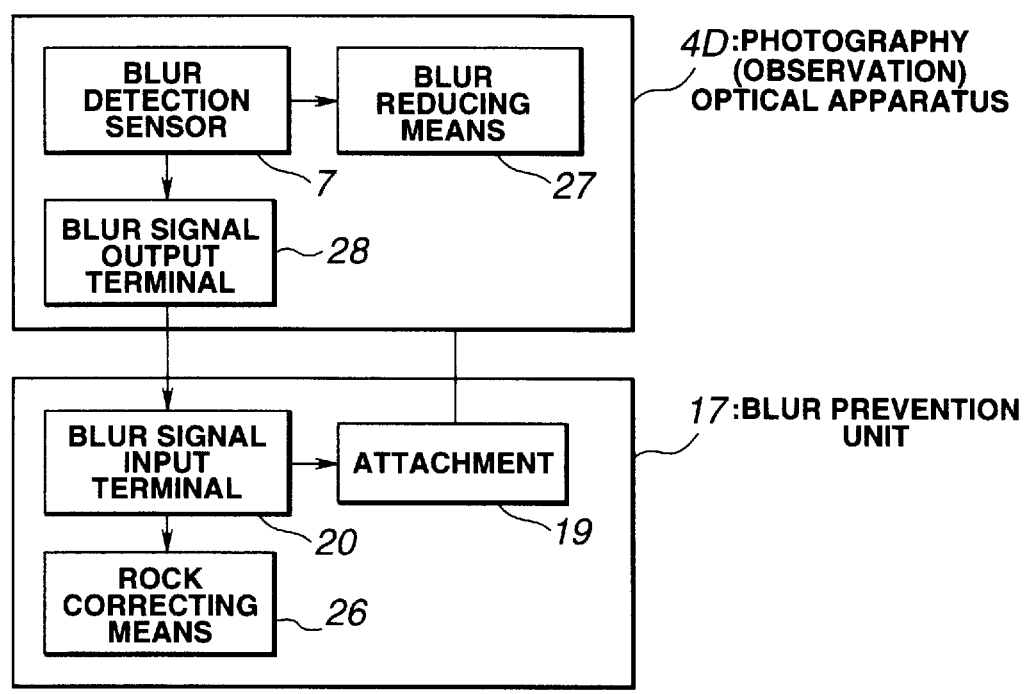
FIG. 36 is a conceptual diagram showing the seventh basic configuration of a blur prevention system in accordance with the present invention.

When the fifth and sixth basic configurations (FIGS. 34 and 35) are combined, the seventh basic configuration of a blur prevention system in accordance with the present invention ensues. That is to say, FIG. 36 is a conceptual diagram showing the seventh basic configuration of a blur prevention system in accordance with the present invention. As shown in FIG. 36, a camera 4D (corresponding to the camera 4D shown in FIG. 35) and a blur prevention unit 17 (corresponding to the blur prevention unit 17 shown in FIG. 34) are used in combination. The blur prevention unit 17 is attached to the camera 4D.

Next, embodiments having the fifth to seventh basic configurations will be described. To begin with, the fifth embodiment of the present invention will be described.

Figure 37:
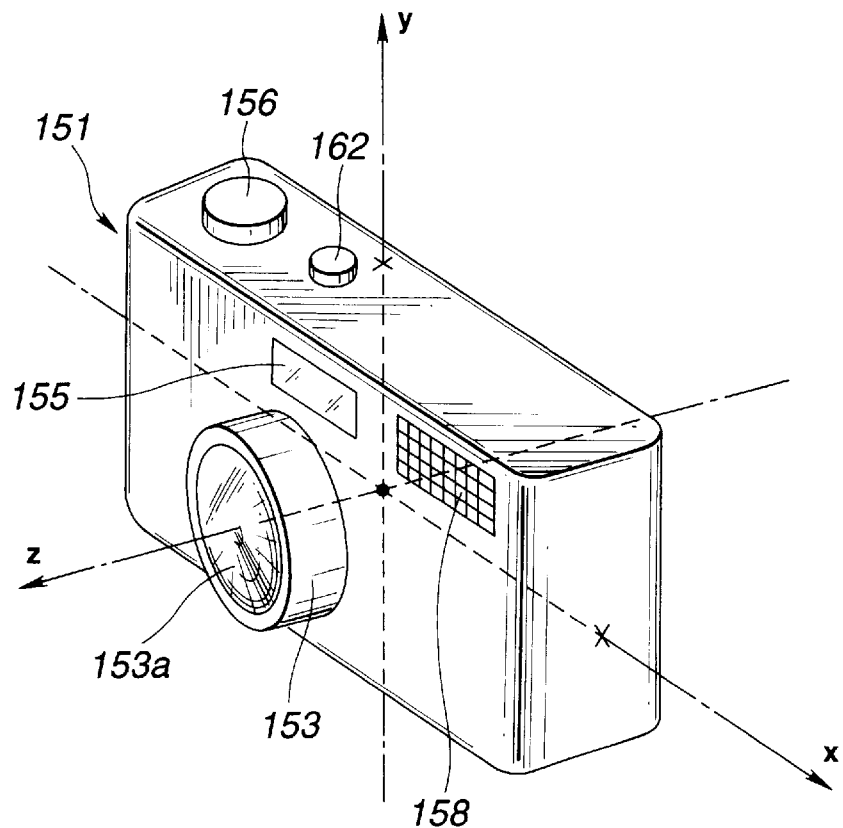
FIG. 37 is a schematic oblique view showing the appearance of a camera employed in the fifth embodiment of the present invention.
Figure 38:
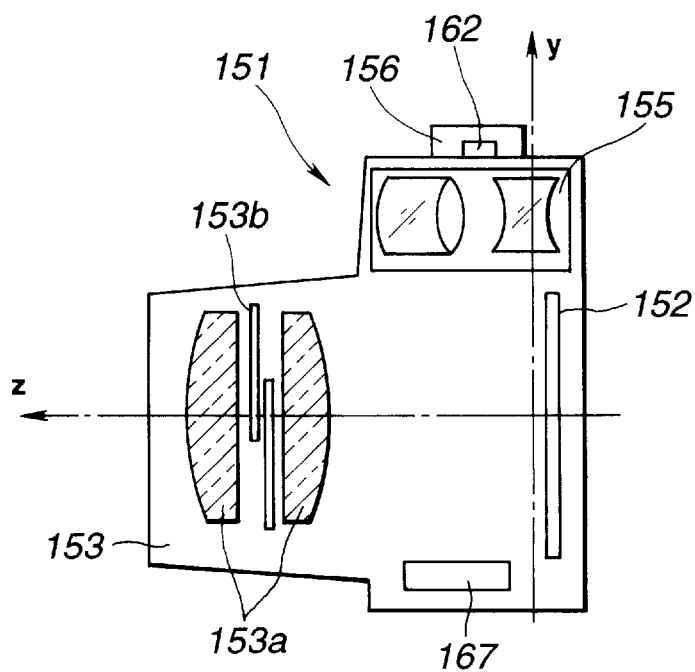
FIG. 38 is a side view showing the layout of internal component members of the camera shown in FIG. 37.
Figure 39:
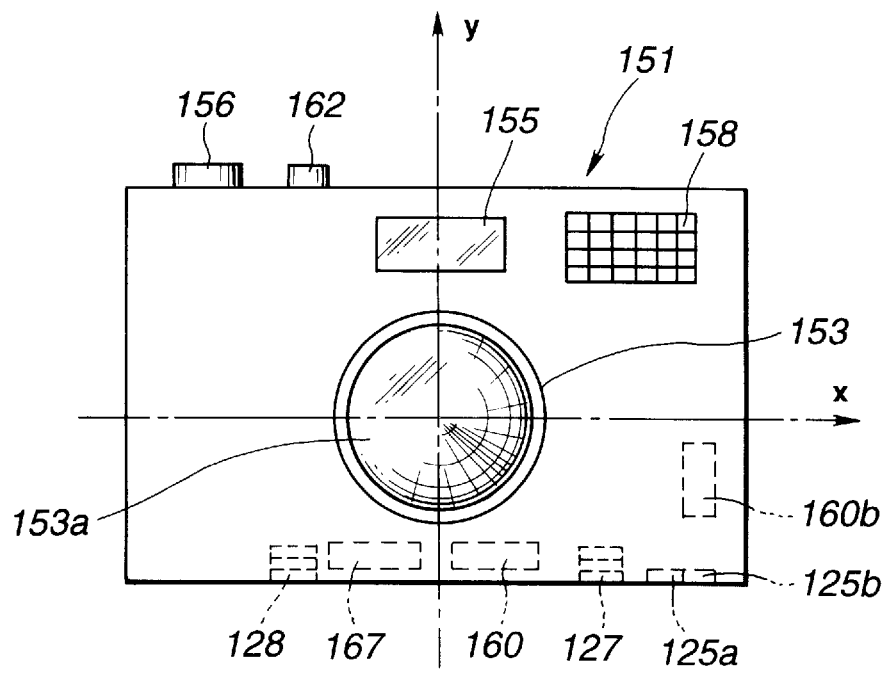
FIG. 39 is a front view of the camera shown in FIG. 37.
Figure 40:
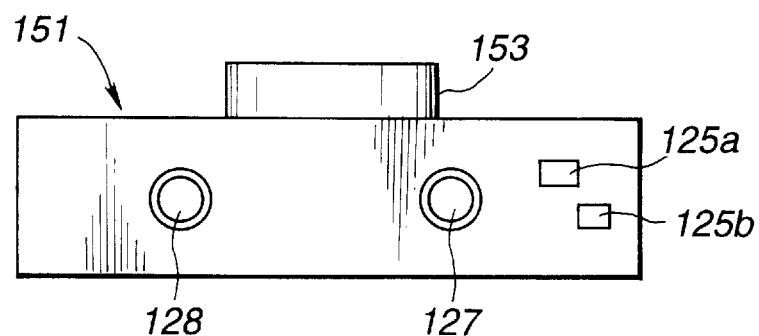
FIG. 40 is a bottom view of the camera shown in FIG. 37.

FIGS. 37, 38, 39, and 40 are diagrams showing a camera that is a photography optical apparatus in which a blur prevention system of the fifth embodiment of the present invention is adapted. FIG. 37 is a schematic oblique view of the camera, FIG. 38 is a side view of the camera showing the layout of major component members, FIG. 39 is a front view of the camera, and FIG. 40 is a bottom view of the camera. The camera (151) in this embodiment is equivalent to the cameras 4C and 4D shown in FIGS. 34 to 36.

As shown in FIGS. 37 to 40, a photographic lens cylinder 153 composed of a photographic lens 153a that is a photography optical system for forming an object image on film 152 (FIG. 38), and a shutter unit 153b (FIG. 38) for adjusting the magnitude of exposure is located in the center of the face of the camera 151.

Located in the upper area of the face of the camera are a viewfinder 155 that is an observation optical system for use in checking an object image to be photographed, and a strobe unit 158 that is an auxiliary light source used to attain proper exposure when the luminance of an object is insufficient.

Arranged on one edge of the top of the camera are a release button 156 composed of two switches; a first release switch for instructing range finding and photometry prior to photography and a second release switch for instructing photography, and a blur alleviation exposure mode setting button 162 used to set an exposure mode intended for alleviating a tremble.

A CPU 167 including a microcomputer and serving as a control means for controlling the operations of the entire camera 151 is located on an inner surface of the bottom of the camera 151. The camera 151 is controlled on a centralized basis so that the camera 151 will operate according to a program run by the CPU 167.

As shown in FIG. 37, coordinate axes shall be imagined by regarding a line along the optical axis of the photographic lens 153a (photography optical system) of the camera 151 as a z axis, a line orthogonal to the z axis and extending in the vertical direction (height direction) of the camera 151 as an y axis, and a line orthogonal to the z and y axes and extending in the lateral direction (width direction) of the camera 151 as x axis (See also FIGS. 38 and 39).

A first angular speed detecting means 160 that is a blur detecting means for detecting an angular speed caused by a nodding vibration of the camera 151, that is, a vibration in a direction of rotation with the x axis shown in FIGS. 37 and 39 as a center of rotation (oscillation in a vertical direction relative to the x axis), and a second angular speed detecting means 160b that is a blur detecting means for detecting an angular speed caused by a yawing vibration of the camera 151, that is, a vibration in a direction of rotation with the y axis shown in FIGS. 37, 38, and 39 as a center of rotation (oscillation in a horizontal direction relative to the x axis or oscillation in a vertical direction relative to the y axis) are located inside the camera 151.

The first and second angular speed detecting means 160 and 160b are each formed with a so-called gyro angular speed sensor for detecting an angular speed by sensing a difference between charges generated by a pair of piezoelectric elements, which resonate within an ultrasonic frequency band, according to the piezoelectric effect. The first and second angular speed detecting means 160 and 160b correspond to the blur detection sensor 7 shown in FIGS. 34 to 36.

Signals (analog signals) indicating angular speeds detected by the first and second angular speed detecting means 160 and 160b are input to the CPU 167, and digitized by an A/D converter (not shown) incorporated in an IC chip forming the CPU 167. Thus, signal processing can be carried out by the CPU 167.

Blur signal output contacts 125a and 125b (corresponding to the blur signal output terminal 28 shown in FIGS. 34 to 36) through which angular speed signals indicating angular speeds in two directions caused by trembles and detected by the first and second angular speed detecting means 160 and 160b are output are located in a portion on the bottom of the camera 151 to be covered with the left hand of an operator holding the camera 151 for photography.

In the vicinity of the blur signal output contacts 125a and 125b, an attachment screw hole 127 (corresponding to the attachment 19 in FIGS. 34 to 36) used to couple and fix the camera 151 to a blur prevention grip (not shown in FIGS. 37 to 40) (See FIGS. 41 to 44) that is a second vibration isolating means is bored. Moreover, a tripod screw hole 128 used to fix the camera 151 to a tripod is bored in the bottom of the camera 151.

The operations of the camera 151 having the foregoing components will be described in conjunction with the flowchart of FIG. 45.

Figure 45:
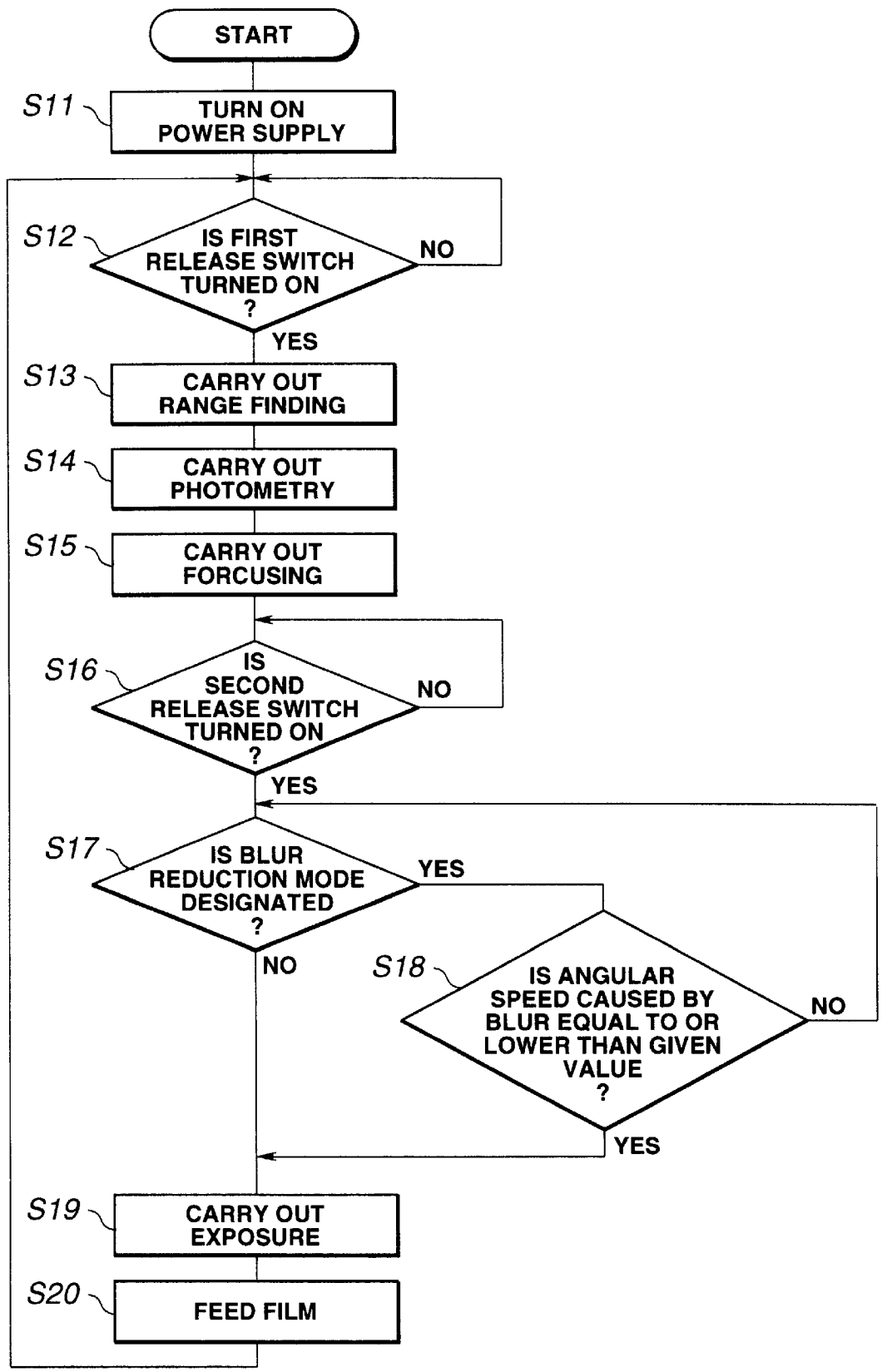
FIG. 45 is a flowchart describing the operations of the camera shown in FIG. 37.

As described in FIG. 45, first, at step S11, the power supply of the camera 151 is turned on. Power is then supplied to electrical circuit blocks in the camera 151. Control is then passed to step S12.

At step S12, it is checked if a photographer has pressed the release button 156 halfway, that is, if the first release switch of the release button 156 has been turned on. If it is judged that the photographer has pressed the release button 156 halfway, that is, the first release switch of the release button.156 has been turned on, control is passed to step S13. At step S13, range finding is carried out. At step S14, photometry is carried out. Control is then passed to step S15.

At step S15, focusing is carried out by moving the photographic lens 153a inside the photographic lens cylinder 153 to a proper position on the basis of the result of the range finding carried out at step S13. Control is then passed to step S16.

At step S16, it is checked if the operator (photographer) of the camera 151 has pressed the release button 156 fully, that is, the second release switch of the release button 156 has been turned on. If it is judged that the photographer has pressed the release button 156 fully, that is, the second release switch of the release button 156 has been turned on, control is passed to step S17.

At step S17, it is checked if the photographer has pressed the blur alleviation exposure mode setting button 162, that is, if a blur alleviation mode has been designated. If the camera 151 has not been set to the blur alleviation mode, control is passed to step S19. If the camera 151 has been set to the blur alleviation mode, control is passed to step S18.

If it is judged at step S17 that the blur alleviation mode has not been designated, control is passed to step S19. At step S19, the shutter unit 153b is driven responsively to the full press of the release button 156 at step S16, and exposure is carried out.

Control is then passed to step S20. At step S20, a film feeding means (not shown) is driven. The film 152 is wound (fed) by one frame. The next photographic frame is set at a given position inside the camera 151. Control is then returned to step S12. The subsequent processing is then repeated.

When the photographic frame exposed this time is the last frame of the film 152, the film feeding means of the camera rewinds the film. The series of operations is then terminated.

If it is judged at step S17 that the blur alleviation exposure mode setting button 162 has been pressed once and the blur alleviation mode has therefore been designated, control is passed to step S18. At step S18, it is checked if angular speed signals (blur signals) indicating angular speeds detected by the first and second angular speed detecting means 160 and 160b are equal to or lower than given values. If the blur signals are equal to or lower than the given values, control is passed to step S19. At step S19, exposure is carried out. At step S20, film feed is carried out. Control is then returned to step S12. The subsequent processing is then repeated.

If it is judged at step S18 that the blur signals are not equal to or lower than the given values, control is passed to step S17. The subsequent processing is then repeated.

Every time the blur alleviation exposure mode setting button 162 is pressed, a mode set state and mode released state are alternated, that is, states are changed. For example, when the blur alleviation exposure mode setting button 162 is pressed once, the blur alleviation mode is set. When the blur alleviation exposure mode setting button 162 is pressed again, the blur alleviation mode is released.

If it is found at step S18 that the blur signals are not equal to or smaller than the given values, the blur alleviation exposure mode setting button 162 is pressed once in order to release the blur alleviation mode. Control can now be passed to the next processing of exposure.

The camera 151 employed in the fifth embodiment can be, as mentioned above, solely set to the blur alleviation mode. When the camera is set to the blur alleviation mode, unless the angular speed signals (blur signals) indicating angular speeds detected by the first and second angular speed detecting means 160 and 160b become equal to or lower than the given values, the shutter unit 153b is not permitted to operate for exposure. Thus, the camera 151 includes a so-called simplified vibration isolator enabling photography to be carried out with blurring alleviated in a simplified manner.

Next, a blur prevention grip to be attached to the camera will be described.

Figure 41:
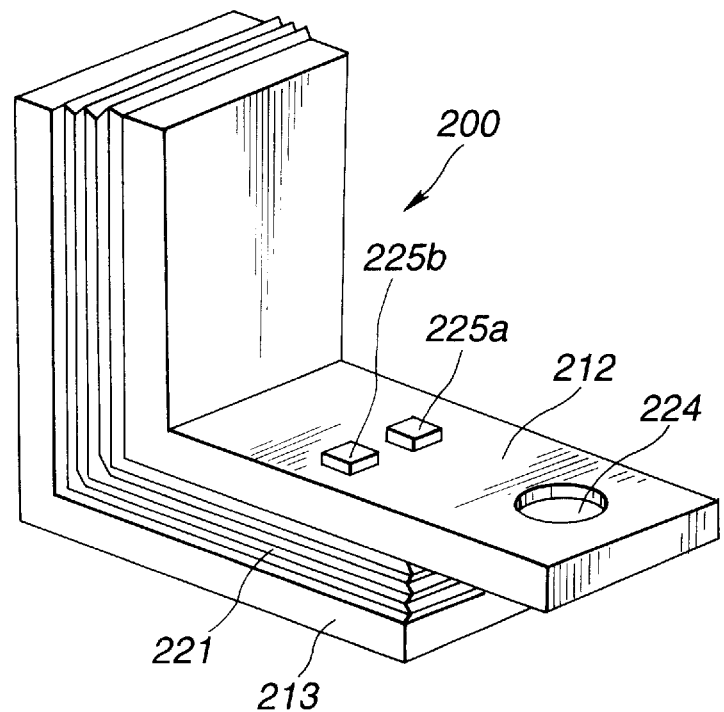
FIG. 41 is a schematic oblique view showing the appearance of a blur prevention grip to be attached to the camera shown in FIG. 37.
Figure 42:
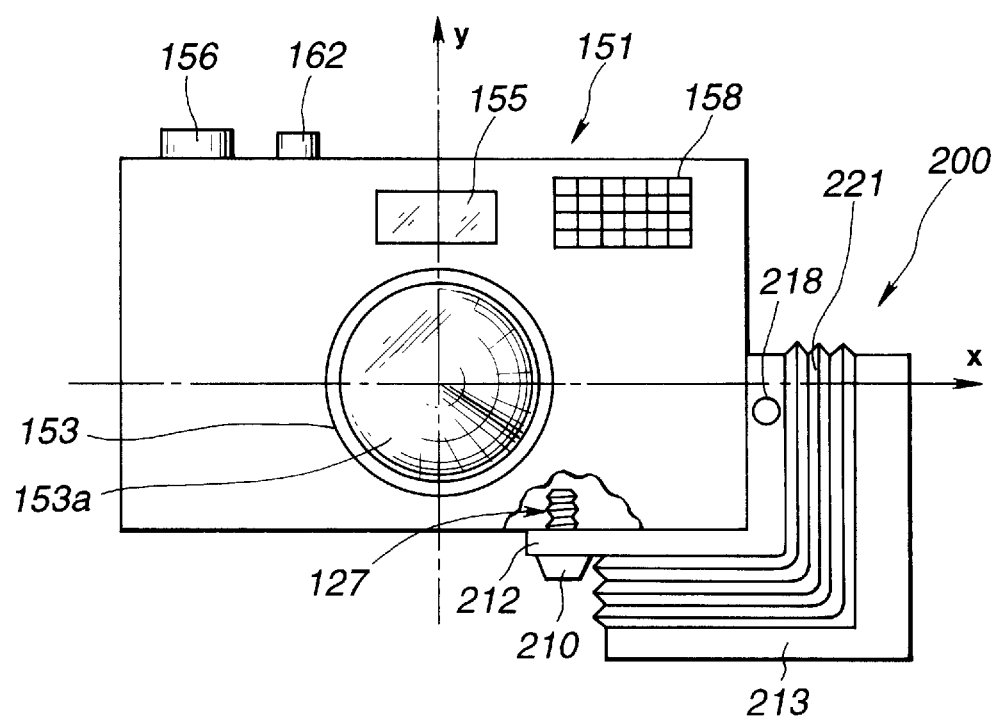
FIG. 42 is a front view showing a state in which the blur prevention grip shown in FIG. 41 is attached to the camera.
Figure 43:
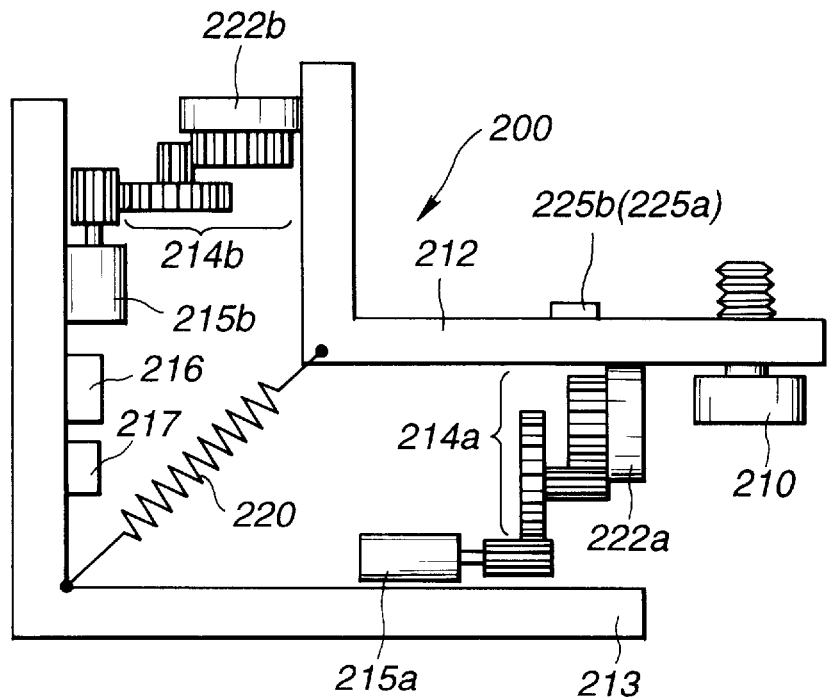
FIG. 43 is a front view schematically showing the internal structure of the blur prevention grip shown in FIG. 41.
Figure 44:
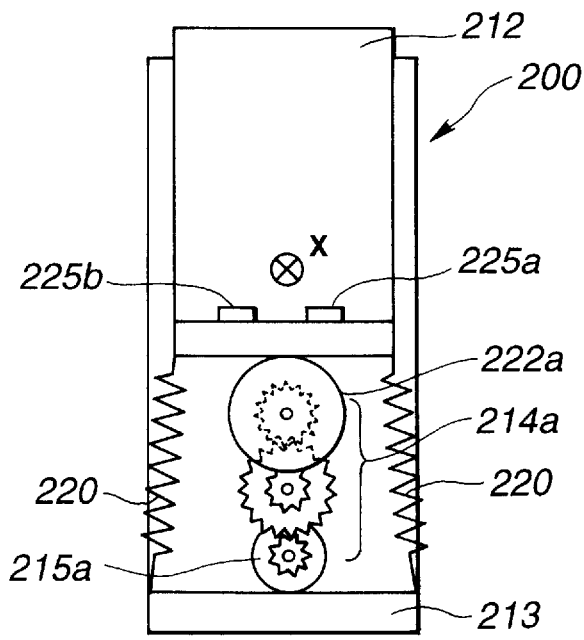
FIG. 44 is a side view schematically showing the internal structure of the blur prevention grip shown in FIG. 41.

FIGS. 41, 42, 43, and 44 are diagrams showing a blur prevention grip employed in the fifth embodiment. FIG. 41 is a schematic oblique view of the blur prevention grip, FIG. 42 is a front view of the camera 151 with the blur prevention grip attached thereto, FIG. 43 is a front view of the blur prevention grip schematically showing the internal components of the blur prevention grip, and FIG. 44 is a side view of the blur prevention grip schematically showing the internal components of the blur prevention grip.

As shown in FIGS. 41 to 44, a blur prevention grip 200 that is a second vibration isolating means is composed of an attachment stage 212 and base member 213 that are two L-shaped members, and a bellows-like member 221 placed to fill (i.e. cover) the space between the attachment stage 212 and base member 213.

The blur prevention grip 200 is, as shown in FIG. 42, attached to the camera 151. Specifically, a screw 210 is penetrated through a hole 224 bored in the attachment stage 212 with the bottom of the camera 151 brought into contact with the long-side portion of the attachment stage 212 of the blur prevention grip 200. The screw 210 is then engaged with the attachment screw hole 127 bored in the bottom of the camera 151, whereby the camera 151 is coupled with the blur prevention grip 200. In FIG. 44, the screw 210 is not shown.

Blur signal input contacts 225a and 225b (corresponding to the blur signal input terminal 20 shown in FIGS. 34 to 36) are formed on the top of the long-side portion of the attachment stage 212 of the blur prevention grip 200. When the camera 151 is coupled with the blur prevention grip 200, the blur signal input contacts 225a and 225b are brought into contact with the blur signal output contacts 125a and 125b (See FIG. 39) on the camera 151. Owing to this structure, angular speed signals (blur signals) indicating angular speeds observed in two directions and detected by the first and second angular speed detecting means 160 and 160b of the camera 151 are transmitted to the blur prevention grip 200.

Moreover, a vibration isolation button 218 used to instruct start or stop of blur prevention drive is located on the outer surface of the blur prevention grip 200. The vibration isolation button 218 may be located at any position as long as the vibration isolation button can be manipulated readily when the camera 1 having the blur prevention grip 200 attached thereto is held. For example, in FIG. 42, the vibration isolation button 218 is located at a position enabling the index finger of a left hand gripping the camera 151 having the blur prevention grip 200 attached thereto to manipulate the vibration isolation button readily.

Inside the blur prevention grip 200, as shown in FIGS. 43 and 44, a motor 215a serving as a power source is located on the long-side portion of the base member 213 and faced inward. A pinion gear is secured to the axis of rotation of the motor 215a. A large-diameter gear of a reduction gear 214a that is a two-speed gear for energizing a driving force exerted by the motor 215a is meshed with the pinion gear. A small-diameter gear of the reduction gear 214a is meshed with a gear fixed unitedly to a roller 222a. Owing to this structure, a driving force exerted by the motor 215a is conveyed to the roller 222a.

The roller 222a is located to abut on the bottom of the long-side portion of the attachment stage 212. When the motor 215a is driven to rotate, the roller 222a drives the attachment stage 212 in a direction of rotation with an axis passing through a point in contact with the roller 222b and parallel to the x axis shown in FIG. 42 as a center.

On the upright-side portion of the base member 213, that is, a portion of the base member 213 orthogonal to the long-side portion thereof, a motor 215b serving as a power source is located to be faced inward. A pinion gear is secured to the axis of rotation of the motor 215b. A large-diameter gear of a reduction gear 214b that is a two-speed gear for energizing a driving force exerted by the motor 215b is meshed with the pinion gear. A small-diameter gear of the reduction gear 214b is meshed with a gear fixed unitedly to a roller 222b. Owing to this structure, a driving force exerted by the motor 215b is conveyed to the roller 222b.

The roller 222b is located to abut the inner wall of the upright-side portion of the attachment stage 212. When the motor 215b is driven to rotate, the roller 222b drives the attachment stage 212 in a direction of rotation with an axis passing through a point in contact with the roller 222a and parallel to the y axis shown in FIG. 42 as a center.

Also located on the upright-side portion of the base member 213 are a motor drive circuit 216 formed with a so-called bridge circuit for supplying power to the motors 215a and 215b, starting or stopping the motors 215a and 215b, and controlling the directions of rotation of the motors, and a control circuit for vibration isolation 217 including a microcomputer for controlling the motor drive circuit 216.

The blur signal input contacts 225a and 225b are connected to the control circuit 217 for vibration isolation, whereby blur signals indicating angular speeds observed in two directions and detected by the first and second angular speed detecting means 160 and 160b in the camera 151 are input to the control circuit 217 for vibration isolation via the blur signal output contacts 125a and 125b on the camera 151 and the blur signal input contacts 225a and 225b on the blur prevention grip 200.

Furthermore, the vibration isolation button 218 is electrically connected to the control circuit 217 for vibration isolation. An instruction signal for instructing start or stop of blur prevention drive which is issued by pressing the vibration isolation button 218 is input to the control circuit 217 for vibration isolation.

Opposite ends of two taut constraining springs 220 are respectively attached to the attachment stage 212 and base member 213, whereby the attachment stage 212 and base member 213 are constrained to move in directions in which they attract each other. The attachment stage 212 is pressed against the two rollers 222a and 222b with a proper force, whereby the positions of the attachment stage 212 and base member 213 are restricted. Besides, the rollers 222a and 222b can displace the attachment stage 212 but will not slide when rotated.

If at least one of the contact surfaces of the rollers 222a and 222b and the inner (contact) surface of the attachment stage 212 is coated with a material exhibiting a large friction factor, for example, rubber, the rotational slides of the rollers 222a and 222b can be prevented more effectively.

As mentioned above, the bellows-like member 221 is interposed between the attachment stage 212 and base member 213 in an effort to prevent invasion of dust or the like and to enable free displacement of the attachment stage 212. With the bellows-like member 221, the attachment stage 212 and base member 213 are coupled mutually.

Figure 46:
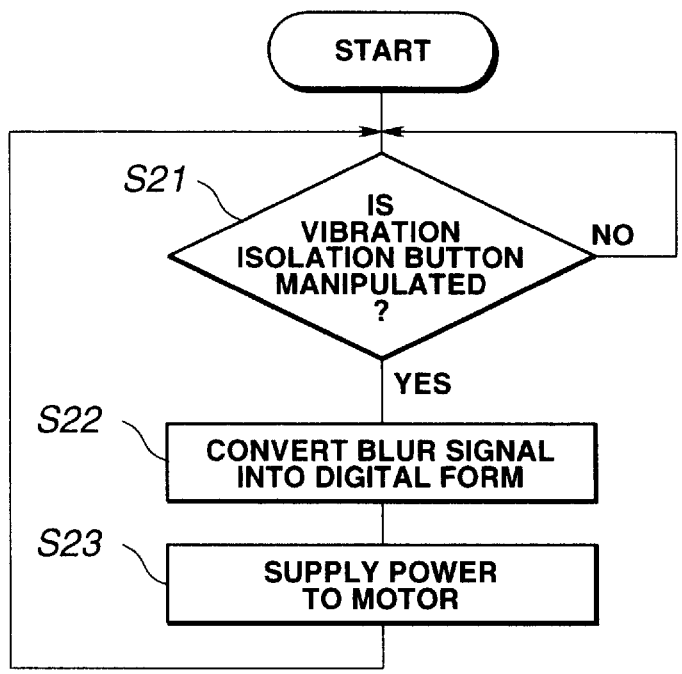
FIG. 46 is a flowchart describing the operations of the blur prevention grip shown in FIG. 41.

The operations of the blur prevention grip 200 having the foregoing components will be described in conjunction with the flowchart of FIG. 46.

First, at step S21, it is checked if the vibration isolation button 218 has been manipulated. If the vibration isolation button 218 is on, control is passed to step S22.

At step S22, the vibration isolation control circuit 217 instructs the A/D converter (not shown) incorporated in an IC chip placed inside to digitize angular speed signals (analog signals) indicating angular speeds observed in two directions and input through the blur signal input contacts 225a and 225b so that the signals can be processed by the microcomputer. Control is then passed to the next step S23.

At step S23, the motor drive circuit 216 is instructed to supply power to the motors 215a and 215b according to the signals digitized at step S22. Rotational drive is started in order to isolate a vibration of the attachment stage 212, that is, the camera 101 attached to the blur prevention grip 200. Control is then returned to step S21. While the vibration isolation button 218 remains on, the subsequent processing is repeated.

Thus, while the vibration isolation button 218 is manipulated, that is, the vibration isolation button 218 remains on, vibration isolation is kept executed for the camera 151.

Vibration isolation by the blur prevention system will be described below.

Figure 47:
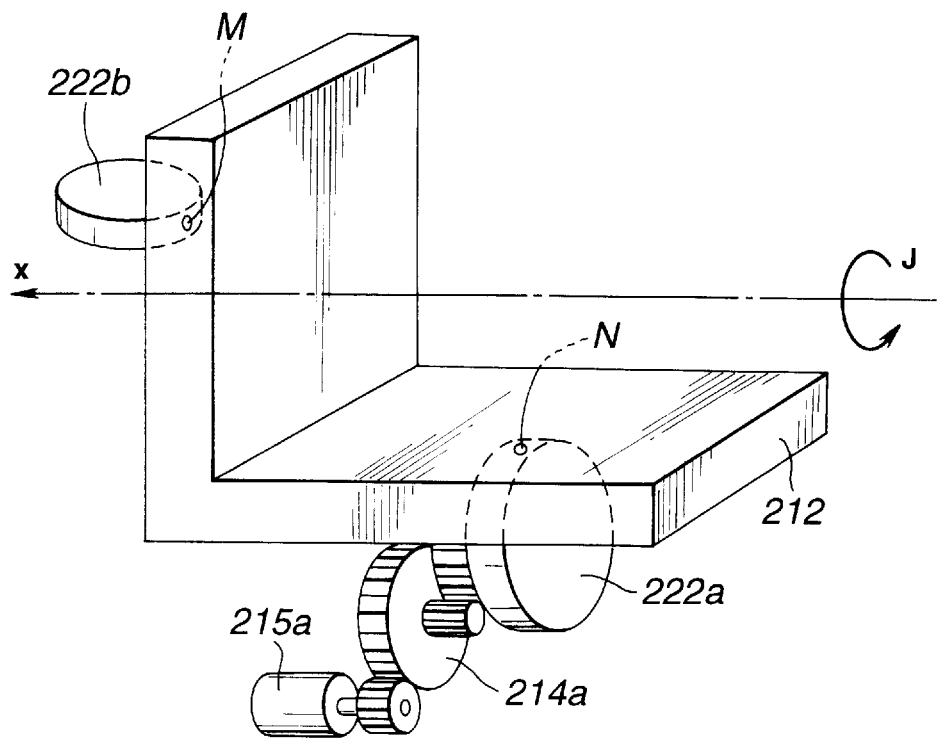
FIG. 47 is an oblique view showing a major portion of the blur prevention grip shown in FIG. 41.
Figure 48:
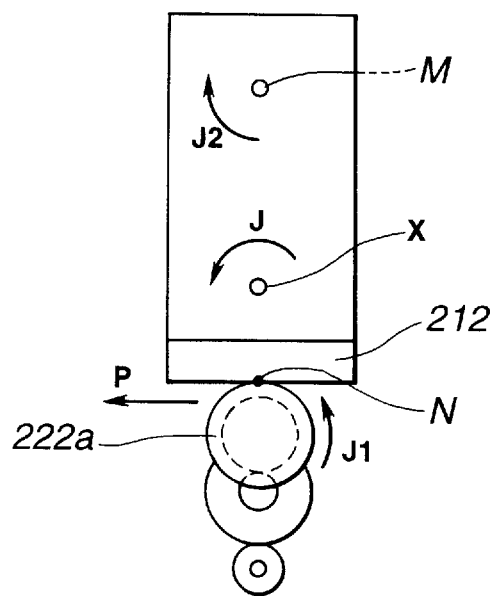
FIG. 48 is a side view of the blur prevention grip shown in FIG. 47.

FIGS. 47 and 48 are diagrams showing a major portion of the blur prevention grip 200 included in the blur prevention system of the fifth embodiment. FIG. 47 is an oblique view showing the major portion including the attachment stage 212 and the component members for rotating the attachment stage 212 in the x-axis direction shown in FIG. 47. FIG. 48 is a side view of the major portion shown in FIG. 47. Herein, vibration isolation taking effect in a direction of rotation with the x axis shown in FIG. 42 as a center will be discussed. FIGS. 47 and 48 therefore show only the component members having relation to the description. The other component members are omitted.

In FIGS. 47 and 48, assume that, for example, the camera (not shown in FIGS. 47 and 48) attached to the attachment stage 212 is rotated in a direction of arrow J with the x axis shown in FIG. 47 as a center.

In this case, first, the first angular speed detecting means 160 (See FIG. 39) in the camera 151 detects a blur signal indicating a tremble in a direction with the x axis shown in FIG. 47 as a center (for example, in a direction of arrow J). The blur signal is output to the control circuit for vibration isolation 217 (FIG. 43). In response to the signal, the control circuit 217 for vibration isolation controls the direction of rotation of the motor 215a so that the camera 151 will be driven to rotate in a direction opposite to the direction of trembling (direction of arrow J). In other words, the rotation of the motor 215a is controlled so that the roller 222a will be rotated in a direction of arrow J1 shown in FIG. 48.

The roller 222a is in contact with the bottom of the attachment stage 212 at a contact point N. When the roller 222a rotates in the direction of arrow J1 (See FIG. 48), the contact point N on the attachment stage 212 moves in a direction of arrow P in FIG. 48.

Assuming that a contact point on the attachment stage 212 at which the roller 222b located on the surface orthogonal to the roller 222a is in contact with the attachment stage 212 is M, the attachment stage 212 has the movement thereof restricted at the contact point M. When the contact point N on the attachment stage 212 moves in the direction of arrow P, the attachment stage 212 rotates in a direction of arrow J2 in FIG. 48 with the contact point M as a center. The rotation in the direction of arrow J2 is opposite to the rotation in the direction of arrow J made by the camera 151 due to a tremble.

When the rotation in the direction of arrow J made by the attachment stage 212 is conveyed to the camera 151 fixed to the stage 212, the rotation in the direction of arrow J made by the camera 151 due to a tremble is canceled.

By continuously repeating the foregoing operations, vibrations occurring in any directions with any magnitudes due to trembles or the like can be canceled any time.

When the speed of feedback, that is, the response speed of vibration isolation for preventing a tremble is not high enough, if a magnitude of return effected by the blur prevention grip 200 for canceling a tremble, that is, a magnitude of vibration generated by the blur prevention grip 200 is too large for the existing tremble, the blur prevention system enters a state of oscillation, that is, a state in which the blur prevention system cannot carry out vibration isolation effectively. This may result in occurrence of unwanted vibrations. The magnitude of vibration generated by the blur prevention grip 200 for vibration isolation should preferably be equal to or smaller than a magnitude of vibration generated by the camera 151 due to a tremble or the like.

Herein, only the vibration isolation effected in the direction of rotation with the x axis shown in FIG. 42 as a center has been described. The same applies to vibration isolation to be effected in a direction of rotation with the y axis in FIG. 42 as a center.

As mentioned above, according to the fifth embodiment, the camera can solely prevent a blur in a simplified manner. Moreover, heavy-duty blur correction can be realized while portability and mobility are not impaired.

Blur signals indicating trembles detected by the first and second angular speed detecting means 160 and 160b in the camera are transmitted to the blur prevention grip 200. Thus, the blur detection sensor is used in common. This contributes to a reduction in number of component members, and to realization of a compact design of the blur prevention grip and low cost.

A blur derived from a tremble or the like applied to the camera 151 during photography can be prevented effectively. Occurrence of a blur derived from a tremble or the like can be prevented readily during observation or checking of an object through the viewfinder 155 for photography or during focusing carried out by driving the photographic lens 153a.

In the fifth embodiment, blur signals to be transferred between the camera 151 and blur prevention grip 200 are analog signals. Alternatively, the blur signals may be digitized in the camera 151 beforehand so that the blur signals can be communicated in a digital form.

A connection terminal through which power is supplied may be formed in addition to contacts 225a, 225b and 125a, 125b. In this case, a main power supply can be installed in either the camera 151 or blur prevention grip 200, and thus the power supply can be used in common.

The blur prevention system may be designed so that when the blur prevention grip 200 is attached to the camera 151, even if vibration isolation involving the blur prevention grip 200 is in progress, the camera 151 is set to the blur alleviation mode so that the camera 151 itself can carry out vibration isolation.

The blur prevention system may be designed so that when the blur prevention grip 200 is attached to the camera 151, if vibration isolation involving the blur prevention grip 200 is in progress, simplified blur alleviation to be carried out solely by the camera 151, that is, vibration isolation in the blur alleviation mode of the camera 151 is disabled. In this case, the design contributes to prevention of wasteful power consumption and power saving.

Next, a blur prevention system in accordance with the sixth embodiment of the present invention will be described. The blur prevention system of the sixth embodiment is an example in which when the blur prevention grip 200 is attached to the camera 151, if vibration isolation involving the blur prevention grip 200 is in progress, blur alleviation to be carried out solely by the camera 151 is disabled.

The blur prevention system of the sixth embodiment has substantially the same configuration as the blur prevention system of the fifth embodiment. The configuration will therefore not be illustrated because it is similar to the one shown in FIGS. 37 to 48. The same reference numerals as those employed in the first embodiment will be used to proceed with the subsequent description.

In the blur prevention system of the sixth embodiment, blur signals are transferred between the camera 151 and blur prevention grip 200 by so-called serial communication. This enables transfer of various kinds of information.

Information handled by serial communication includes, for example, information indicating whether or not the blur prevention grip 200 is attached to the camera 151 and information concerning the operation mode of the camera 151. These various kinds of information are acquired and checked so that various associated operations can be controlled.

Used as input and output terminals for the serial communication are the blur signal output contacts 125a and 125b through which angular speed signals are output from the camera 151 (See FIGS. 37 to 40) to the blur prevention grip 200 (See FIGS. 41 to 44) and the blur signal input contacts 225a and 225b located at positions opposed to the blur signal output contacts 125a and 125b on the blur prevention grip 200.

In the sixth embodiment, therefore, the blur signal output contact 125a on the camera 151 and the blur signal input contact 225a on the blur prevention grip 200 are regarded as data contacts for convenience' sake. The blur signal output contact 125b on the camera 151 and the blur signal input contact 225b on the blur prevention grip 200 are regarded as clock contacts.

Even in the sixth embodiment, similar to the fifth embodiment, angular speed signals indicating angular speeds observed in two directions and derived from trembles detected by the first and second angular speed detecting means 160 and 160b are digitized by the A/D converter incorporated in the IC chip forming the CPU 167 in the camera 151.

The digitized angular speed signals indicating the angular speeds in two directions are transmitted through the data contact (blur signal output contact 125a) synchronously with a serial communication clock signal transmitted through the clock contact (blur signal output contact 125b). Thus, communication is carried out.

Moreover, the data contact 125a may be defined as an input terminal for serial data so that information input from the blur prevention grip 200 can be received by the camera 151.

Accordingly, the control circuit 217 for vibration isolation in the blur prevention grip 200 inputs information through the data contact 225a or outputs information through the data contact 225b synchronously with a synchronization clock signal for serial communication which is transmitted through the clock contact 225b.

When the communication mode is defined as mentioned above, various kinds of information can be communicated bidirectionally between the camera 151 and blur prevention grip 200.

Next, a data format of information to be communicated between the camera 151 and blur prevention grip 200 will be described.

Data communication is carried out in units of one byte, that is, 8 bits. On the side of the camera 151, first output data is provided and first input data is received. In response to the first input data, two pairs of second and third output data items and fourth and fifth output data items, each of which is 2 bytes long, may be output or nothing may be output.

The second and third output data items constitute an angular speed signal indicating an angular speed detected by the first angular speed detecting means 160, and the fourth and fifth output data items constitute an angular speed signal indicating an angular speed detected by the second angular speed detecting means 160b.

The first output data forms a signal carrying a sign indicating start of communication with the blur prevention grip 200, and is code S herein. Code S represents 53H in hexadecimal notation.

When receiving code S, if vibration isolation involving the blur prevention grip 200 is in progress, the blur prevention grip 200 transmits "1" as first input data to the camera 151. If the vibration isolation involving the blur prevention grip 200 is not in progress, the blur prevention grip 200 transmits "2" as first input data to the camera 151.

The camera 151 checks the first input data transmitted from the blur prevention grip 200. Only if the first input data represents 1, the second and third output data items and the fourth and fifth output data items are output.

Since the first input data transmitted to the camera 151 represents 1, when the second and third output data items and the fourth and fifth output data items are output, a flag indicating that blur prevention is in progress is set.

Specifically, when the first input data represents 1 or 2, it means that the blur prevention grip 200 is attached to the camera 151. If it is judged that the blur prevention grip 200 is not attached, the data contact 125a is retained in an initial state. The signal does not change states but provides code ffH (hexadecimal).

When the first input data transmitted to the camera 151 does not represent 1 or 2, it is judged that the blur prevention grip 200 is not attached to the camera 151. The flag indicating that blur prevention is in progress is reset.

When the first input data represents 2, an indication meaning that the blur prevention grip 200 is on standby is displayed on a display means (not shown) on the camera 151.

The foregoing series of operations for serial communication is carried out repeatedly and cyclically at intervals of, for example, several milliseconds. A timer is set to enable interruption after the power supply is turned on. The control unit 217 for vibration isolation in the blur prevention grip 200 monitors the clock contact 225b and data contact 225a all the time. Only when the vibration isolation button 218 is manipulated and blur signals are communicated by serial communication, power is supplied to the motors 215a and 215b for blur prevention.

The operations of the camera in which the blur prevention system of the sixth embodiment having the foregoing configuration is implemented will be described below.

Figure 49:
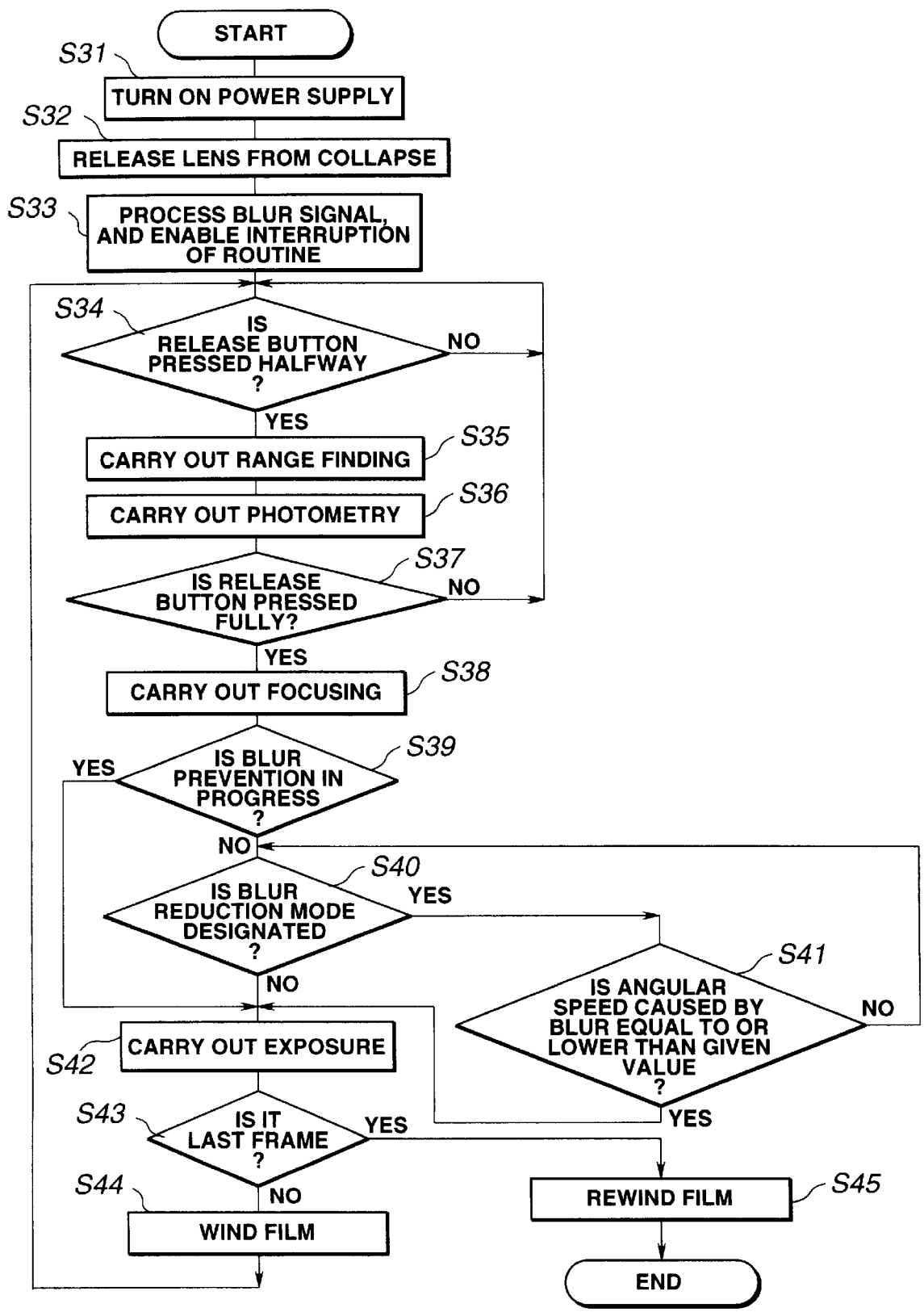
FIG. 49 is a flowchart describing the operations of a camera in which a blur prevention system in accordance with the sixth embodiment of the present invention is implemented.
Figure 50:
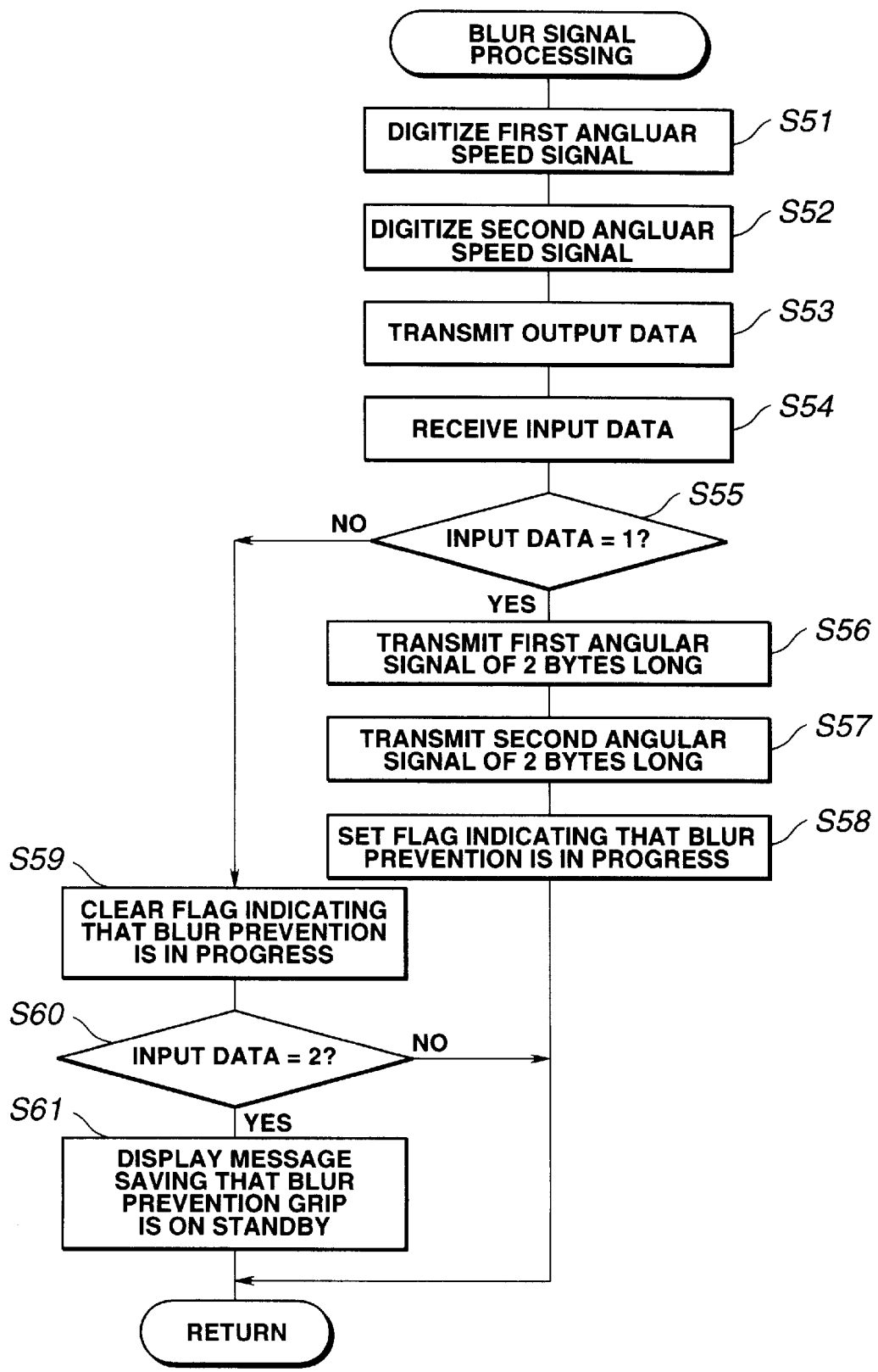
FIG. 50 is a flowchart describing a blur signal processing routine to be carried out as one of the operations of the camera shown in FIG. 49.

FIG. 49 is a flowchart describing the operations of the camera in which the blur prevention system of the sixth embodiment is implemented, and FIG. 50 is a flow chart describing a blur signal processing routine to be carried out when the camera is operating as described in FIG. 49.

As described in FIG. 49, first, at step S31, the main power supply of the camera 151 is turned on. Power is then supplied to electrical circuit blocks in the camera 151. At this time, power is also supplied to the first and second angular speed detecting means 160 and 160b corresponding to a blur detection sensor for detecting a tremble. Control is then passed to the next step S32.

At step S32, the photographic lens cylinder 153 moves from a state in which the photographic lens cylinder is collapsed in the camera 151, that is, a collapsed position, to a state in which photography can be carried out, that is, an initial position for photography, and the camera 151 becomes ready to take a photograph. Control is then passed to step S33.

At step S33, the camera 151 enables interruption for starting a blur signal processing routine so that angular speed signals can be digitized cyclically (for example, at intervals of several milliseconds) and serial communication with the blur prevention grip 200 can be carried out. Thereafter, digitization of angular speed signals is carried out cyclically. Control is then passed to the step S34.

Referring to FIG. 50, interruption for starting the blur signal processing routine will be described.

As described in FIG. 50, first, at steps S51 and S52, the A/D converter incorporated in the IC chip forming the CPU 167 in the camera 151 digitizes angular speed signals (analog signals) indicating trembles caused by trembles of hands holding the camera 151 and detected by the first and second angular speed detecting means 160 and 160b. The ditigized angular speed signals each are, for example, a signal of 2 bytes long. The blur signals provided by the first and second angular speed detecting means 160 and 160b are therefore digital signals coming to 4 bytes in length. Control is then passed to the next step S53.

At step S53, output data is transmitted serially. At step S54, input data is received serially. Control is then passed to the next step S55. At step S55, the input data is checked. If the input data is judged to represent 1, control is passed to step S56. At step S56, a first angular speed signal (2 bytes) is transmitted serially. At step S57, a second angular speed signal (2 bytes) is transmitted serially. Control is then passed to the next step S58. At step S58, the flag indicating that blur prevention is in progress is set. The blur signal processing routine is then terminated. Control is then passed to step S34 in FIG. 49 (returned).

If it is judged at step S55 that the input data does not represent 1, control is passed to step S59. At step S59, the flag indicating that blur prevention is in progress is reset, and control is passed to the next step S60.

At step S60, the input data is checked again. If it is judged that the input data represents 2, control is passed to step S61. At step S61, an indication meaning that the blur prevention grip is on standby is displayed on the display means of the camera 151. The blur signal processing routine is then terminated. Control is passed to step S34 in FIG. 49 (returned).

If it is judged at step S60 that the input data does not represent 2, the blur signal processing routine is terminated. Control is then passed to step S34 in FIG. 49 (returned).

Referring back to FIG. 49, at step S34, it is checked if an operator of the camera (photographer) has pressed the release button halfway. If it is judged that the photographer has pressed the release button 156 halfway, control is passed to the next step S35. At step S35, range finding is carried out. At step S36, photometry is carried out. Control is then passed to the next step S37.

At step S37, it is checked if the photographer has pressed the release button 156 fully. If it is judged that the photographer has pressed the release button 156 fully, control is passed to the next step S38.

At step S38, focusing is carried out by moving the photographic lens in the photographic lens cylinder to a proper position according to the result of the range finding carried out at step S35. Control is then passed to the next step S39.

At step S39, it is judged whether or not blur prevention involving the blur prevention grip is in progress. If it is judged that blur prevention involving the blur prevention grip is in progress, that is, if the flag indicating that blur prevention is in progress is set, simplified blur alleviation to be carried out solely by the camera is not carried out. Control is passed to step S42.

If it is judged at step S39 that blur prevention involving the blur prevention grip 200 is not in progress, that is, if the flag indicating that blur prevention is in progress is reset, control is passed to the next step S40. At step S40, it is checked if the camera 151 is set to the blur alleviation mode in which simplified blur alleviation is carried out. If the camera 151 is set to the blur alleviation mode, control is passed to step S41. If the camera 151 is not set to the blur alleviation mode, control is passed to the next step S42.

If it is judged at step S39 that blur prevention involving the blur prevention grip 200 is in progress or if it is judged at step S40 that the camera 151 is not set to the blur alleviation mode, control is passed to step S42. At step S42, the shutter unit 153*b* is driven according to the result of photometry carried out at step S36 responsively to the full press of the release button 156 made at step S38. Exposure is then carried out. Control is then passed to step S43.

If it is judged at step S39 that blur prevention involving the blur prevention grip 200 is not in progress, control is passed to step S40. If it is judged at step S40 that the camera 151 is set to the blur alleviation mode, control is passed to step S41. At step S41, it is checked if angular speed signals (blur signals) provided by the first and second angular speed detecting means 160 and 160*b* are equal to or smaller than the given values. If the blur signals are equal to or smaller than the given values, control is passed to step S42. At step S42, exposure is carried out. Control is then passed to the next step S43.

If it is judged at step S41 that the blur signals are not equal to or smaller than the given values, control is returned to step S40. The subsequent processing is then repeated.

At step S43, the film feeding means (not shown) is driven. At this time, it is checked if a photographic frame exposed this time is the last frame. If it is judged that the photographic frame exposed this time is not the last frame, control is passed to step S44. At step S44, film is wound by one frame (film is fed), that is, a film wind routine is executed. The next photographic frame is set to a given position in the camera 151. Control is then returned to step S34, and the subsequent processing is repeated.

If it is judged at step S43 that the photographic frame exposed this time is the last frame, control is passed to step S45. At step S45, the film feeding means in the camera 151 rewinds the film (feeds the film), that is, a film rewind routine is executed. Thereafter, the whole camera 151 is locked (use of the camera is disabled) for fear that a photographer may use the camera 151 for photography while being unaware of the fact that the loaded film has been exposed. The sequence is then terminated (ended).

The operations of the blur prevention grip included in the blur prevention system of the sixth embodiment will be described below.

Figure 51:
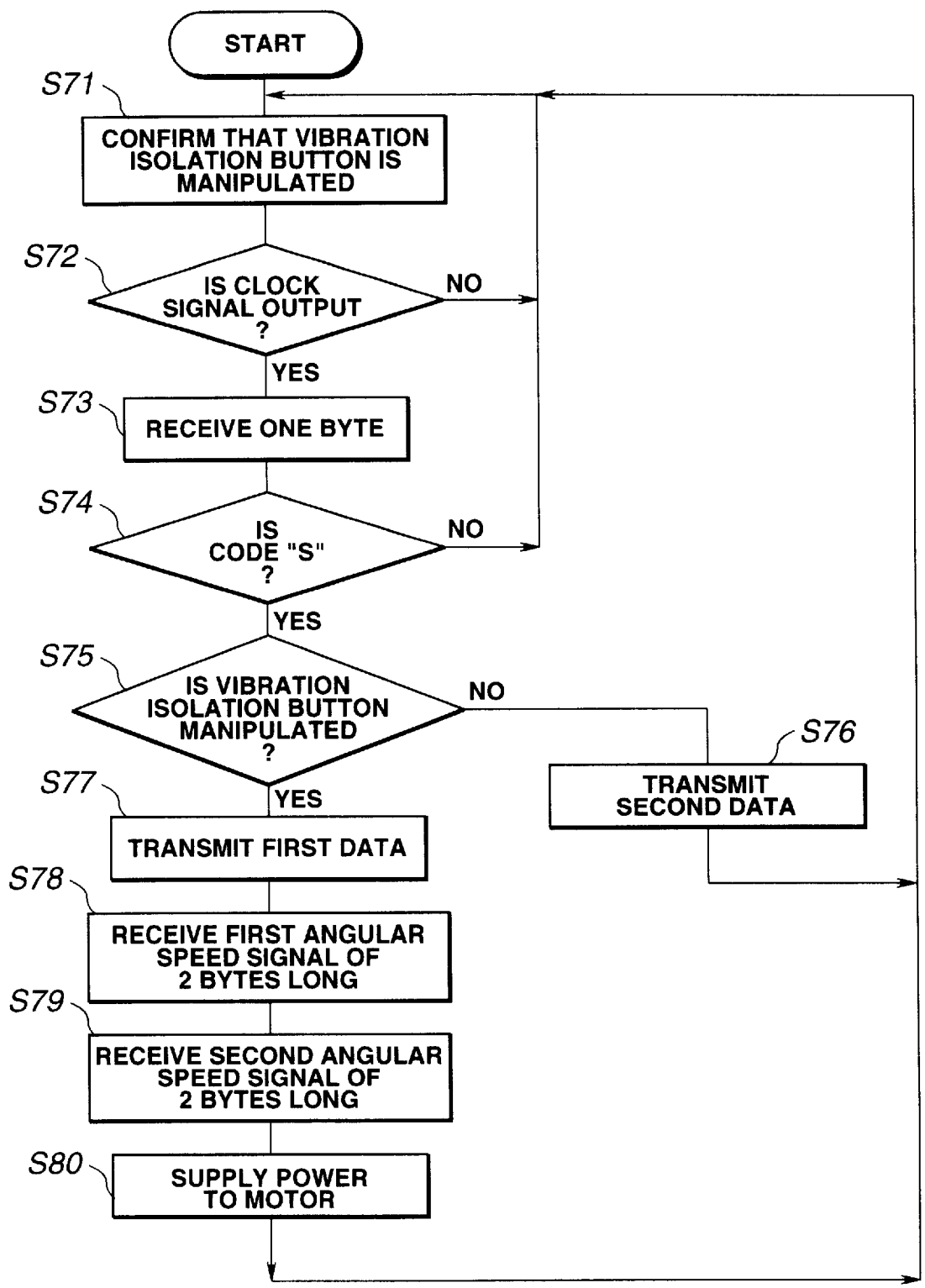
FIG. 51 is a flowchart describing the operations of a blur prevention grip to be adapted to the blur prevention system in accordance with the sixth embodiment of the present invention.

FIG. 51 is a flowchart describing the operations of the blur prevention grip included in the blur prevention system of the sixth embodiment.

As described in FIG. 51, first, at step S71, the manipulated state of the vibration isolation button 218 is checked. Control is then passed to the next step S72. At step S72, it is checked if a clock signal is present. Serial communication between the blur prevention grip 200 and camera 151 is then started. If the clock signal is detected, control is passed to the next step S73. If the clock signal is not detected, control is returned to step S71.

At step S73, first, one byte is received. At the next step S74, it is checked if a code received at step S73 is code S instructing communication between the camera 151 and blur prevention grip 200. If it is judged that the code is not code S, control is returned to step S71.

If it is judged at step S74 that the code received at step S73 is code S, control is passed to the next step S75.

At step S75, the manipulated state of the vibration isolation button 218 is checked. If it is judged that the vibration isolation button 218 has been pressed and turned on, control is passed to the next step S77. At step S77, 1 is transmitted as first input data to the camera 151. Control is then passed to the next step S78.

At step S78, a first angular speed signal of two bytes long is received. At step S79, a second angular speed signal of two bytes long is received. Control is then passed to the next step S80. At step S80, power is supplied to the motors for blur prevention 215 and 215*b* by the motor drive circuit 216 according to the first and second angular speeds received at steps S78 and S79. Blur prevention is then started. Control is then returned to step S71, and the subsequent processing is repeated.

If it is judged at step S75 that the vibration isolation button 218 has not been manipulated and remains off, control is passed to step S76. At step S76, 2 is transmitted as first input data to the camera 151. Control is then returned to step S71. The subsequent processing is then repeated.

By repeating the foregoing operations described in FIG. 51, vibration isolation for the camera 151 is executed continually while the vibration isolation button 218 remains on.

As mentioned above, according to the sixth embodiment, while the blur prevention grip 200 is in operation, simplified blur alleviation to be carried out solely by controlling the camera 151 so that it is not activated. Thus, a blur prevention system contributing to prevention of wasteful power consumption and saving power can be realized.

In the blur prevention system of the fifth embodiment, for transmitting various kinds of information, input and output terminals associated with the kinds of information, for example, input and output terminals connected to a switch for detecting the attached state of the blur prevention grip 200 and output terminals through which blur signals are transmitted to the camera 151 while the blur prevention grip 200 is in operation must be formed additionally (added). In the blur prevention system of the sixth embodiment, since various kinds of information are transmitted serially, new input and output terminals need not be added. Input and output terminals used to connect the camera 151 to the blur prevention grip 200 can therefore be simplified. This contributes to improvement of maintenance efficiency and to reduction of manufacturing cost.

In the fifth or sixth embodiment, during simplified blur alleviation, release (exposure) is enabled according to the timing that a magnitude of trembling gets smaller. The present invention is not limited to this mode. Alternatively, for example, a magnitude of trembling may be displayed. In this case, when a photographer checks the display to recognize that the magnitude of trembling gets smaller, the photographer presses the release button to release the shutter. Furthermore, when the magnitude of trembling is large, an alarm may be displayed. In this case, when the alarm is not displayed, a photographer presses the release button.

Next, the basic configurations of a blur prevention system conformable to aspects of the present invention set forth in FIGS. 55 and 75 will be described.

Figure 52:
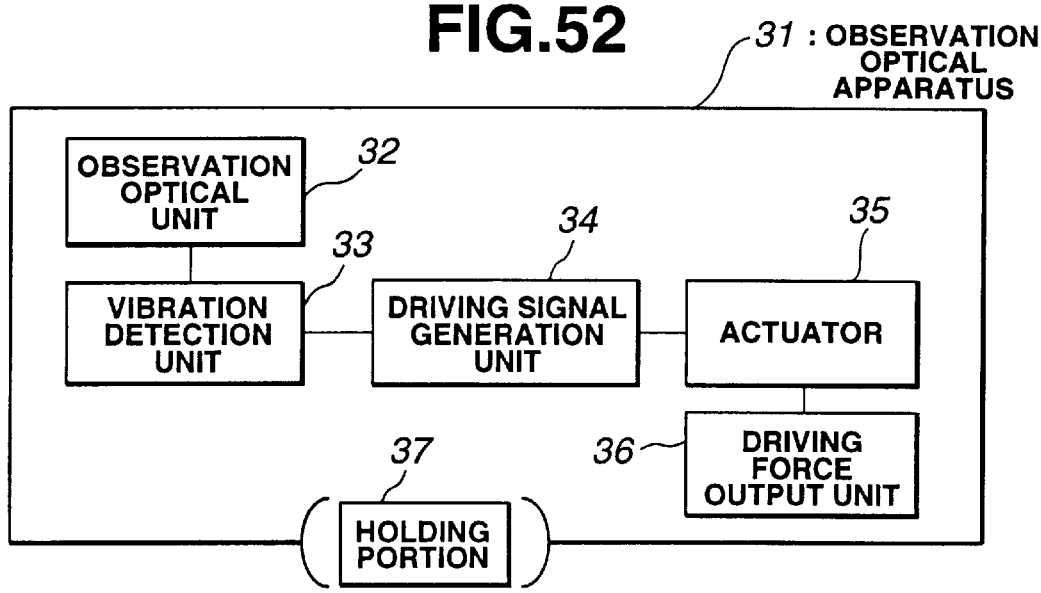
FIG. 52 is a conceptual diagram showing the eighth basic configuration of a blur prevention system in accordance with the present invention.

FIG. 52 is a conceptual diagram showing the eighth basic configuration of a blur prevention system in accordance with the present invention.

As shown in FIG. 52, an observation optical apparatus 31 comprises an observation optical unit 32, vibration detection unit 33, driving signal generation unit 34, actuator 35, driving force output unit 36, and holding portion 37. The optical apparatus 31 is, for example, a viewfinder of a camera, binoculars, or a telescope and is an apparatus for observing an object using the observation optical unit 32.

When the vibration detection unit 33 detects a vibration occurring in the optical apparatus 31 or observation optical unit 32, the driving signal generation unit 34 generates a driving signal instructing drive of the actuator 35 so that the vibration detected by the vibration detection unit 33 will be nearly nullified. The actuator 35 is then driven in order to cancel the vibration of the apparatus derived from a tremble. A driving force exerted by the actuator 35 is output to the outside of the optical apparatus 31 by the driving force output unit 36.

The holding portion 37 is formed to assist a photographer in holding the optical apparatus. The driving force output unit 36 is located in the vicinity of the holding portion 37.

Figure 53:
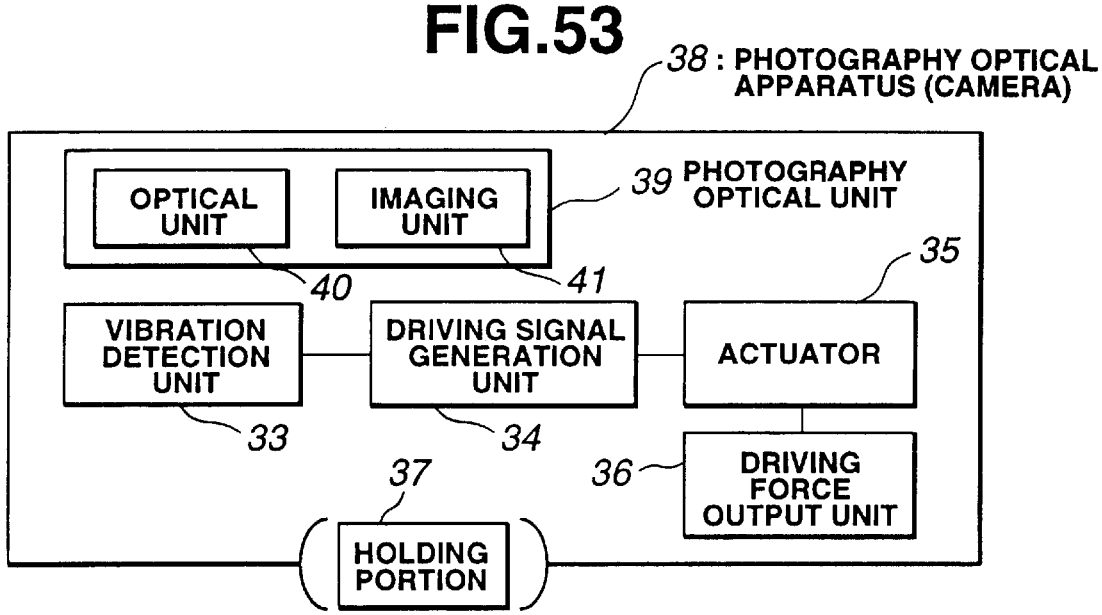
FIG. 53 is a conceptual diagram showing the ninth basic configuration of a blur prevention system in accordance with the present invention.

The eighth basic configuration may be such that the optical axis of the observation optical unit 32 is fixed relative to the optical apparatus 31 and the optical apparatus 31 and observation optical unit 32 are deflected unitedly. The eighth basic configuration can be adapted to a photography optical apparatus having a photography optical system, that is, a camera. FIG. 53 is a conceptual diagram showing the ninth basic configuration in accordance with the present invention.

In FIG. 53, a camera 38 that is a photography optical apparatus comprises a photography optical unit 39 including an optical unit 40 and imaging unit 41 for photographic an object, a vibration detection unit 33, a driving signal generation unit 34, an actuator 35, a driving force output unit 36, and a holding portion 37.

In the camera 38, a vibration occurring in the camera 38 or photography optical unit 39 is detected by the vibration detection unit 33. The driving signal generation unit 34 generates a driving signal instructing drive of the actuator 35 so that the vibration detected by the vibration detection unit 33 will be nearly nullified. With the driving signal instructing drive of the actuator 35, the actuator 35 is driven in order to cancel the vibration of the apparatus derived from a tremble. A driving force exerted by the actuator 35 is output to the outside of the camera 38 by the driving force output unit 36.

In the ninth basic configuration, similar to the eighth basic configuration, the driving force output unit 36 may be located in the vicinity of the holding portion 37 by which a photographer holds the camera. In the ninth basic configuration, similar to the eighth basic configuration, the optical axis of the photography optical unit 39 may be fixed with respect to the camera 38 and the camera 38 and photography optical unit 39 may be deflected unitedly.

Figure 54:
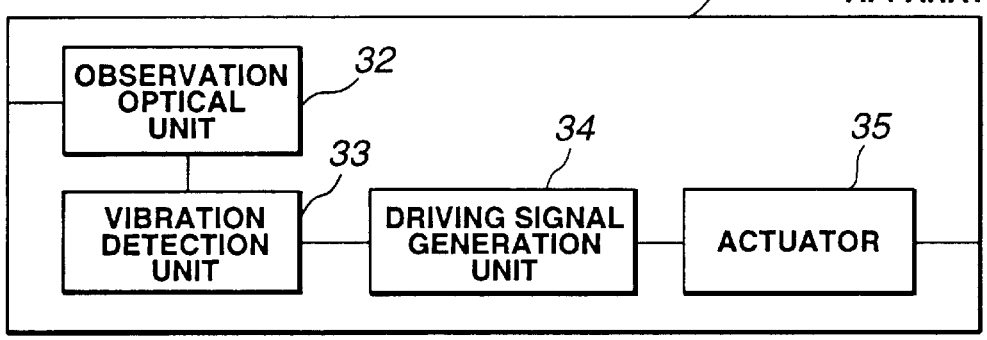
FIG. 54 is a conceptual diagram showing the tenth basic configuration of a blur prevention system in accordance with the present invention.

FIG. 54 is a conceptual diagram showing the tenth basic configuration in accordance with the present invention. As shown in FIG. 54, an observation optical apparatus 31A comprises an observation optical unit 32, vibration detection unit 33, driving signal generation unit 34, and actuator 35.

The optical apparatus 31A includes the observation optical unit 32 used to observe an object (or the photography optical unit 39, shown in FIG. 53, including the optical unit 40 and imaging unit 41 for photographing an object). A vibration occurring in the optical apparatus 31A due to a tremble is detected by the vibration detection unit 33. The driving signal generation unit 34 generates a driving signal instructing drive of the actuator 35 so that the vibration detected by the vibration detection unit 33 will be nearly nullified.

The tenth basic configuration is characterized in that the optical axis of the observation optical unit 32 (or an equivalent of a photography optical system) is fixed with respect to the optical apparatus 31A, and the optical axis of the optical unit is deflected together with that of the optical apparatus 31A by means of the actuator 35.

Next, embodiments having the eighth to tenth basic configurations will be described. To begin with, the seventh embodiment of the present invention will be described below.

Figure 55:
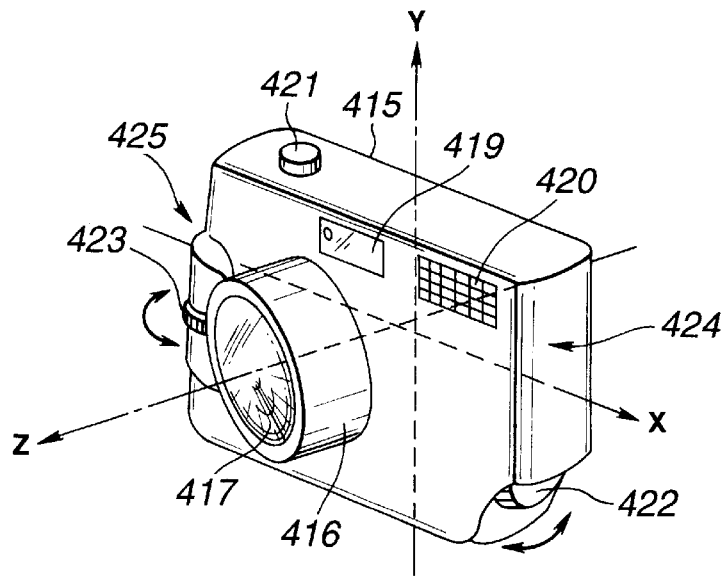
FIG. 55 is an oblique view showing the appearance of a camera in which a blur prevention system in accordance with the seventh embodiment of the present invention is implemented.
Figure 56:
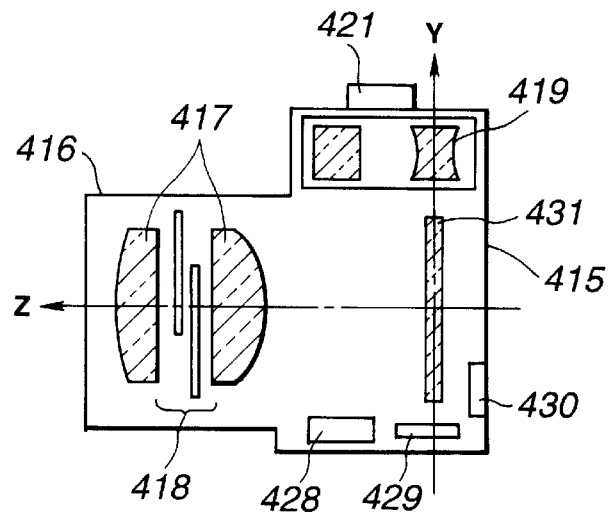
FIG. 56 is a side view showing the layout of internal component members of the camera shown in FIG. 55.
Figure 57:
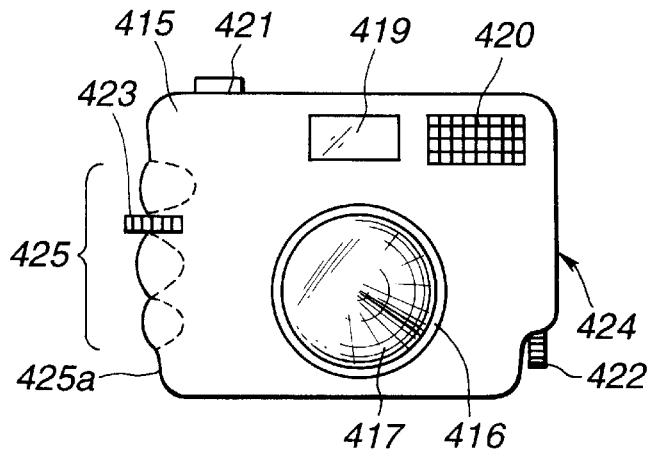
FIG. 57 is a front view of the camera shown in FIG. 55.
Figure 58:
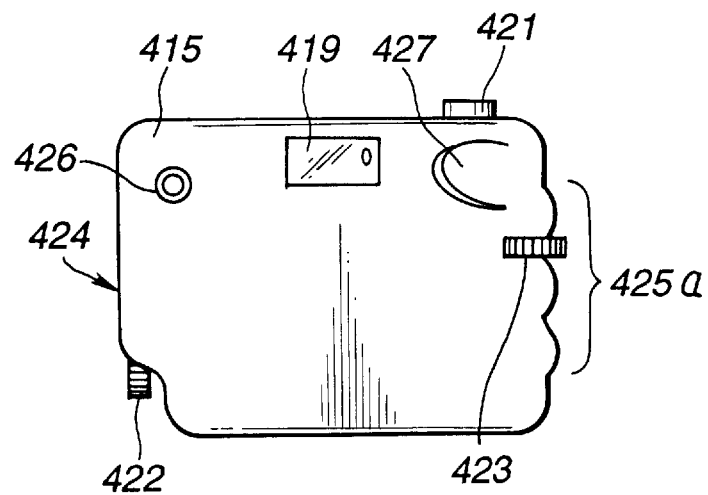
FIG. 58 is a rear view of the camera shown in FIG. 55.
Figure 59:
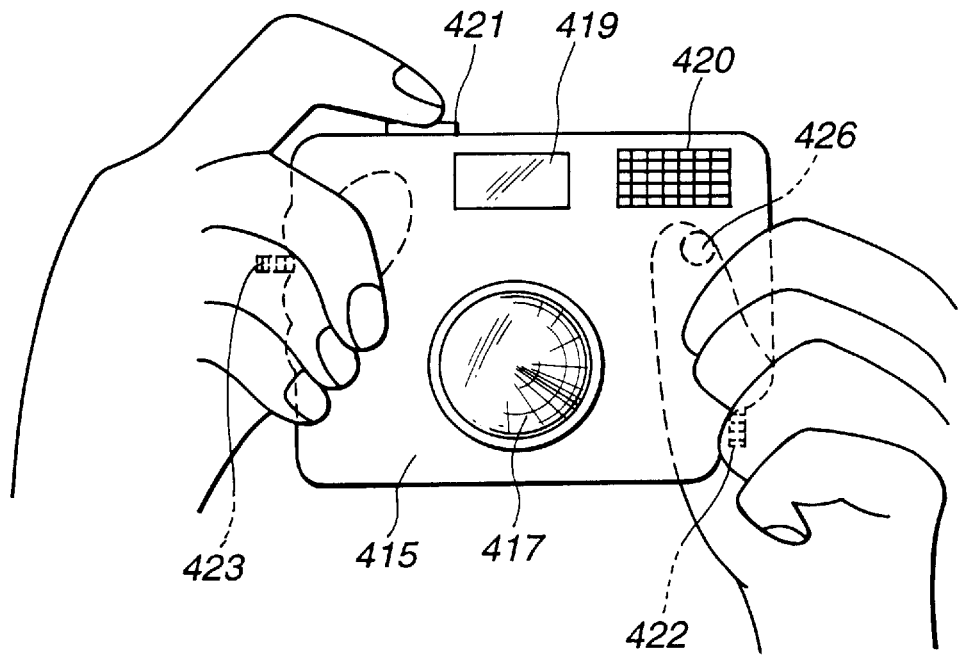
FIG. 59 is a diagram showing a manipulated state of the camera shown in FIG. 55.

FIGS. 55, 56, 57, 58, and 59 are diagrams showing an example of a camera in which a blur prevention system in accordance with the present invention is implemented. FIG. 55 is an oblique view of the camera, FIG. 56 is a side view showing the layout of component members inside the camera, FIG. 57 is a front view of the camera, FIG. 58 is a rear view of the camera, and FIG. 59 is a diagram showing an example of a state in which the camera is manipulated.

A lens cylinder 416 is located on the face of a camera 415 of this embodiment. The lens cylinder 416 includes a photographic lens 417 for forming an object image on film 431, and a shutter unit 418 for properly exposing the film 431 to light (See FIG. 56).

The camera 415 has a viewfinder 419 (corresponding to the photography optical unit 32 in FIG. 52) used to check an object image formed on the film 431, and a strobe unit 420 serving as an auxiliary light source for attaining proper exposure when the brightness of an object is insufficient. In addition, a release button 421 for instructing actual photography is located on the top of the camera 415.

Furthermore, a first blur correction roller 422 for blur correction is, as shown in FIG. 58, located on the left-hand side of the camera 415 with respect to the back of the camera, and a second blur correction roller 423 for blur correction is located on the right-hand side of the camera 415 (the details will be described later).

The photography optical unit 39 (See FIG. 53) is composed of a photographic lens 417 and film 431. The photography optical unit 39 changes the positional relationship thereof relative to the camera 415 for focusing. The change is a movement in a direction of the optical axis. Even when the camera is rotated, the photography optical unit maintains a fixed positional relationship relative to the camera 415. In relation to the viewfinder 419, the photography optical unit makes an change in internal position in line with a change in diopter or angle of view. Since the photography optical unit 39 is located along the optical axis to be opposed to an object to be photographed, even when the camera 415 is rotated, the photography optical unit maintains the fixed positional relationship relative to the camera 415.

On the left-hand and right-hand sides of the camera 415 with respect to the back of the camera 415, a left-hand holding portion 424 and right-hand holding portion 425 are formed so that a photographer can hold the camera 415 easily with his/her left hand and right hand. A vibration isolation button 426 that is a switch for starting or stopping vibration isolation is included in the left-hand holding portion 424, and a thumb rest 427 formed on the back of the camera and a grip 425a on which four remaining fingers from an index finger to little finger are rested are included in the right-hand holding portion 425. Thus, a photographer can manipulate the release button 421 easily while gripping the camera with his/her right hand.

A first blur correction roller 422 is located inside the right-hand holding portion 424 so that the first blur correction roller can rotate about an axis parallel to the x axis on the bottom of the camera. Part of the first blur correction roller 422 is exposed so that when a photographer holds the camera, part of his/her left hand's fingers will touch the surface of the first blur correction roller 422. The exposed part is located at a position at which the roller will not touch a base or the like on which the camera is mounted.

Likewise, a second blur correction roller 423 is located inside the right-hand holding portion 425 so that the second blur correction roller can rotate about an axis parallel to the y axis on the side of the camera. Part of the second blur correction roller 423 is exposed so that when a photographer holds the camera, his/her right hand's palm will touch the surface of the second blur correction roller 423.

On the back of the camera 415, a film feeder that is not shown is located for feeding or rewinding the film 431.

A CPU 428 including a so-called microcomputer is, as shown in FIG. 56, located on the inner surface of the bottom of the camera 415. The operations of the entire camera 415 are controlled on a centralized basis according to programs to be run by the CPU 428.

Furthermore, a first angular speed detector 429 for detecting an angular speed caused by a vibration in a direction of nodding of the camera 415 (about the x axis) and a second angular speed detector 430 for detecting an angular speed caused by a rotation in a direction of yawing (about the y axis) of the camera 415 are included as a vibration detection unit 33 in the camera 415. The angular speed detectors 429 and 430 are so-called gyro type angular speed sensors for detecting an angular speed by detecting a difference between charges generated by a pair of piezoelectric elements, which resonate within an ultrasonic frequency band, according to the piezoelectric effect.

Figure 60:
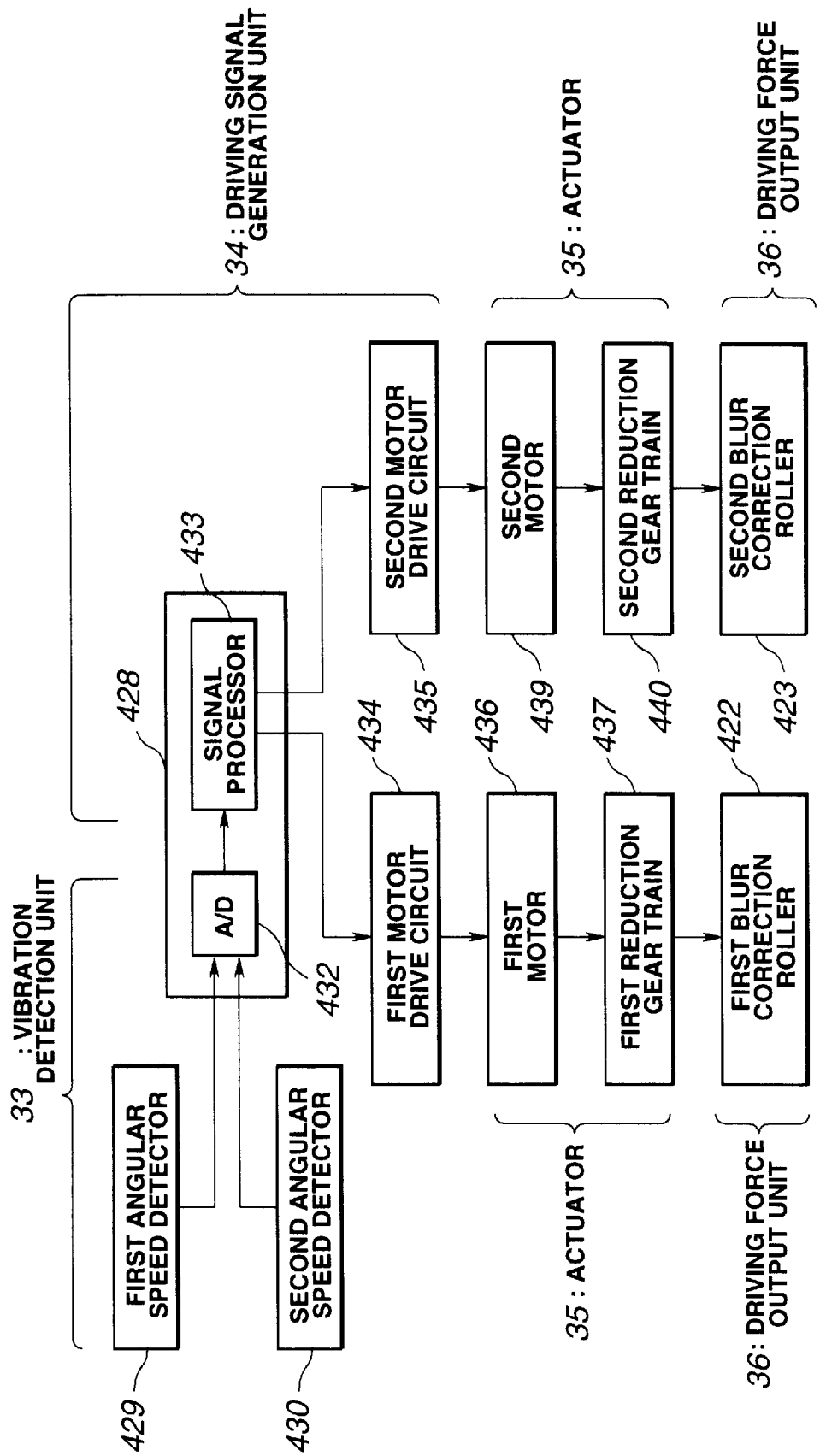
FIG. 60 is a block diagram showing a blur correction driving mechanism for the camera shown in FIG. 55.

FIG. 60 is a block diagram showing the configuration of a blur correction driving mechanism for blur prevention in the camera 415.

Analog signals indicating angular speeds detected by the two angular speed detectors 429 and 430 are supplied to the CPU 428, and digitized by an A/D converter 432 incorporated in the IC chip forming the CPU 428. This enables the microcomputer to process the signals. An output of the A/D converter 342 is supplied to the outside of the CPU 428 via a signal processor 433 for the purpose of blur prevention.

A first motor drive circuit 434 used to correct a blur derived from a tremble about the x axis and a second motor drive circuit 435 used to correct a blur derived from a tremble about the y axis are connected as part of a blur prevention system to the CPU 428. A first motor 436 is connected to the first motor drive circuit 434. A first reduction gear train 437 for reducing in speed or energizing a rotational output is coupled with the first motor 436, and a first blur correction roller 422 is coupled with an output terminal of the first reduction gear train 437.

Likewise, a second motor 439 is connected to the second motor drive circuit 435. A second reduction gear train 440 and second blur correction roller 423 are coupled with an output terminal of the second motor 439.

In FIG. 60, the first and second angular speed detectors 429 and 430 and the A/D converter 432 in the CPU 428 correspond to the vibration detection unit 33. The signal processor 433 in the CPU 428 and the first and second motor drive circuits 434 and 435 correspond to the driving signal generation unit 34 for generating a driving signal used to drive the actuator 35 designed for blur prevention. The first and second motors 436 and 439 and the first and second reduction gear trains 437 and 440 correspond to the actuator 35 designed for blur prevention, and the first and second blur correction rollers 422 and 423 correspond to the driving force output unit 36.

Figure 61:
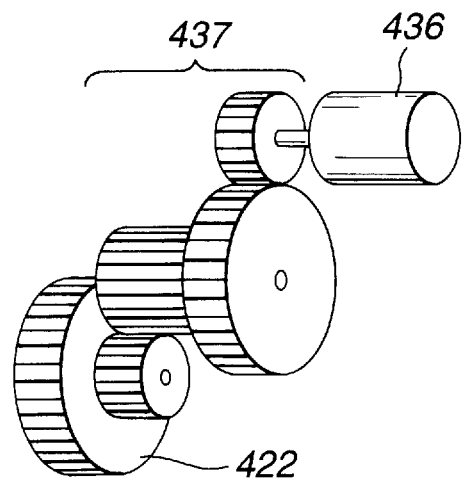
FIG. 61 is an oblique view showing a first motor and first reduction gear train included in a major portion of the blur correction driving mechanism shown in FIG. 60.
Figure 62:
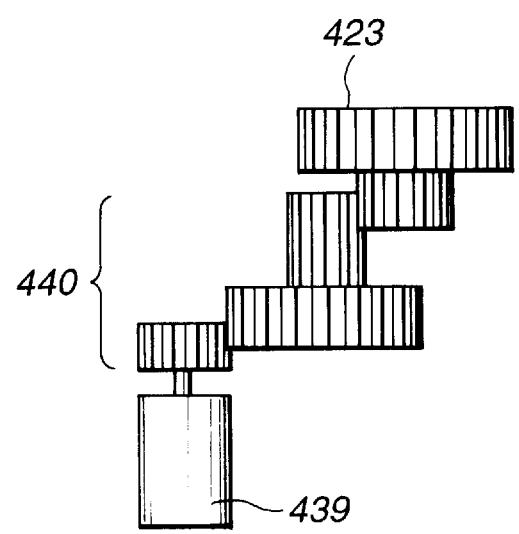
FIG. 62 is a front view showing a second motor and second reduction gear train included in the major portion of the blur correction driving mechanism shown in FIG. 60.

FIG. 61 is an oblique view showing the first motor and first reduction gear train included in a major portion of the blur correction driving mechanism designed for blur prevention in the camera 415. FIG. 62 is a front view showing the second motor and second reduction gear train alone included in the major portion of the blur correction driving mechanism.

The first and second motor drive circuits 434 and 435 constitute a so-called bridge circuit, and supply power to the first motor 436 and second motor 439 respectively. The motors rotate at given speeds in designated directions according to the values and directions of voltages and currents supplied. The rotations of the motors are reduced in speed or energized by the reduction gear trains 437 and 440, whereby the blur correction rollers 422 and 423 are rotated.

Figure 63:
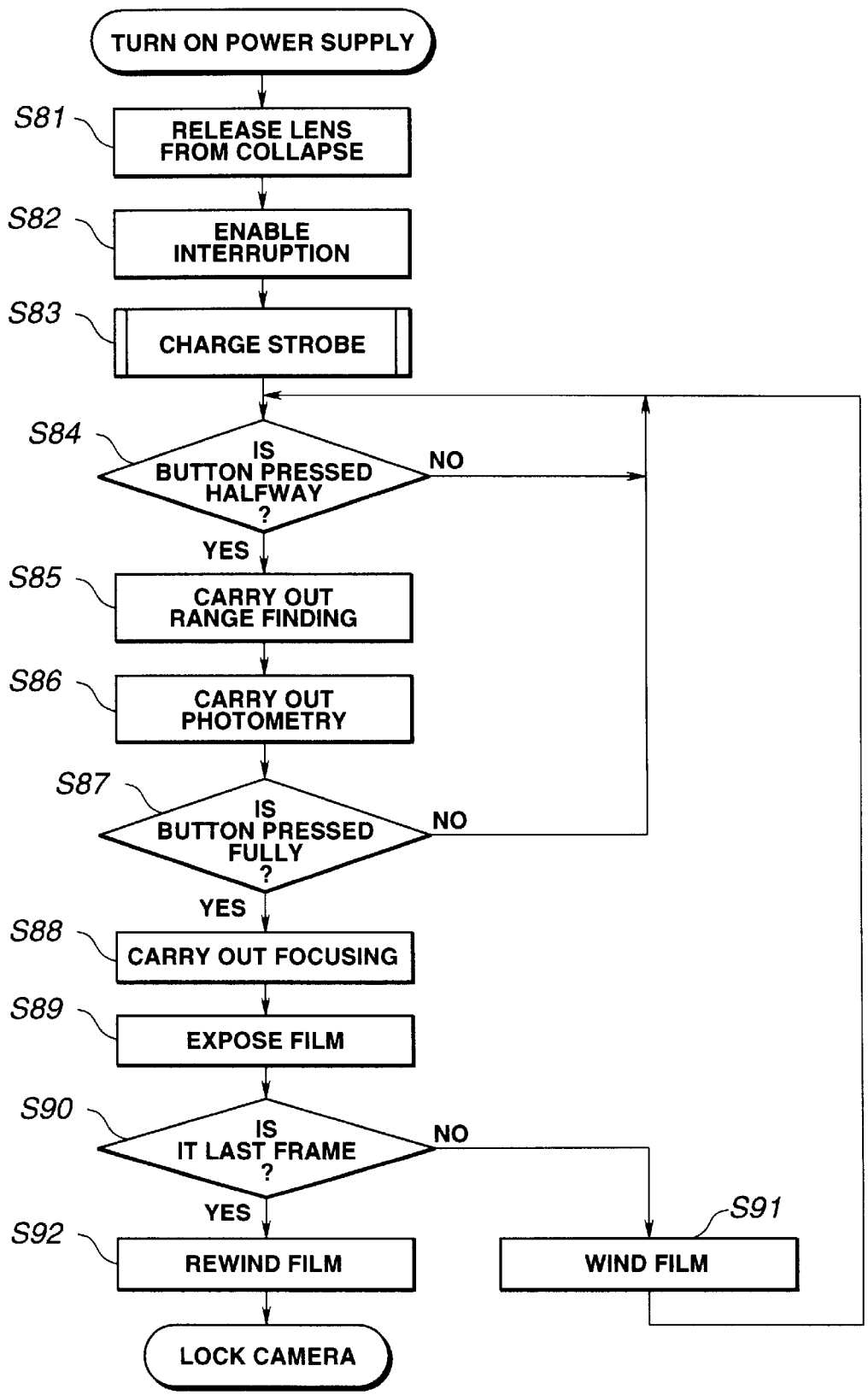
FIG. 63 is a flowchart describing the fundamental operations of the camera shown in FIG. 55.

Next, the basic operations of the camera will be described with reference to the flowchart of FIG. 63.

When the power supply of the camera is turned on, power is supplied to the electrical circuit blocks of the camera 415. Power is also supplied to the two angular speed detectors 429 and 430 for detecting a tremble. At step S81, the photographic lens is moved from a so-called collapsed position to a photography-enabled position. When the camera becomes ready to perform photography, control is passed to step S82. Interruption for starting a blur signal processing routine to be described later is enabled in order to carry out digitization and processing of angular speed signals cyclically, for example, at intervals of several milliseconds. Thus, the angular speed signals are digitized cyclically.

After the foregoing initialization is completed, a strobe charge routine is executed at step S83. Required power is stored in a capacitor for the strobe. After storing required power is completed, the strobe charge routine is terminated.

At step S84, the state of the halfway press sensing switch for detecting if the release button 421 has been pressed halfway is judged. When a photographer presses the release button 421 halfway, range finding and photometry are carried out in the camera at steps S85 and S86. At step S87, it is judged whether or not the release button 421 has been pressed fully. If the release button 421 has not been pressed fully, control is returned to step S84. If the release button 421 has been pressed fully, control is passed to step S88. Based on the result of range finding, the photographic lens 417 in the photographic lens cylinder 416 is moved to a proper position. Thus, focusing is carried out.

After focusing is completed, at step S89 the shutter unit 418 is used to expose the film 431 to light carrying an object image to be formed by the photographic lens 417 by a proper magnitude of exposure. If an amount of light in a field of view is too small to provide a proper amount of light, the strobe unit 420 is used to illuminate an object. In the meantime, exposure is carried out.

When exposure of the film 431 by the shutter unit 418 is completed, it is judged at step S90 whether the exposed frame of the film is the last frame. If the exposed frame is not the last frame, control is passed to step S91 for subsequent photography. The film feeder winds the film 431 by one frame (wind routine). If it is found at step S90 that the exposed frame is the last frame of the film 431, control is passed to step S92. The film feeder then rewinds the film (rewind routine). Thereafter, the use of the camera is disabled (the camera is locked) for fear that a photographer may use the camera although the film 431 is unusable.

Figure 64:
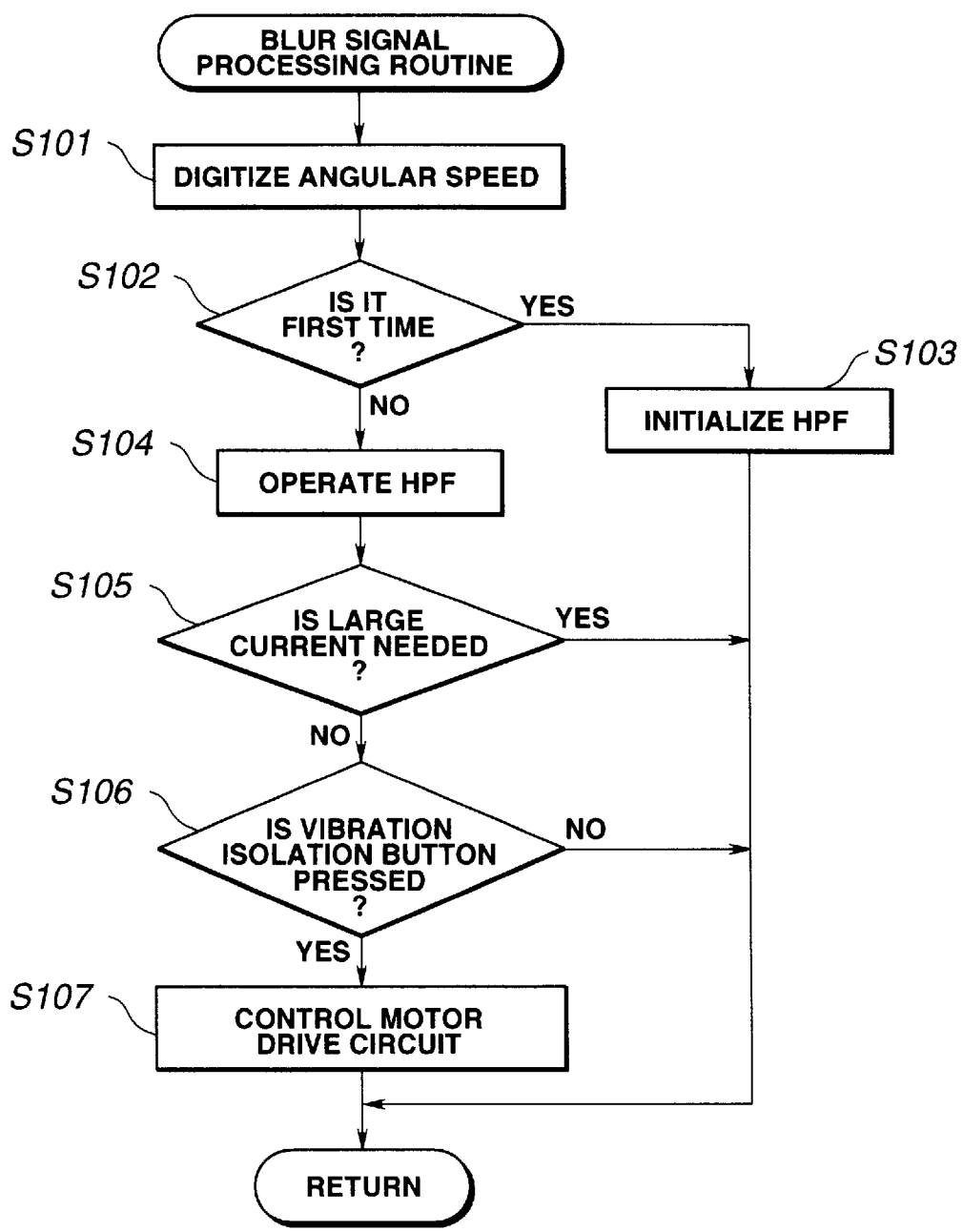
FIG. 64 is a flowchart describing a blur signal processing routine that is one of the operations of the camera shown in FIG. 55.

FIG. 64 is a flowchart describing a blur signal processing routine that is one of the operations of the camera 415.

At step S101, the A/D converter 432 is used to digitize analog angular speed signals that indicate trembles of the camera and are sent from the first angular speed detector 429 and second angular speed detector 430. The digitized angular speed signals have offset components thereof removed by digital high-pass filters (HPFs). For the filtering, a method of adding a difference between an angular speed digitized at the time of previous interruption and an angular speed obtained this time to a value slightly smaller than a previous output of each HPF is adopted. Thus, an output of each HPF is provided. The time constant of each HPF and other characteristics thereof can be determined according to the method for decreasing the previous output of the HPF and the smaller value.

At the first time of interruption, the result of previous A/D conversion and an output of each HPF are unavailable. If it is judged at step S102 that this interruption is the first one, control is passed to step S103. An output of each HPF is set to a value indicating an angular speed of zero. Thereafter, the routine is escaped. Thus, both the result of previous A/D conversion and a previous output of each HPF are obtained at the next time. An output of each HPF always starts with a value indicating an angular speed of zero.

If it is judged at step S102 that this interruption is not the first one, high-pass filtering (HPF) on angular speeds is carried out at step S104. Thereafter, it is judged at steps S105 and S106 whether or not blur prevention drive is carried out. For this judgment, it is judged whether or not the camera requires a large current for strobe charge or film wind (step S105) and whether or not the vibration isolation button 426 has been manipulated by a photographer (step S106).

If it is judged at step S105 that the camera needs a large current, the processing will proceed as described below. That is to say, if the motor is rotated in order to consume current for blur prevention, the ability of the power supply may be insufficient. The power insufficiency may lead to a malfunction of the camera. In this case, therefore, it is inhibited to drive the motor for blur prevention. The blur signal processing routine is terminated. It is enabled to judge whether or not the camera needs a large current by setting a flag within an interruption routine such as the strobe charge routine, wind routine, or rewind routine that is one of the operations of the camera.

If it is judged at step S105 that the camera does not need a large current, it is judged at step S106 whether or not the vibration isolation button 426 has been manipulated by a photographer. If it is not sensed that the vibration isolation button 426 has been manipulated by the photographer, the routine is terminated.

By contrast, if it is sensed at step S106 that the vibration isolation button 426 has been pressed by the photographer, control is passed to step S107. At step S107, the CPU 428 controls the first motor drive circuit 434 and second motor drive circuit 435. For this control, signals resulting from HPF on angular speeds observed about the x axis and y axis respectively are employed. For approaching the values represented by the signals to zeroes, the motor drive circuits 434 and 435 are controlled so that the first blur correction roller 422 and second blur correction roller 423 associated with the axes can be rotated in directions in which the first angular speed detector 429 and second angular speed detector 430 detect the angular speeds.

With the operations of the first motor drive circuit 434 and second motor drive circuit 435, the two blur correction rollers are rotated. Torques exerted by the rollers are conveyed to photographer's hands holding the camera 415. With reactions to the torques, the camera 415 receives torques in directions opposite to the directions of rotation of the rollers, and then rotates. The rotations that are the reactions cancel the rotations derived from existing trembles. This causes the two signals provided by the angular speed detectors to become zeroes or approach zeroes. The vibrational rotations of the camera 415 and the photography optical unit 39 or observation optical unit 32 attached to the camera 415 derived from the trembles can be suppressed.

After instruction signals used to control the first motor drive circuit 434 and second motor drive circuit 435 are thus output, the interruption routine of blur signal processing is terminated.

Next, blur prevention to be carried out in the camera 415 will be described in conjunction with FIGS. 65, 66, 67, and 68. On the assumption that the camera 415 is rotated about the x axis due to operator's trembles, a discussion will be made.

Figure 65:
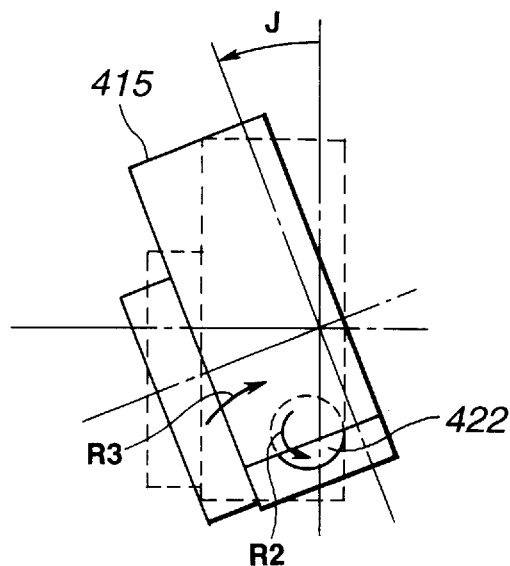
FIG. 65 is a diagram for explaining operations of the camera shown in FIG. 55 for preventing a blur derived from a tremble about an x axis, showing the direction of rotation of the camera.
Figure 66:
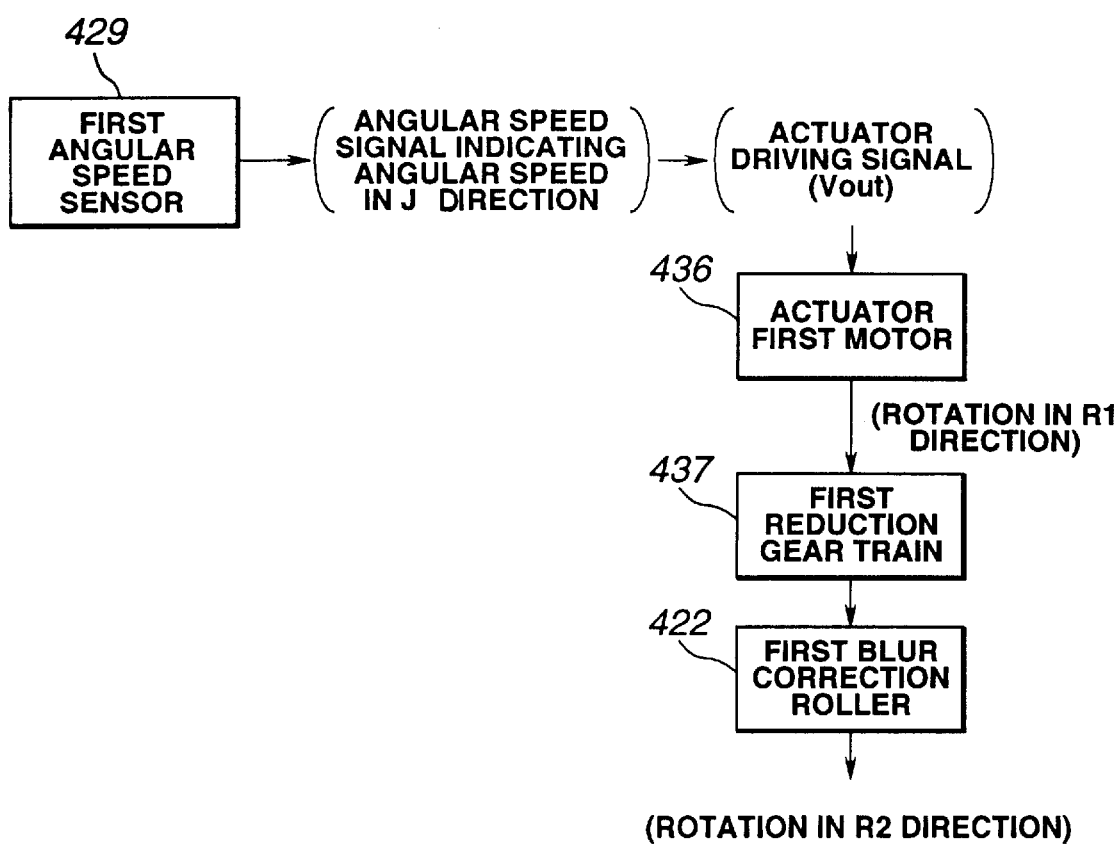
FIG. 66 is a block diagram for explaining a control flow for the operations of the camera shown in FIG. 55 for preventing a blur derived from a tremble about the x axis using a blur correction driving mechanism.

As shown in FIG. 65, the camera 415 is rotated in a direction of arrow J. At this time, as shown in FIG. 66, the first angular speed detector 429 outputs an angular speed signal proportional to the magnitude of the rotation of the camera 415. The angular speed signal is processed by the HPF to be run under the CPU 428. Power proportional to the angular speed should, in principle be supplied to the actuator (35). However, for operating a motor, when power is lower than a certain level, since energy required for the motor to operate cannot be produced, the motor is not actuated. Basic power required for the actuation varies depending on a power loss caused by the resistance of a coil, and a loss caused by an axial friction of the shaft of a motor or a load to be actuated with an output of the motor (in this case, a reduction gear train or roller used for blur prevention).

Power proportional to an angular speed is applied to a motor with the basic power added. For example, if a motor is operated by controlling a voltage, assuming that the basic power is Vb, the angular speed is x, and a proportion constant is α, an applied voltage Vout should be defined as follows:

$$Vout = \alpha \times x + Vb$$

If power to be supplied to a motor is controlled by performing pulse-width modulation (PWM), assuming that the duty ratio of basic power is Rb and a proportional constant is β, the duty ratio of supplied power Rout should be defined as follow:

$$Rout = \beta \times x + Rb$$

wherein the upper limit of the duty ratio is 1.

When an angular speed is nearly zero, if blur prevention is not required, the applied voltage Vout and duty ratio of supplied power Rout are both set to zero. Thus, a power consumption can be saved.

Figure 69:
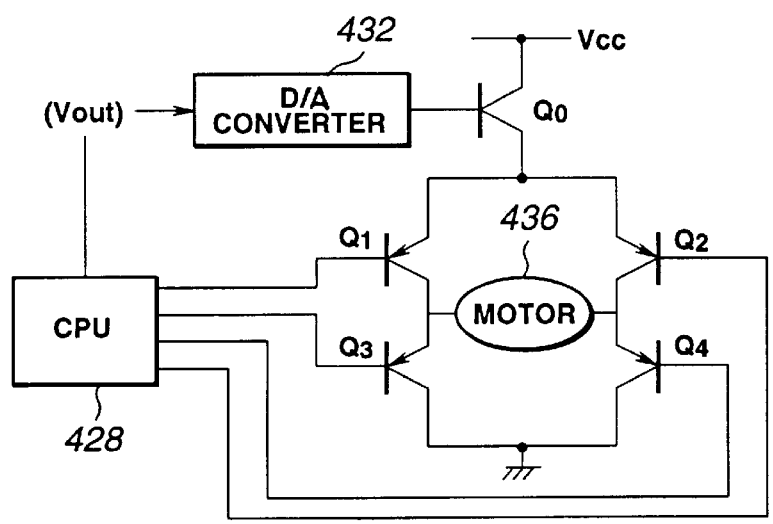
FIG. 69 is a circuit diagram showing an example of a motor drive circuit in the camera shown in FIG. 55.

If a motor is controlled by controlling a voltage, a motor drive circuit like the one shown in FIG. 69 is used to control a voltage to be applied to a bridge circuit. In the motor drive circuit, an applied voltage Vout that is calculated according to the above expression is converted into an analog form by a D/A converter and then applied to a current amplification circuit composed of power transistors Q1 to Q4 via a transistor Q0. The current amplification circuit produces a current required for driving a motor, and the current is supplied to the bridge circuit.

Figure 70:
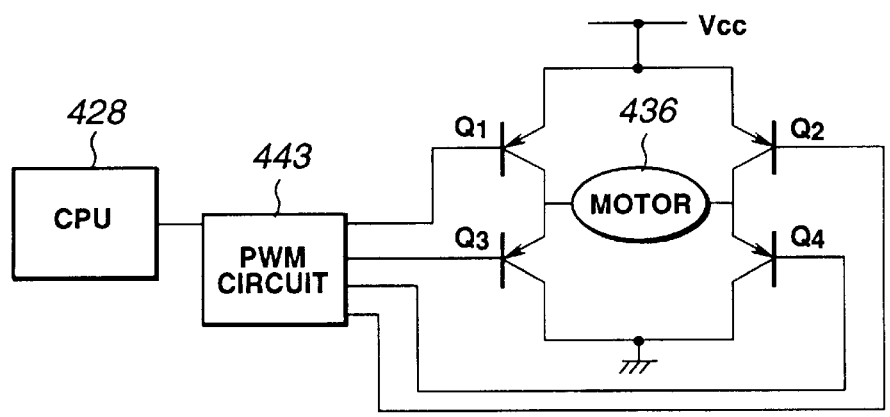
FIG. 70 is a circuit diagram showing another example of the motor drive circuit in the camera shown in FIG. 55.

As shown in FIG. 70, when only a PWM circuit 443 is used to control a motor, a voltage to be applied to a bridge circuit may be a constant voltage.

An angular speed signal resulting from HPF bears a sign because it is a signal alternating with respect to zero. With the angular speed signal bearing a sign, a direction of rotation in which a motor is actuated is determined. That is to say, depending on whichever pnp transistor and npn transistor opposed to the pnp transistor out of two pairs of pnp transistors and npn transistors, which constitute a bridge circuit, are turned on, the direction of a voltage or current applied to a motor 436 connected in the middle of the transistors is switched.

Figure 71:
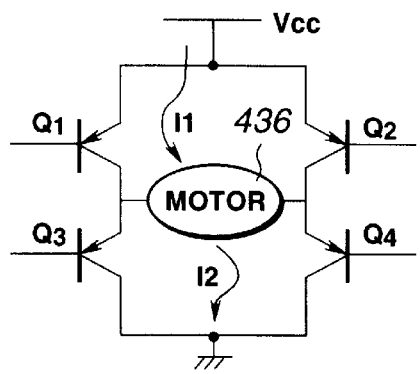
FIG. 71 is a diagram showing an example of a direction in which a current flows in a bridge circuit for a motor in the camera shown in FIG. 55.
Figure 72:
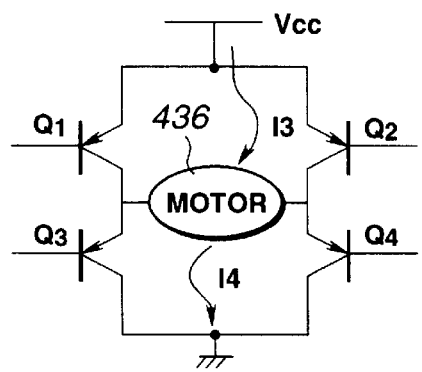
FIG. 72 is a diagram showing another example of a direction in which a current flows in the bridge circuit for a motor in the camera shown in FIG. 55.

For example, in the case of a circuit shown in FIG. 71, when transistors Q1 and Q4 are turned on and transistors Q2 and Q3 are turned off, a current flows in a direction of arrows I1 and I2. Likewise, in the case of a circuit shown in FIG. 72, when transistors Q1 and Q4 are turned off and transistors Q2 and Q3 are turned on, a current flows in a direction of arrows I3 and I4.

For abruptly stopping the motor, two pnp transistors or npn transistors are turned on in order to strap both terminals of the motor.

In particular, when it is unnecessary to change the speed of the motor 436, the four transistors Q1 to Q4 constituting a bridge circuit may be turned off in order to cause the motor 436 to move idly. This kind of bridge circuit may be used according to an ordinary way of using a known bridge circuit.

Furthermore, since a control signal to be applied to a bridge circuit is a digital signal, the bridge circuit can be controlled easily by the CPU 428. Moreover, a preamplifier including power amplification devices of transistors or FETs may be connected between a bridge circuit control signal output terminal of the CPU 428 and an input terminal of the bridge circuit that is a base of a transistor. In this case, power of a higher level can be controlled using the bridge circuit.

For controlling power to be applied to a motor by performing PWM, a pulse width-modulated wave may be superposed on a signal transmitted from the CPU 428 to the bridge circuit.

Figure 67:
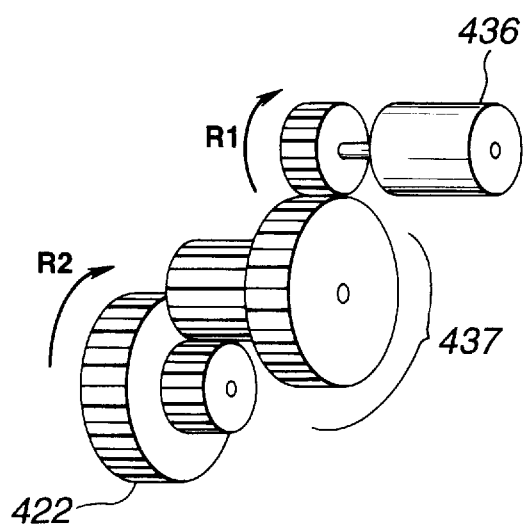
FIG. 67 is an oblique view showing component members ranging from a first motor to a first blur correction roller which are included in a major portion of the camera shown in FIG. 55.

As mentioned above, the CPU 428 controls the motor drive circuit 434. Consequently, as shown in FIG. 67, the first motor 436 is rotated in a direction of arrow R1. The rotation of the first motor 436 is conveyed to the first reduction gear train 437. This causes the first blur correction roller 422 to rotate in a direction of arrow R2.

A finger of a photographer's left hand is in contact with the first blur correction roller 422. The weight of the photographer holding the camera 415 is larger than that of the camera. Even the photographer's fingertip imposes a weight larger than that of the camera 415. Depending on a ratio of the weights, the rotation in direction of arrow R2 in FIG. 67 of the first collection roller 422 is divided into a force thrusting a contact point on the camera, at which the photographer is in contact with the camera, in the direction of arrow R2 and a force thrusting the camera 415 in a direction (direction of arrow V) opposite to the direction of arrow R2 about an axis about which the roller 422 is rotated. For example, when the first blur correction roller 422 is fixed to something very heavy, for example, a floor in a building, the rotation of the roller does not produce a force moving the floor but conversely produces a force rotating the camera 415.

Figure 68:
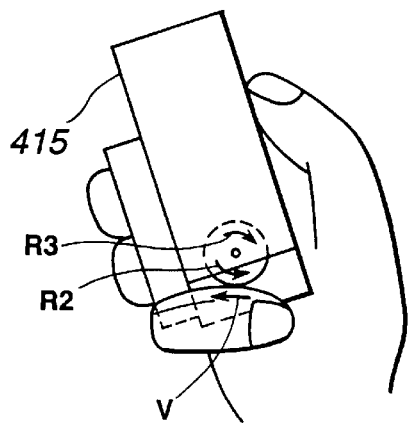
FIG. 68 is a diagram for explaining operations of the camera shown in FIG. 55 for preventing a blur derived from a tremble about an x axis, showing the relationship between a photographer's and the camera.

Thus, the rotation in direction of arrow R2 of the first blur correction roller 422 causes the whole camera 415 to rotate in a direction of arrow R3 in FIG. 68. In other words, the rotation in direction of arrow R2 produces a force causing the camera to rotate about an axis parallel to the x axis. If the rotation in direction of arrow J of the camera 415 derived from a tremble existing about the x axis and the rotation in direction of arrow R3 are canceled out, a rotation of the camera 415 derived from a tremble will not occur. The magnitudes of the rotation in direction of arrow R2 and of the rotation in direction of arrow R3 may vary depending on a person in contact with the roller. After blur prevention drive is controlled, the aforesaid proportion constant α or β may be adjusted for more precise blur prevention.

The adjustment is achieved by reviewing and correcting a proportion constant at every interruption in such a way that when a motor is driven for enabling interruption, if an output of an angular speed detector does not get smaller despite repeated drive in the same direction, a proportion constant is made larger, and if the output of the angular speed detector gets smaller than is expected, the proportion constant is made smaller.

Otherwise, addition or multiplication of data for adjustment may be appended to the expression giving the applied voltage Vout as follows:

$$Vout = \alpha \times x + Vb + (\text{adjustment data})$$

The adjustment data can be, like the proportion constant, adjusted to reflect the result of actual drive.

As mentioned above, when the camera 415 is rotated in a direction of arrow R3 while reacting against the rotation in direction of arrow R2 of the first blur correction roller 422, a photographer also perceives the reaction. This means that the photographer is alarmed with a repulsion resulting from his/her attempt to move the camera. Incidentally, as far as a known blur prevention system is concerned, the advantage of the blur prevention system is verified merely with a reduction in fluctuation of an image seen through a viewfinder, or with the indication of a magnitude of blurring in the image seen through the viewfinder or indication for alarming deterioration of an image by means of an LED. In other words, when no tremble occurs, a reactional force is not generated. When a large tremble occurs, a large reactional force is generated. The reaction occurs because the camera attempts to stay at an original position. Consequently, a swing of an image is also suppressed.

The above description is concerned with prevention of a blur derived from a tremble about the x axis. The same applies to prevention of a blur derived from a tremble about the y axis. In short, the second blur correction roller 423 generates a force to be conveyed to a photographer's right palm, and the camera reacts against the rotation of the second blur correction roller 423 and receives a torque in a direction in which an existent tremble is canceled. As a result, the rotation of the camera derived from the tremble is suppressed.

According to the present invention, a photographer's hand is pressed or used as a support in order to control the posture of the camera body. A blur prevention system can therefore realize a compact design. Moreover, both an image seen through a viewfinder and the optical axis of a photographic lens can be changed simultaneously. The blur prevention system can therefore give a photographer a good sense of maneuverability.

As is apparent, the blur prevention method is not limited to a camera but can be implemented in an observation apparatus held by hands, such as, binoculars. This is because vibrations of the observation apparatus can be prevented in the same manner as vibrations of a viewfinder of a camera.

In the aforesaid example, blur prevention is effected only while the vibration isolation button 426 located at a position permitting a photographer to manipulate the button readily is manipulated by the photographer. When the setting of the camera should be changed in order to change an angle of view or the like, the blur prevention system can be stopped operating readily.

Needless to say, the vibration isolation button 426 may not be a mechanical selection switch but may be replaced with, for example, a known line-of-sight sensing means.

Next, another example of the configuration of the blur correction driving mechanism will be described with reference to FIGS. 73, 74, 75, and 76. For brevity's sake, prevention of a blur derived only from a tremble about the x axis will be described. The same procedure will be adopted for prevention of a blur derived from a tremble about the y axis. For avoiding making the drawing congested, component members identical to those in the seventh embodiment will bear the same reference numerals. The description of the component members will be omitted.

Figure 73:
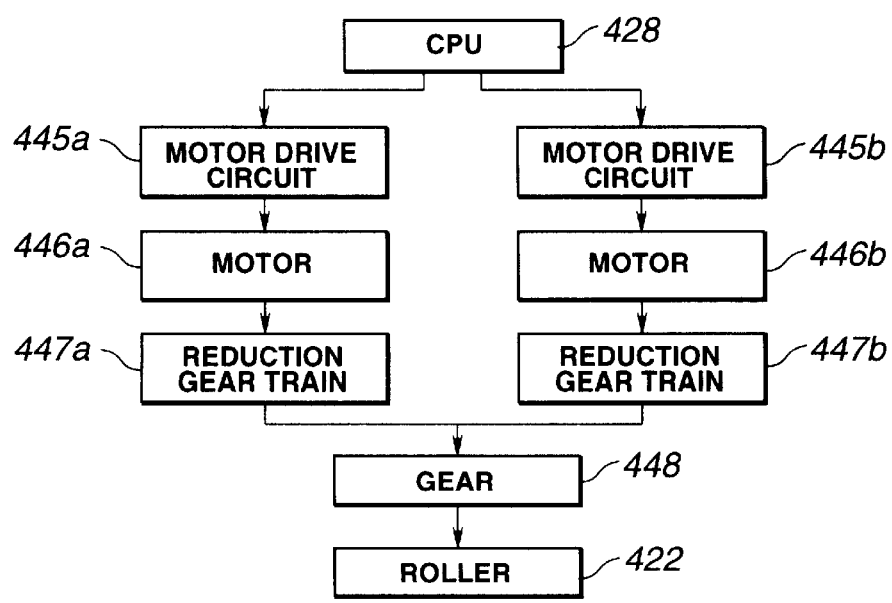
FIG. 73 is a block diagram showing a variant of a blur correction driving mechanism for a camera in accordance with a variant of the seventh embodiment of the present invention.

As shown in FIG. 73, two drive circuits; first motor drive circuits 445a and 445b for correcting a blur derived from a tremble about the x axis are connected as part of a blur prevention system to the CPU 428. A first motor 446a and second motor 446b are connected to the motor drive circuits. First reduction gear trains 447a and 447b for reducing in speed and energizing rotational outputs are coupled with the first motor 446a and second motor 446b. Similar to the aforesaid example, the output terminals of the first reduction gear trains are coupled with a gear 448 fixed coaxially to the first blur correction roller 422.

Figure 74:
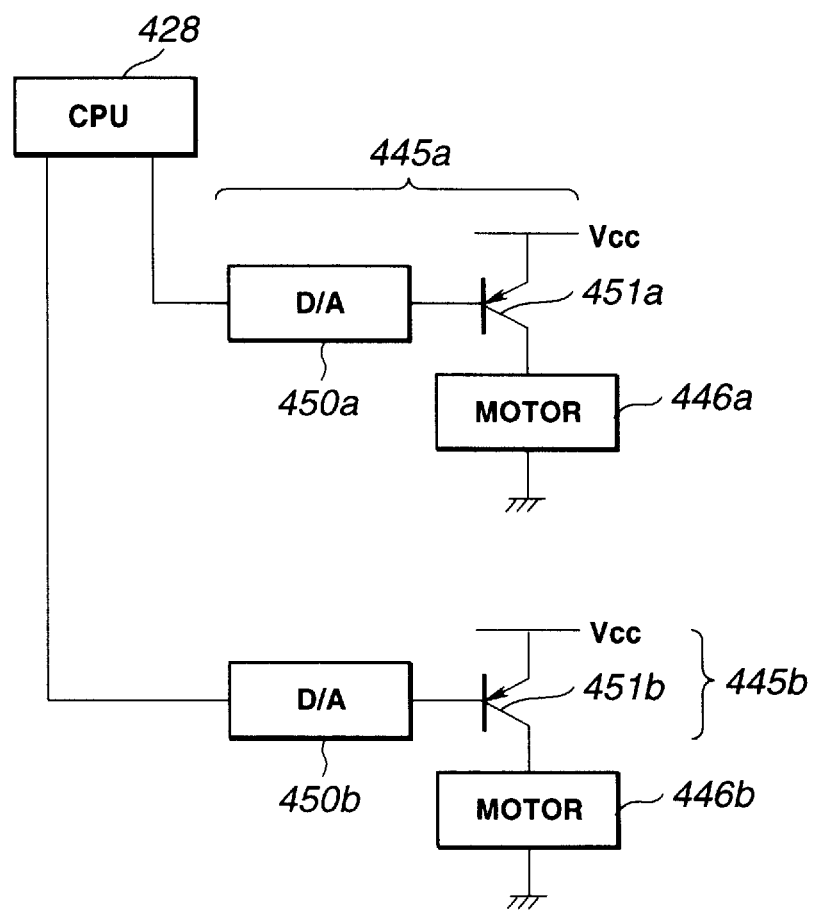
FIG. 74 is a block diagram showing the electrical configuration of the blur correction driving mechanism shown in FIG. 73.
Figure 75:
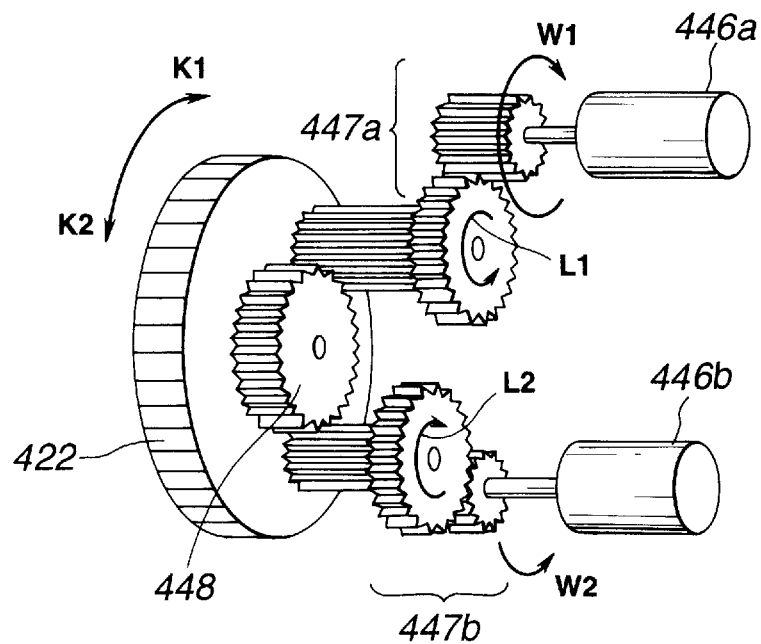
FIG. 75 is an oblique view showing the appearance of a major portion, which includes component members ranging from a first motor to a blur correction roller, of a blur correction driving mechanism for a camera in accordance with another variant of the seventh embodiment of the present invention.

The two motors 446a and 446b rotate in different directions, that is, a direction of arrow W1 and direction of arrow W2 in FIG. 75. The first motor drive circuits 445a and 445b are therefore, as shown in FIG. 74, designed so that D/A converters 450a and 450b are used to convert different driving voltage signals into an analog form, and power transistors 451a and 451b are used as current amplifiers to produce currents required for driving motors.

Owing to the foregoing configuration, the first reduction gear trains 447a and 447b are, as shown in FIG. 75, rotated in opposite directions. However, the first reduction gear trains are controlled by the CPU 428 so that they generate different forces. As shown in FIG. 75, for rotating the blur correction roller 422 in a direction of arrow K1, a high voltage is applied to the motor 446a for use in rotating the roller in the direction of arrow K1 so that the motor 446a can rotate in a direction of arrow W1. This causes the first reduction gear train 447a to rotate in a direction of arrow L1. Consequently, the blur correction roller 422 is rotated in the direction of arrow K1 via a gear 448.

On the other hand, a low voltage is applied to the motor 446b for use in rotating the roller in a direction of arrow K2 opposite to the direction of arrow K1. With this weak force, the reduction gear train 447b is rotated in a direction of arrow L2. The gear 448 is then pressed in the direction of arrow K2 opposite to the direction of arrow K1.

Figure 76:
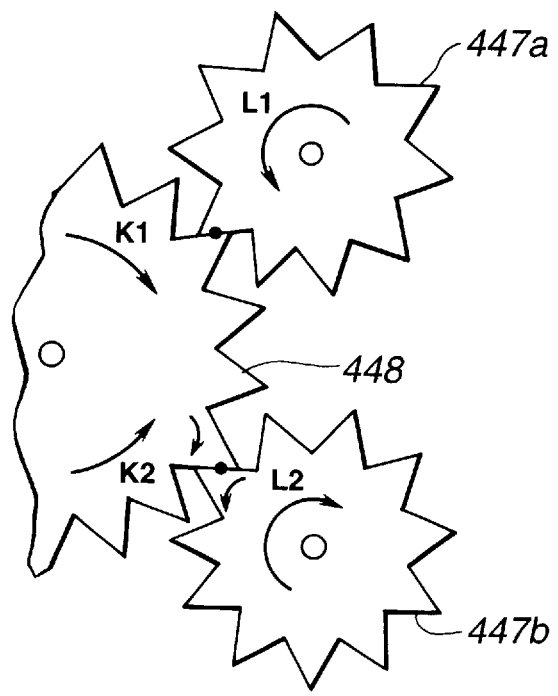
FIG. 76 is an enlarged front view of a major portion, which is a first reduction gear train, of the blur correction driving mechanism shown in FIG. 75.

A torque in the direction of arrow K1 is strong. As a result, the blur correction roller 422 rotates in the direction of arrow K1. At this time, the gear 448 coupled with the blur correction roller 422 presses the reduction gear train 447b attempting to rotate the blur correction roller 422 in the direction of arrow K1. That is to say, as shown in FIG. 76, when the roller is rotating in the direction of arrow K1, the driving system does not make a backlash in the direction of arrow K2.

By contrast, for rotating the blur correction roller 422 in the direction of arrow K2, a low voltage is applied to the motor 446a for use in rotating the roller in the direction of arrow K1. The blur correction roller 422 is therefore rotated via the first reduction gear train 447a and gear 448. On the other hand, a high voltage is applied to the motor 446a for use in rotating the roller in the direction of arrow K2. As a result, the blur correction roller 422 is rotated in the direction of arrow K2.

For reversing the direction of rotation from the direction of arrow K1 to the direction of arrow K2, since the gear has already been moved to clear the backlash, the direction can be reversed smoothly.

As mentioned above, for preventing a blur derived from a tremble about one axis, two actuators are used to realize a mechanism devoid of a backlash.

In the aforesaid example, a gear train has a backlash. When a direction of blur correction is reversed, a little time may be needed to clear the backlash and a response for blur prevention may be degraded. In the foregoing example, since motors for driving a roller in different directions are used, the time is nullified. Blur prevention can be carried out swiftly.

According to the present invention, it is apparent that a wide range of different embodiments can be constructed on the basis of the invention without a departure from the spirit and scope of the invention. This invention should therefore be limited to the appended claims and not restricted to any specified embodiments.

What is claimed is:

1. A blur prevention system for a camera, comprising:
   a camera body having a viewfinder for observing an object image, and a photography unit, including a photography optical system, for exposing film or electrically recording the object image;

a holding unit separated from said camera body and used to hold said camera body;

a blur detector, incorporated in said camera body, for detecting a magnitude of trembling of said camera body; and a blur prevention drive unit incorporated in said holding unit and including a driving mechanism for displacing said camera body relative to said holding unit according to the magnitude of trembling detected by said blur detector so that the trembling of said camera body can be canceled.

2. A blur prevention system for a camera according to claim 1, wherein said holding unit and camera body can be held simultaneously.

3. A blur prevention system for a camera according to claim 1, wherein said holding unit includes a first holding portion, said blur detector detects a first speed of rotational vibration about an axis with a first axis as a center, and said blur prevention drive unit drives a first driven part of said first holding portion based on the first speed of rotational vibration.

4. A blur prevention system for a camera according to claim 3, wherein said holding unit further includes a second holding portion, said blur detector detects a second speed of rotational vibration about an axis with a second axis as a center, and said blur prevention drive unit drives a second driven part of said second holding portion based on the second speed of rotational vibration.

5. A blur prevention system for a camera according to claim 4, wherein said first holding portion is gripped with one of a photographer's hands, and said second holding portion is gripped with another one of the photographer's hands.

6. A blur prevention system for a camera according to claim 4, wherein said first holding portion and said second holding portion are linked to said camera body via a first drive shaft and second drive shaft so that said camera body can be driven to be isolated from vibrations, said first and second drive shafts being parallel to each other, and a driving force conveying mechanism for converting a driving force exerted by either of said first drive shaft and second drive shaft into a force working in a direction perpendicular to a direction of the parallel shafts.

7. A blur prevention system for a camera according to claim 4, wherein said first axis and second axis are mutually orthogonal.

8. A blur prevention system for a camera according to claim 1, wherein said holding unit is located on a side of said camera.

9. A blur prevention system for a camera according to claim 1, wherein said holding unit is located at a position overlying a side of said camera body and a bottom thereof.

10. A blur prevention system for a camera according to claim 1, wherein said blur detector is an angular speed detector for detecting an angular speed observed about an axis.

11. A blur prevention system for a camera, comprising:

a camera body having a strobe unit for irradiating illumination light to an object, and a photography unit, including a photography optical system, for exposing film or electrically recording an object image;

a holding unit separated from said camera body and used to hold said camera body;

a blur detector, incorporated in said camera body, for detecting a magnitude of trembling of said camera body; and a blur prevention drive unit incorporated in said holding unit and including a driving mechanism for displacing said camera body relative to said holding unit according to the magnitude of trembling detected by said blur detector to cancel the tremble of said camera body.

12. A blur prevention system for a camera according to claim 11, wherein said holding unit and camera body can be held simultaneously.

13. A blur prevention system for a camera according to claim 11, wherein said holding unit includes a first holding portion, said blur detector detects a first speed of rotational vibration about a first axis, and said blur prevention drive unit drives a first driven part of said first holding portion based on the first speed of rotational vibration.

14. A blur prevention system for a camera according to claim 13, wherein said holding unit further includes a second holding portion, said blur detector detects a second speed of rotational vibration about a second axis, and said blur prevention drive unit drives a second driven part of said second holding portion based on the second speed of rotational vibration.

15. A blur prevention system for a camera according to claim 14, wherein said first holding portion is gripped with one of a photographer's hands, and said second holding portion is gripped with another of the photographer's hands.

16. A blur prevention system for a camera according to claim 14, wherein said first holding portion and second holding portion are respectively linked to said camera body via a first drive shaft and second drive shaft, which shafts are rotated so that said camera body can be driven to be isolated from vibrations, said first and second drive shafts being parallel to each other, and a driving force conveying mechanism for converting a driving force exerted by either of said first drive shaft and second drive shaft into a force working in a direction perpendicular to a direction of the parallel shafts.

17. A blur prevention system for a camera according to claim 11, wherein said holding unit is located on a side of said camera body.

18. A blur prevention system for a camera according to claim 11, wherein said holding unit is located at a position overlying a side of said camera body and a bottom thereof.

19. A blur prevention system for a camera, comprising:

a camera body having a range finder unit for use in measuring a distance to an object or a photometry unit for use in measuring luminance of the object, and a photography unit, including a photography optical unit, for exposing film or electrically recording an object image;

a holding unit separated from said camera body to hold said camera body;

a blur detector, incorporated in said camera body, for detecting a magnitude of trembling of said camera body; and a blur prevention drive unit incorporated in said holding unit and including a driving mechanism for displacing said camera body relative to said holding unit according to the magnitude of trembling detected by said blur detector to cancel the tremble of said camera body.

20. A blur prevention system for a camera, comprising:

a camera body having a photography unit, including a photography optical system, for exposing film or electrically recording an object image;

a blur detector, incorporated in said camera body, for respectively detecting magnitudes of trembling of said camera body about a first axis and a second axis;

a first grip including a first blur preventing mechanism for directly displacing said camera body via a first drive shaft according to the magnitude of trembling about said first axis detected by said blur detector so that the tremble of said camera body can be canceled; and a second grip including a second blur preventing mechanism for directly displacing said camera body via a second drive shaft according to the magnitude of trembling about said second axis detected by said blur detector so that the tremble of said camera body can be canceled.

21. A blur prevention system for a camera according to claim 20, wherein said first drive shaft and second drive shaft are parallel to each other, and one of said first blur preventing mechanism and second blur preventing mechanism includes a driving force converting mechanism for converting a driving force exerted by said drive shaft into a force working at right angles.

22. An optical apparatus for use in observing an object, comprising:

an observation optical system for use in observing an object;

a holding unit by which a photographer holds said optical system;

a blur detector, incorporated in said holding unit, for detecting a magnitude of trembling of said observation optical system derived from a tremble of the photographer; and a blur prevention drive unit for displacing said observation optical system relative to said holding unit according to an output of said blur detector so that tremble of said observation optical system can be canceled.

23. An optical apparatus according to claim 22, wherein said blur detector detects a first magnitude of trembling in a first direction of trembling and a second magnitude of trembling in a direction different from the first direction of trembling.

24. An optical apparatus according to claim 23, wherein the first magnitude of trembling detected by said blur detector is an angular speed observed about a first axis, and the second magnitude of trembling is an angular speed observed about a second axis.

25. A blur prevention system for a camera, comprising:

a blur detector, incorporated in a camera body, for detecting a magnitude of trembling applied to said camera body;

a first vibration isolator for alleviating an adverse effect of a tremble in a simplified manner according to an output of said blur detector; and a second vibration isolator, separated from said camera body, for receiving a blur signal from said blur detector and driving said camera body so that the tremble applied to said camera body can be canceled.

26. A blur prevention system according to claim 25, wherein said first vibration isolator serves as a release timing control unit for permitting release when a magnitude of trembling becomes equal to or smaller than a given value or indicates an alarm when the magnitude of trembling is large.

27. A blur prevention system according to claim 25, wherein, even when said second vibration isolator is attached to said camera body, said first vibration isolator exerts an effect of vibration isolation.

28. A blur prevention system according to claim 25, wherein when it is detected that said second vibration isolator is attached to said camera body, said first vibration isolator is disabled from operating.

29. A blur prevention system according to claim 25, wherein said second vibration isolator includes a grip used to hold said camera body.

30. A blur prevention system according to claim 25, wherein said second vibration isolator includes a first vibration isolation driving mechanism for canceling a tremble about a first axis and a second vibration isolation driving mechanism for canceling a tremble about a second axis different from said first axis.

31. A blur prevention system according to claim 25, wherein said second vibration isolator includes a rotor pressure-weld to said camera body, and a motor which rotates said rotor based on an output of said blur detector.

32. A blur prevention system according to claim 25, wherein said camera body and second vibration isolator are connected to each other over a communication line, and a blur signal sent from said blur detector incorporated in said camera body is communicated to said second vibration isolator over said communication line.

33. A blur prevention system according to claim 25, wherein said second vibration isolator is incorporated in a grip used to hold said camera body.

34. A blur prevention system for a camera, comprising:

a camera body;

a blur detector, incorporated in said camera body, for detecting a magnitude of trembling applied to said camera body;

a simplified vibration isolator for alleviating an adverse effect of a tremble in a simplified manner based on an output of said blur detector; and an output terminal through which a blur signal sent from said blur detector or a signal proportional to said blur signal is outputted externally to said camera body.

35. A blur prevention system for a camera, comprising:

a camera body;

a blur detector, incorporated in said camera body, for detecting a magnitude of trembling applied to said camera body;

a grip separated from said camera body and including an input terminal through which a blur signal sent from said blur detector is received; and a vibration isolator, incorporated in said grip, for driving said camera body to cancel a tremble applied to said camera body.

36. A blur prevention system for a hand-held optical apparatus including an optical system for observation or photography, comprising:

a blur detector, incorporated in a main unit of said optical apparatus, for detecting a magnitude of trembling applied to said main unit of said optical apparatus;

an actuator for canceling trembling;

a driving force output member, partly exposed to an exterior of said optical apparatus, for outputting a driving force exerted by said actuator; and a control unit for responding to an output signal of said blur detector and outputting a control signal to said actuator so that a movement made by the entire optical apparatus due to a tremble can be canceled.

37. A blur prevention system according to claim 36, wherein said detector detects angular speeds observed about two mutually-orthogonal axes, and said driving force output member includes at least two rotary parts.

38. A blur prevention system according to claim 36, wherein two axes of rotation of said driving force output member are mutually orthogonal.

39. A blur prevention system according to claim 36, wherein said driving force output member is located at a position at which said driving force output member comes into contact with a hand of a holder holding said optical apparatus.

40. A blur prevention system according to claim 36, wherein said driving force output member includes a rotating member, and also includes a first rotating mechanism for rotating said rotating member in a first direction of rotation, and a second rotating mechanism for rotating said rotating member in a second direction of rotation, and said first rotating mechanism and second rotating mechanism work to clear a backlash of a gear train for conveying a driving force exerted by a drive unit to said rotating member.

41. A blur prevention system according to claim 36, wherein said hand-held optical apparatus is a telescope or binoculars for use in observing an object or a photography apparatus for photographing an object.

42. A blur prevention system according to claim 36, wherein said driving force output member is located in a vicinity of a holding portion used to hold said optical apparatus.

43. A blur prevention system according to claim 36, further comprising a processing circuit for processing an output of said blur detector, said processing circuit including a digital high-pass filter.

44. A blur prevention system for a camera, comprising:

a detector for detecting a magnitude of trembling of said camera; and a drive unit for driving said camera according to a magnitude of trembling detected by said detector so that a tremble of said camera can be canceled, said drive unit including a rotating member, and including a first rotating mechanism for rotating said rotating member in a first direction of rotation and a second rotating mechanism for rotating said rotating member in a second direction of rotation, wherein said first rotating mechanism and second rotating mechanism work to clear a backlash of a gear train for conveying a driving force exerted by said drive unit to said rotating member.

45. A blur prevention system according to claim 44, wherein said first rotating mechanism and second rotating mechanism each include a different actuator and drive said driving force output member according to a value calculated by adding up torques working in opposite directions.

46. A blur prevention system for a camera, comprising:

a blur detecting means, incorporated in a camera body, for detecting a magnitude of trembling of a camera;

a blur preventing means for enabling exposure when an output of said blur detecting means becomes equal to or smaller than a given value;

a grip freely attachable or detachable to or from said camera; and a driving means, incorporated in said grip, for moving said camera relative to said grip in a direction, in which the tremble can be canceled, according to an output of said blur detecting means.

47. A hand-held optical apparatus for observation or photography, comprising:

a blur detecting means for detecting a magnitude of trembling applied to said optical apparatus;

a rotating member located at a position at which said rotating member comes into contact with a hand of an operator when said optical apparatus is held with the operator's hands; and a blur prevention system for rotating said rotating member in response to an output of said blur detecting means and moving said optical apparatus relative to the hands holding said optical apparatus.

* * * * *

UNITED STATES PATENT AND TRADEMARK OFFICE
CERTIFICATE OF CORRECTION

PATENT NO. : 5,850,576
DATED : December 15, 1998
INVENTOR(S) : MATSUZAWA

It is certified that error appears in the above-identified patent and that said Letters Patent is hereby corrected as shown below:

Col. 7, line 49, before "and" insert instead -- hand--.

Col. 22, line 66, after "shown" insert , --for--.

Col. 26, line 13, delete "an".

Col. 26, line 16, after "as" insert --an--.

Signed and Sealed this

Twenty-third Day of May, 2000

Attest:

Q. TODD DICKINSON

Attesting Officer

Director of Patents and Trademarks